United States Patent
Centonza et al.

(10) Patent No.: US 12,262,423 B2
(45) Date of Patent: Mar. 25, 2025

(54) FIRST NETWORK NODE, SECOND NETWORK NODE AND METHODS PERFORMED THEREBY FOR HANDLING A RACH CONFIGURATION

(71) Applicant: Telefonaktiebolaget LM Ericsson (publ), Stockholm (SE)

(72) Inventors: Angelo Centonza, Torrenueva Costa (ES); Pablo Soldati, Solna (SE); Ali Parichehrehteroujeni, Linköping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 294 days.

(21) Appl. No.: 17/635,458

(22) PCT Filed: Aug. 12, 2020

(86) PCT No.: PCT/SE2020/050776
§ 371 (c)(1),
(2) Date: Feb. 15, 2022

(87) PCT Pub. No.: WO2021/034247
PCT Pub. Date: Feb. 25, 2021

(65) Prior Publication Data
US 2022/0272770 A1    Aug. 25, 2022

Related U.S. Application Data

(60) Provisional application No. 62/887,804, filed on Aug. 16, 2019.

(51) Int. Cl.
*H04W 74/0833*    (2024.01)

(52) U.S. Cl.
CPC .................. *H04W 74/0841* (2013.01)

(58) Field of Classification Search
CPC ................................... H04W 74/0841
See application file for complete search history.

(56) References Cited

U.S. PATENT DOCUMENTS

| | | | |
|---|---|---|---|
| 2022/0217781 A1* | 7/2022 | Decarreau | G06N 3/08 |
| 2023/0156806 A1* | 5/2023 | Pantelidou | H04W 74/004 370/329 |

OTHER PUBLICATIONS

3GPP, "3rd Generation Partnership Project; Technical Specification Group Radio Access Network; NG-RAN; Architecture description (Release 15)", 3GPP TS 38.401 V15.3.0, Sep. 2018, 1-39.
(Continued)

*Primary Examiner* — James P Duffy
(74) *Attorney, Agent, or Firm* — Weisberg I.P. Law, P.A.

(57) ABSTRACT

A method performed by a first network node (111) operating in a wireless communications network (100) with a Radio Access Technology with a split architecture. The first network node (111) is a Centralized Unit and a second network node (112) is a Distributed Unit. The first network node (111) detects (801) a RACH configuration between a served cell and a neighbor cell, and sends (802) a first indication to the second network node (112) based on the conflict. The first indication comprises at least one of: i) a notification of the conflict, ii) assistance information associated to the conflict, iii) a request for assistance information, and iv) a request to resolve the conflict. The first network node (111) then receives (803) one or more second indications from the second network node (112), wherein at least one is based on a result of a verification of an existence of the conflict.

20 Claims, 22 Drawing Sheets

(56) References Cited

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 15)", 3GPP TS 36.331 V15.3.0, Sep. 2018, 1-770.

3GPP, "3rd Generation Partnership Project; Technical Specification Group Radio Access Network; NG-RAN; Architecture description (Release 15)", 3GPP TS 38.401 V15.5.0, Mar. 2019, 1-39.

3GPP, "3rd Generation Partnership Project; Technical Specification Group Radio Access Network; NR; Medium Access Control (MAC) protocol specification (Release 15)", 3GPP TS 38.321 V15.3.0, Sep. 2018, 1-76.

3GPP, "3rd Generation Partnership Project; Technical Specification Group Radio Access Network; NR; Radio Resource Control (RRC) protocol specification (Release 15)", 3GPP TS 38.331 V15.3.0, Sep. 2018, 1-445.

3GPP, "3rd Generation Partnership Project; Technical Specification Group Services and System Aspects; 3GPP System Architecture Evolution (SAE); Security architecture (Release 15)", 3GPP TS 33.401 V15.8.0, Jun. 2019, 1-163.

CMCC, "Text proposals for RACH optimization", 3GPP TSG-RAN WG3 #104, R3-193187, Reno, USA, May 13-17, 2019, 1-3.

Ericsson, "RACH optimization in NR", 3GPP TSG-RAN WG3 #104, R3-193062, Reno, Nevada, US, May 13-17, 2019, 1-7.

Ericsson, "Solution for RACH Optimization in NG.RAN", 3GPP TSG.RAN WG3 #105, R3-194292, Ljubljana, SI, Aug. 26-Aug. 30, 2019, 1-7.

Ericsson, "TP to TR 37.816 on Coverage and Capacity Optimisation Solution for NR", 3GPP TSG-RAN WG3 #104, R3-193066, (also cited as R3-193246), Reno, Nevada, US, May 13-17, 2019, 1-4.

Huawei, "RACH optimisation in NR based on LTE", 3GPP TSG-RAN3 Meeting #104, R3-192963, Reno, Nevada, US, May 13-17, 2019, 1-3.

ZTE, "NR RACH optimization", 3GPP TSG-RAN WG3 Meeting # 104, R3-192319, Reno, US,, May 13-17, 2019, 1-5.

3GPP, "3rd Generation Partnership Project; Technical Specification Group Radio Access Network; Evolved Universal Terrestrial Radio Access (E-UTRA); Physical Channels and Modulation (Release 9)", 3GPP TS 36.211 V9.1.0, Mar. 2010, 1-85.

3GPP, "3rd Generation Partnership Project; Technical Specification Group Radio Access Network; NR; Physical layer procedures for data (Release 15)", 3GPP TS 38.214 V15.6.0, Jun. 2019, 1-105.

\* cited by examiner a)
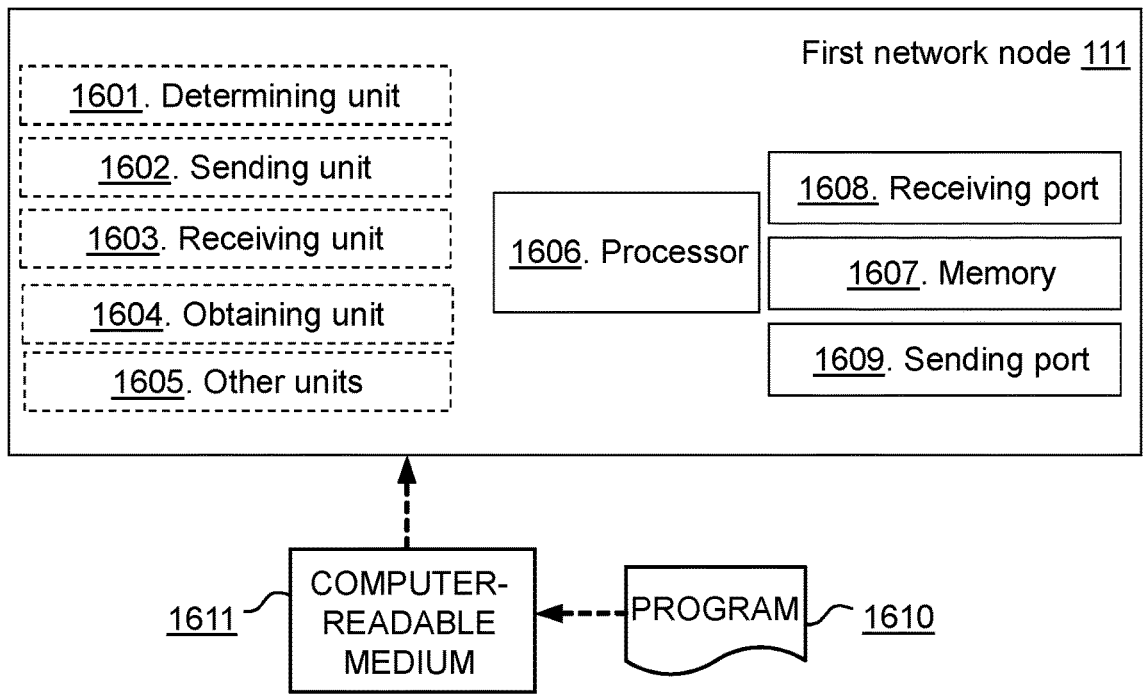
b)
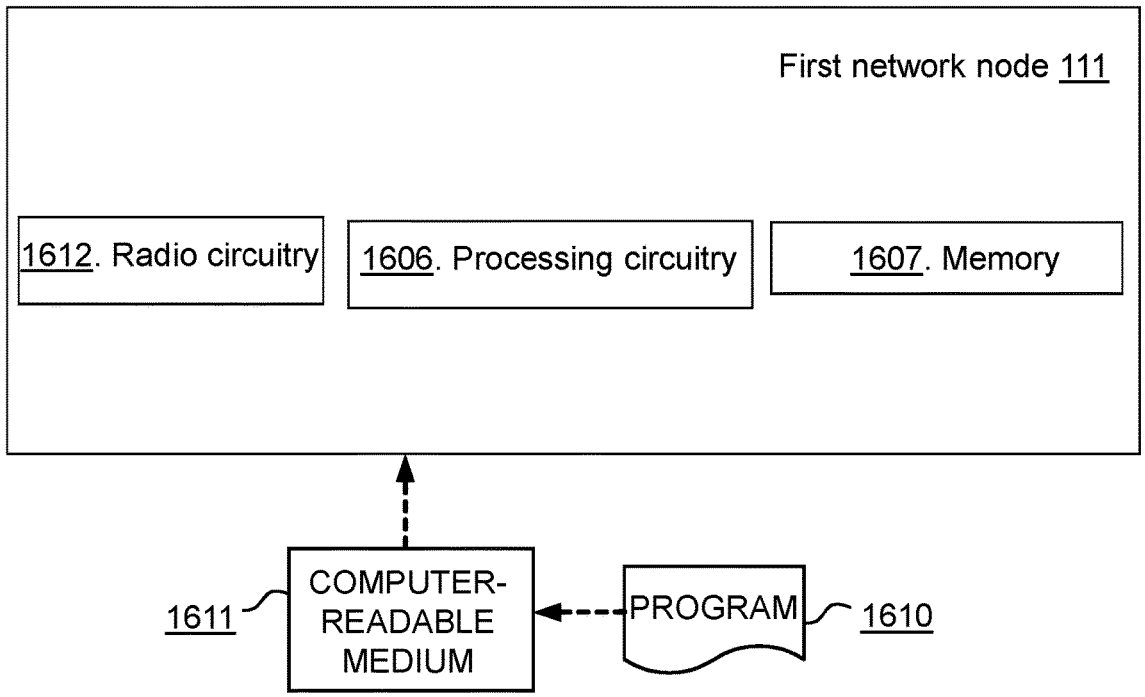
Figure 16

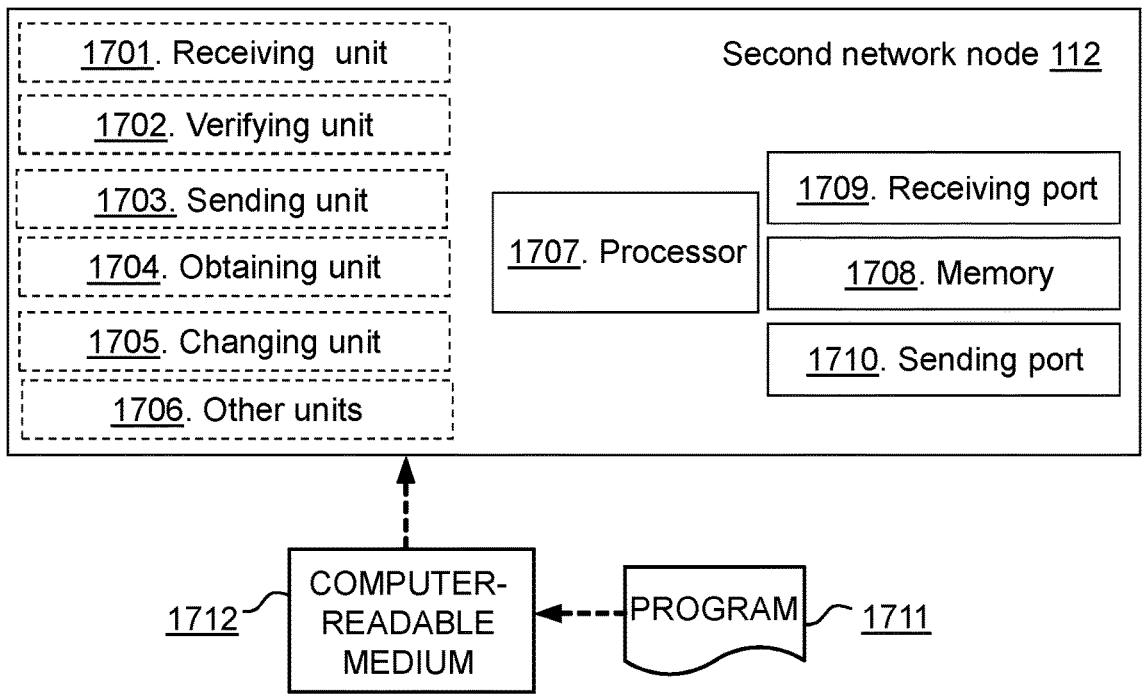
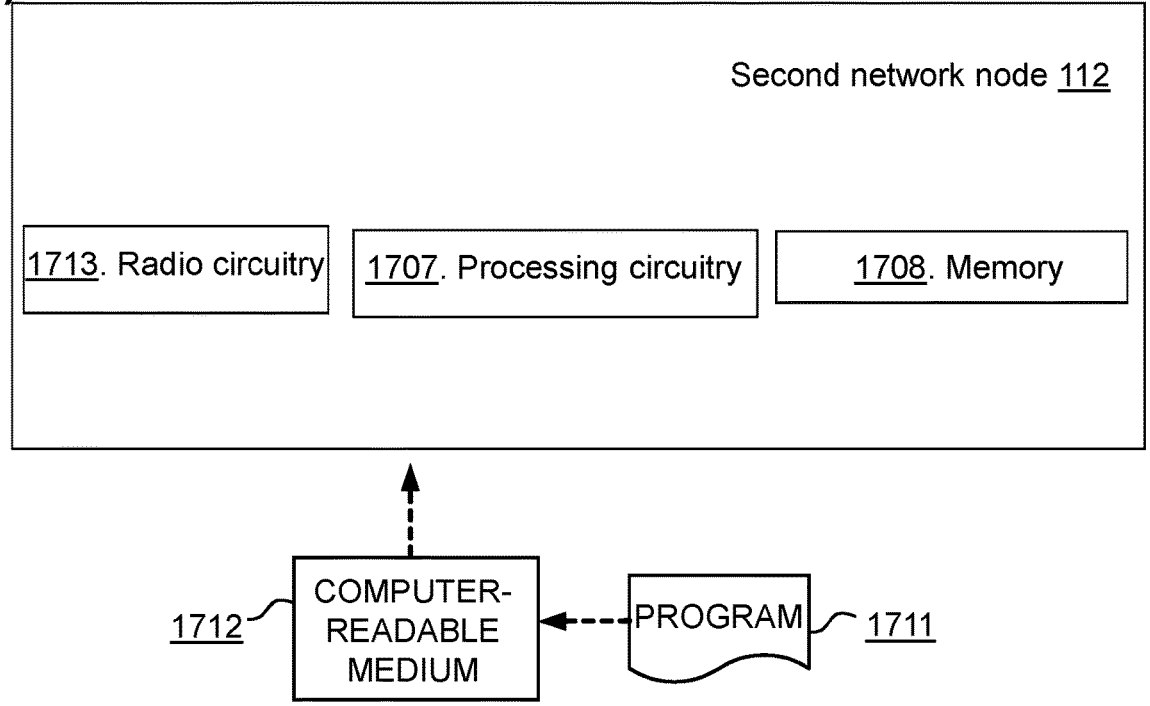
Figure 17

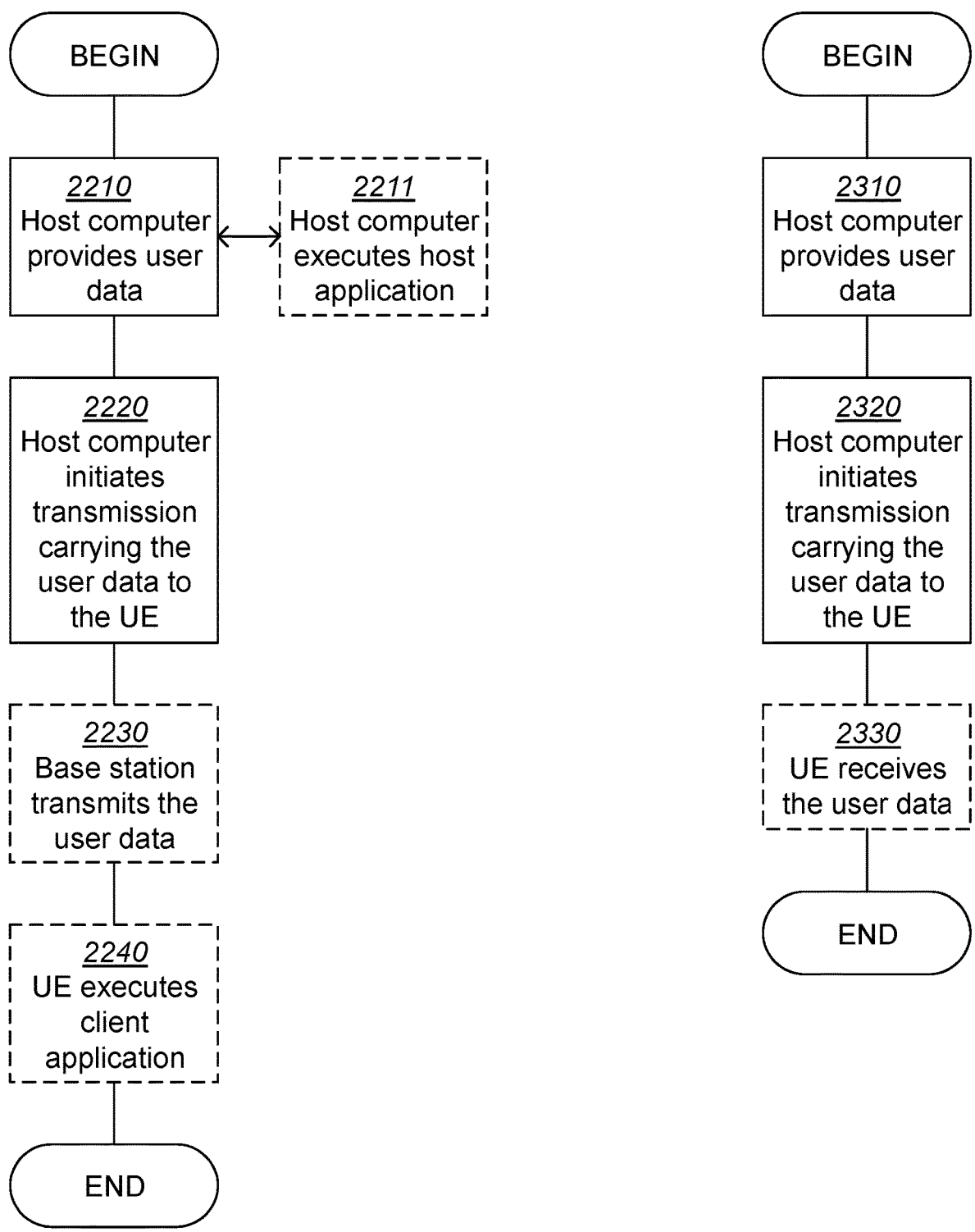

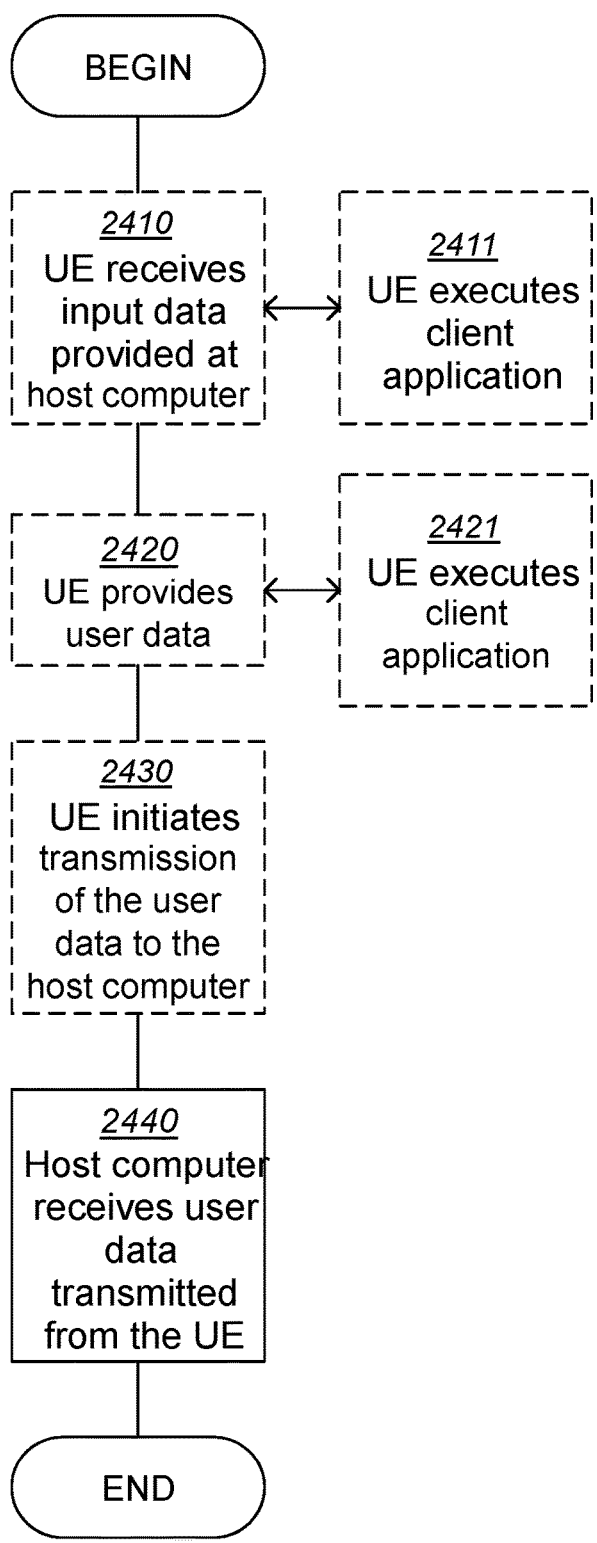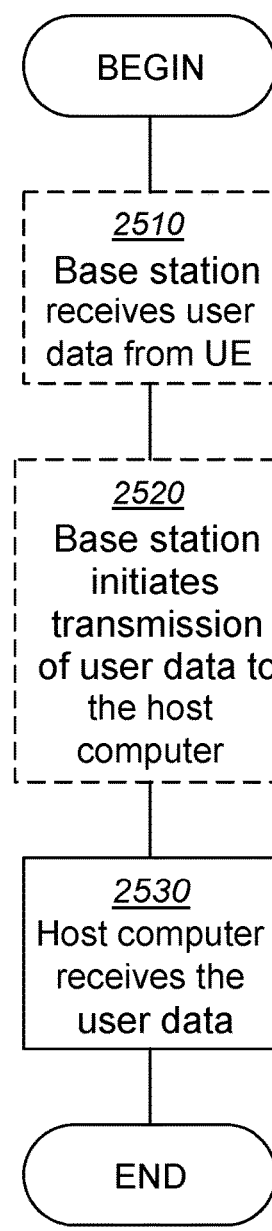
FIG. 24
FIG. 25

FIRST NETWORK NODE, SECOND NETWORK NODE AND METHODS PERFORMED THEREBY FOR HANDLING A RACH CONFIGURATION

TECHNICAL FIELD

The present disclosure relates generally to a first network node, and methods performed thereby, for handling a Random Access Channel (RACH) configuration. The present disclosure also relates generally to a second network node and methods performed thereby, for handling the RACH configuration.

BACKGROUND

Communication devices within a wireless communications network may be User Equipments (UEs) such as e.g., wireless devices, stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone, and/or between a wireless device and a server via a Radio Access Network (RAN), and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

Communication devices may also be network nodes, such as radio network nodes or access nodes, e.g., Transmission Points (TP). The wireless communications network covers a geographical area which may be divided into cell areas, each cell area being served by a network node such as a Base Station (BS), e.g. a Radio Base Station (RBS), which sometimes may be referred to as e.g., gNB, evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. The wireless communications network may also be a non-cellular system, comprising network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The so-called Fifth Generation (5G) system, from a radio perspective started to be standardized in 3GPP, and the so-called New Radio (NR) is the name for the radio interface. NR architecture is being discussed in 3GPP. In the current concept, gNB denotes NR BS, where one NR BS may correspond to one or more transmission/reception points.

One of the main goals of NR is to provide more capacity for operators to serve ever increasing traffic demands and variety of applications. Because of this, NR will be able to operate on high frequencies like frequencies over 6 GHz until 60 or even 100 GHz.

NR Architecture

The current 5G RAN (NG-RAN) architecture is depicted and described in TS 38.401v15.5.0 (http://www.3qpp.orq/ftp//Specs/archive/38 series/38.401/38401-f50.zip) as depicted in the schematic diagram of FIG. 1. The NG architecture may be further described as follows. The NG-RAN 10 may be understood to consist of a set of gNBs 11 connected to the 5G Core Network (5GC) 12 through the NG 13. An gNB can support Frequency Division Duplex (FDD) mode, Time Division Duplex (TDD) mode or dual mode operation. gNBs may be understood to be interconnected through the Xn 14. A gNB may consist of a gNB-Central Unit (CU) 15 and gNB-Distributed Units (DUs) 16. A gNB-CU and a gNB-Distributed Unit (DU) may be connected via F1 logical interface 17. One gNB-DU may be connected to only one gNB-CU. It may be noted that for resiliency, a gNB-DU may be connected to multiple gNB-CU by appropriate implementation.

NG, Xn and F1 are logical interfaces. The NG-RAN may be understood to be layered into a Radio Network Layer (RNL) and a Transport Network Layer (TNL). The NG-RAN architecture, that is, the NG-RAN logical nodes and interfaces between them, may be defined as part of the RNL. For each NG-RAN interface (NG, Xn, F1), the related TNL protocol and the functionality are specified. The TNL may be understood to provide services for user plane transport, signalling transport. If security protection for control plane and user plane data on TNL of NG-RAN interfaces has to be supported, NDS/IP (3GPP TS 33.401 [x] may be understood to need to be applied).

A gNB may also be connected to an LTE eNB via the X2 interface. Another architectural option is that where an LTE eNB connected to the Evolved Packet Core network is connected over the X2 interface with a so called en-gNB. The latter may be understood as a gNB not connected directly to a CN and connected via X2 to an eNB for the sole purpose of performing dual connectivity.

The architecture in FIG. 1 may be expanded by splitting the gNB-CU 15 into two entities. FIG. 2 is a schematic diagram depicting a split gNB architecture in NG RAN. In the split architecture option, the RAN protocol stack functionality may be separated in different parts. The Central Unit-Control Plane (CU-CP) 20 may be expected to handle the Radio Resource Control (RRC layer), the Central Unit-User Plane (CU-UP) 21 may handle the Packet Data Convergence Protocol (PDCP) layer and the DU 22 may handle the RLC, Medium Access Control (MAC) and Physical layer (PHY) layer of the protocol stack. In some further split, the DU may have separated unit that may handle the PHY parts separately compared to RLC and MAC layers that may be handled in a DU.

As different units handle different protocol stack functionalities, there may be a need for inter-node communication between the DU, the CU-UP 21 and the CU-CP 20. This may be achieved via an F1-C interface 23 related to control plane signaling, via an F1-U 24 interface related to user plane signaling for communication between CU and DU and via E1 25 for communication between CU-UP 21 and CU-CP 20.

The E1 25 interface may be understood as a logical interface. It may support the exchange of signalling information between the endpoints. From a logical standpoint, the E1 25 may be understood as a point-to-point interface between a gNB-CU-CP and a gNB-CU-UP. The E1 interface may enable exchange of UE associated information and non-UE associated information. The E1 interface may be understood as a control interface and may be understood to not be used for user data forwarding.

Random Access Channel (RACH) Optimization Purpose

Optimization of the RACH configuration in cells is a Release 9 Self-Organizing Network (SON) feature that may be understood to be key to optimizing the system performance of a mobile network. A poorly configured RACH may result in higher call setup and handover delays due to frequent RACH collisions, or low preamble-detection probability and limited coverage. The amount of uplink resource reserved for RACH may also affect the system capacity. Therefore, a network operator may need to carefully monitor that the RACH parameters are appropriately set, considering factors such as the RACH load, the uplink interference, the traffic patterns and the population under the cell coverage.

The RACH optimization feature may facilitate automatic configuration of Physical Random Access Channel (PRACH) parameters, including the PRACH resource configuration, preamble root sequence and cyclic shift configuration, to avoid preamble collisions with neighboring cells. The principle of this automatic configuration may be understood to be similar to the automatic Physical Cell Identifier (PCI) configuration SON feature: the PRACH configuration information may be included in the 'X2 Setup' and 'eNB Configuration Update' procedures. Therefore, whenever a new eNodeB is initialized and may learn about its neighbors via the Automatic Neighbour Relation (ANR) function, it may at the same time learn the neighboring PRACH configurations. It may then select its own PRACH configuration to avoid conflicts with the neighboring ones.

Whenever a conflict is identified, one of the cells may need to change its configuration, but the algorithm for selecting which cell may need to change and in what manner is not specified. The network operator may also combine PRACH self-optimization with manual configuration if necessary, but this may be typically more prone to errors and more time consuming than automatic RACH optimization. Reporting of RACH Information and Failures.

RACH resources configuration and allocation among different cells may be performed at the network planning phase in a centralized fashion, e.g., by Operation and Maintenance (OAM) or in a distributed fashion, e.g., by a RAN node at gNB-CU and/or gNB-DU. The network may use UE assistance information in terms of a RACH report for a performed RACH procedure.

However, the task becomes more complicated given that these factors may change dynamically. For example, if the antenna tilt is changed in a cell, it may be understood to affect the rates of call arrival and handover in this cell and the surrounding cells, and therefore the RACH load per preamble in all those cells. A change in transmission power settings or handover thresholds may have similar effects.

Whenever such a network configuration change happens, the RACH self-optimization feature may need to automatically make appropriate measurements of the RACH performance and usage in all the affected cells and determine any necessary updates of the RACH parameters.

RACH parameters that may then be adjusted may typically be the following: split of RACH preambles between contention-free access, contention-based access with high payload and contention-based access with low payload, RACH back-off parameter value or the RACH transmission power ramping parameters, and any other parameter may be adjusted if found useful by network operator.

In the following, the signaling designed for RACH optimization over the X2 logical interface as well as the RACH UE assistance information reporting mechanism in LTE will be briefly reviewed. In addition, different types of the RACH procedure in NR and some details on how RACH procedure works will also be explained.

RACH Related Signaling Over the X2 Interface in LTE System

Generally, a RAN node may trigger an analysis of the information reported by the UE internally or in coordination in other RAN nodes. In this regards, as a part of LTE solution, eNB PRACH configuration may be exchanged over the X2 interface by leveraging ENB X2 Setup Request and eNB Configuration update signaling, where the PRACH Configuration Information Element (IE), shown in the following table, may be contained in the Served Cell Information IE. This IE may indicate the PRACH resources used in a neighbor cell.

| IE/Group Name | Presence | IE type and reference | Semantics description | Criticality | Assigned Criticality |
|---|---|---|---|---|---|
| RootSequenceIndex | M | INTEGER (0 ... 837) | See section 5.7.2. in TS 36.211 [10] | — | — |
| ZeroCorrelationZoneConfiguration | M | INTEGER (0 ... 15) | See section 5.7.2. in TS 36.211 [10] | — | — |
| HighSpeedFlag | M | BOOLEAN | TRUE corresponds to Restricted set and FALSE to Unrestricted set. See section 5.7 2 in TS 36.211 [10] | — | — |
| PRACH-FrequencyOffset | M | INTEGER (0 ... 94) | See section 5.7.1 of TS 36.211 [10] | — | — |
| PRACH-ConfigurationIndex | O | INTEGER (0 ... 63) | Mandatory for TDD, shall not be present for FDD. See section 5.7.1. in TS 36.211 [10] | — | — |

Note that such information may be exchanged between RAN nodes with cells identified as neighboring cells. Neighboring cells may be identified by Radio Resource Management (RRM) measurements provided by UEs. Upon detection of a new neighbor, a RAN node may request to set up an X2 interface or later update the configurations if changed. This may be accomplished as part of X2 Setup Request or eNB Configuration signaling which may include PRACH configuration as part of Served Cell Information IE.

In addition to the above-mentioned mechanism to exchange RACH related configuration over the X2 interface as part of X2 Setup and eNB Configuration update signals, a Uu based signaling has been defined to use a UE assistance information to detect the potential issues, and further enhance the RACH performance by performing finer optimization relying on the provided UE assistance information.

Log and Reporting of UE Assistance RACH Information in LTE

In LTE, the report of RACH information when random access procedure is performed may be requested by the network via the UE Information procedure in RRC (section 5.6.5 of 3GPP TS 36.331 V15.3.0 (2018-09)), in the case where a RACH procedure was successful. That procedure is summarized below, as described in RRC specifications:

5.6.5 UE Information 5.6.5.1 General

The UE information procedure is used by E-UTRAN to request the UE to report information. FIG. 3 is a schematic representation of this procedure, which is described next.

5.6.5.2 Initiation

E-UTRAN 30 initiates the procedure by sending the UEInformationRequest message at 31. E-UTRAN should initiate this procedure only after successful security activation.

5.6.5.3 Reception of the UEInformationRequest Message

Upon receiving the UEInformationRequest message, the UE 32 shall, only after successful security activation:

1> if rach-ReportReq is set to true, set the contents of the rach-Report in the UEInformationResponse message as follows:
2> set the numberOfPreamblesSent to indicate the number of preambles sent by MAC for the last successfully completed random access procedure;
2> if contention resolution was not successful as specified in TS 36.321 [6] for at least one of the transmitted preambles for the last successfully completed random access procedure:
3> set the contentionDetected to true;
2> else:
3> set the contentionDetected to false;
. . .
1> else:
2> submit the UEInformationResponse message to lower layers for transmission via SRB1 at 33;

_UEInformationRequest

The UEInformationRequest is the command used by E-UTRAN to retrieve information from the UE.

Signalling radio bearer: SRB1
RLC-SAP: AM
Logical channel: DCCH
Direction: E-UTRAN to UE

| UEInformationRequest message |
|---|

```
-- ASN1START
UEInformationRequest-r9         ::=     SEQUENCE {
    rrc-TransactionIdentifier           RRC-TransactionIdentifier,
    criticalExtensions                  CHOICE {
        c1                              CHOICE {
            ueInformationRequest-r9         UEInformationRequest-r9-IEs,
            spare3 NULL, spare2 NULL, spare1 NULL
        },
        criticalExtensionsFuture        SEQUENCE { }
    }
}
UEInformationRequest-r9-IEs ::= SEQUENCE {
    rach-ReportReq-r9               BOOLEAN
    rlf-ReportReq-r9                BOOLEAN
    nonCriticalExtension            UEInformationRequest-v930-IEs       OPTIONAL
}
. . .
-- ASN1STOP
```

_UEInformationResponse

The UEInformationResponse message is used by the UE to transfer the information requested by the E-UTRAN.

Signalling radio bearer: SRB1 or SRB2 (when logged measurement information is included)
RLC-SAP: AM
Logical channel: DCCH
Direction: UE to E-UTRAN

| UEInformationResp onse message |
|---|

```
-- ASN1START
UEInformationResponse-r9    ::=     SEQUENCE {
UEInormationResponse-r9-IEs ::=     SEQUENCE {
    rach-Report-r9                      SEQUENCE {
        numberOfPreamblesSent-r9            NumberOfPreamblesSent-r11,
```

| UEInformationResp onse message |
| --- |
| contentionDetected-r9    BOOLEAN    OPTIONAL, |
| }  |
| rlf-Report-r9    RLF-Report-r9    OPTIONAL, |
| nonCriticalExtension    UEInformationResponse-v930-IEs    OPTIONAL |
| } |
| NumberOfPreamblesSent-r11 ::=    INTEGER (1..200) |
| -- ASN1STOP |

RACH Configuration in NR

As in LTE, random access procedure may be understood to be described in the NR MAC specifications, and parameters may be configured by RRC e.g., in System Information (SI) or handover, e.g., in RRCReconfiguration with reconfigurationWithSync. Random access may be triggered in many different scenarios, for example, when the UE is in RRC_IDLE or RRC_INACTIVE and may want to access a cell that is camping on, that is, in a transition to RRC_CONNECTED.

In NR, RACH configuration, e.g., RACH-ConfigGeneric and RACH-ConfigCommon, may be broadcasted in System Information Block 1 (SIB1), as part of the servingCellConfigCommon, with both DL and UL configurations, where the RACH configuration may be within the uplinkConfigCommon. The exact RACH parameters may be within what is called initialUplinkBWP, since this may be the part of the UL frequency the UE may be required to access and search for RACH resources.

| RACH-ConfigGeneric information element |
| --- |
| -- ASN1START |
| -- TAG-RACH-CONFIGGENERIC-START |
| RACH-ConfigGeneric ::=    SEQUENCE { |
|    prach-ConfigurationIndex    INTEGER (0..255), |
|    msg1-FDM    ENUMERATED {one, two, four, eight}, |
|    msg1-FrequencyStart    INTEGER (0..maxNrofPhysicalResourceBlocks-1), |
|    zeroCorrelationZoneConfig    INTEGER(0..15), |
|    preambleReceivedTargetPower    INTEGER (-202..-60), |
|    preambleTransMax    ENUMERATED {n3, n4, n5, n6, n7, n8, n10, n20, n50, n100, n200}, |
|    powerRampingStep    ENUMERATED {dB0, dB2, dB4, dB6}, |
|    ra-ResponseWindow    ENUMERATED {sl1, sl2, sl4, sl8, sl10, sl20, sl40, sl80}, |
|    ... |
| } |
| -- TAG-RACH-CONFIGGENERIC-STOP |
| -- ASN1STOP |

| RACH-ConfigCommon information element |
| --- |
| -- ASN1START |
| -- TAG-RACH-CONFIGCOMMON-START |
| RACH-ConfigCommon ::=    SEQUENCE { |
|   rach-ConfigGeneric    RACH-ConfigGeneric |
|   totalNumberOfRA-Preambles    INTEGER (1..63)   OPTIONAL,   -- Need S |
|   ssb-perRACH-OccasionAndCB-PreamblesPerSSB   CHOICE |
|     oneEighth    ENUMERATED {n4, n8, n12, n16, n20, n24, n28, n32, n36, n40, n44, n48, n52, n56, n60, n64}, |
|     oneFourth    ENUMERATED {n4, n8, n12, n16, n20, n24, n28, n32, n36, n40, n44, n48, n52, n56, n60, n64}, |
|     oneHalf    ENUMERATED {n4, n8, n12, n16, n20, n24, n28, n32, n36, n40, n44, n48, n52, n56, n60, n64}, |
|     one    ENUMERATED {n4, n8, n12, n16, n20, n24, n28, n32, n36, n40, n44, n48, n52, n56, n60, n64}, |
|     two    ENUMERATED {n4, n8, n12, n16, n20, n24, n28, n32}, |
|     four    INTEGER (1..16), |
|     eight    INTEGER (1..8), |
|     sixteen    INTEGER (1..4) |
|   } |
| OPTIONAL,   -- Need M |
|   groupBconfigured    SEQUENCE { |
|     ra-MSG3SizeGroupA    ENUMERATED {b56, b144, b208, b282, b480, b640, b800, b72, spare6, spare 5, spare4, spare3, spare2, spare1}, |
|     messagePowerOffsetGroupB    ENUMERATED { minusinfinity, dB0, dB5, dB8, dB10, dB12, dB15, dB18}, |
|     numberOfRA-PreamblesGroupA    INTEGER (1..64) |

| RACH-ConfigCommon information element |  |
|---|---|
| }<br>OPTIONAL, -- Need R |  |
|    ra-ContentionResolutionTimer | ENUMERATED { sf8, sf16, sf24, sf32, sf40, sf48 sf56, sf64}, |
|    rsrp-ThresholdSSB<br>OPTIONAL, -- Need R | RSRP-Range |
|    rsrp-ThresholdSSB-SUL<br>OPTIONAL, -- Cond SUL | RSRP-Range |
|    prach-RootSequenceIndex<br>      1839<br>      1139<br>   }, | CHOICE {<br>   INTEGER (0..837),<br>   INTEGER (0..137), |
|    msg1-SubcarrierSpacing<br>OPTIONAL, -- Cond L139 | SubcarrierSpacing |
|    restrictedSetConfig<br>restrictedSetTypeB}, | ENUMERATED {unrestrictedSet, restrictedSetTypeA, |
|    msg3-transformPrecoder<br>OPTIONAL, -- Need R<br>   ...<br>}<br>-- TAG-RACH-CONFIGCOMMON-STOP<br>-- ASN1STOP | ENUMERATED {enabled} |

Contention-Based RACH (CBRA) in NR

In LTE, the RACH report to assist the network to perform RACH optimization, may contain an indication that a collision was detected. With that information, it may be understood to be clear that at some point before that RACH procedure that has succeeded, that same UE tried to access the network and happened to have a collision.

In NR, a mechanism also exists for contention resolution for contention-based random access. Because in NR transmission may take place via beamforming, whenever a conflict is identified, the beam that may need to change its configuration may need to be determined. Therefore, CBRA may take into consideration the RACH partitioning per beam, in other words, which beam the UE may have selected to communicate with the network.

RACH Partitioning Per Beam in NR

FIG. 4 is a schematic diagram illustrating an example of how Primary Synchronization Signal (PSS) and Secondary Synchronization Signal (SSS) signals may be transmitted in LTE, top panel, and in NR, bottom panel, respectively. The top panel, shows how within an LTE cell, a particular set x of PSS and SSS is transmitted. In an NR cell, on the other hand, PSS and SS signals may be part of the Synchronization Signal Blocks (SSBs), which may be transmitted in a single or multiple beams, as illustrated in the bottom pannel. For instance, in NR, an SSBs may be transmitted in 1 beam, a typical implementation for lower frequencies e.g. below 6 GHz, or in multiple downlink beams, a typical implementation for lower frequencies e.g. below 6 GHz. For the same cell, these SSBs may carry the same Physical Cell Identifier (PCI) and a Master Information Block (MIB).

In a NR, random access resource selection may need to be performed within a cell depending on measurements performed on Synchronization Signal Blocks (SSBs) or Channel State Information Reference signals (CSI-RSs). For standalone operation, that is, to support UEs camping on an NR cell, they may also carry in SIB1 the RACH configuration, which may comprise a mapping between the detected SSB covering the UE at a given point in time and the PRACH configuration, e.g., time, frequency, preamble, etc. to be used. For that, each of these beams may transmit its own SSB which may be distinguished by an SSB index, as shown in the example of the lower panel of FIG. 4.

The mapping between RACH resources and SSBs, or CSI-RS, may also be provided as part of the RACH configuration, in RACH-ConfigCommon. Two parameters may be relevant here: #SSBs-per-PRACH-occasion: ⅛, ¼, ½, 1, 2, 8 or 16, which may be understood to represent the number of SSBs per RACH occasion; and #CB-preambles-per-SSB preambles to each SS-block: within a RACH occasion, which may be understood to represent how many preambles are allocated.

FIG. 5 is a schematic diagram illustrating an example of SSB transmission, wherein an exemplary mapping from SSB index, as transmitted in the PDSCH 50, to PRACH occasion 51 in the PUSCH 52, is depicted. To give a first example, if the number of SSBs per RACH occasion 51 is 1, and if the UE is under the coverage of a specific SSB, e.g., SSB index 2 53, there may be a RACH occasion for that SSB index 2. If the UE moves and is now under the coverage of another specific SSB, e.g., SSB index 5, there may be another RACH occasion for that SSB index 5, that is, each SSB detected by a given UE may have its own RACH occasion. Hence, at the network side, upon detecting a preamble in a particular RACH occasion the network may know exactly which SSB the UE has selected and, consequently, which downlink beam may be covering the UE, so that the network may continue the downlink transmission e.g., Random Access Response (RAR), etc. That factor 1 may be understood to be an indication that each SSB may have its own RACH resource. That is, a preamble detected there may be understood to indicate to the network which SSB the UE has selected, that is, which DL beam the network may need to use to communicate with the UE, such as the one to send the RAR.

Note that each SS-block may typically map to multiple preambles, different cyclic shifts and Zadoff-Chu roots, within a PRACH occasion, so that it may be possible to multiplex different UEs in the same RACH occasions since they may be under the coverage of the same SSB. In a second example, shown in the schematic diagram of FIG. 6, the number of SSBs per RACH occasion is 2. Hence, a preamble received in that RACH occasion may be understood to indicate to the network that one of the two beams are being selected by the UE. So either the network has means via implementation to distinguish these two beams and/or the network may need to perform a beam sweeping in the downlink by transmitting the RAR in both beams, either simultaneously or, transmitting in one, waiting for a response from the UE, and if absent, transmit in the other.

Assuming now that in the first attempt the UE may have selected an SSB, based on measurements performed in that cell, transmitted with initial power a selected preamble associated to the PRACH resource mapped to the selected SSB, and has not received a RAR within the RAR time window, the next paragraphs describe the actions that may be taken by the UE and/or the network. According to the specifications, the UE may still perform preamble re-transmission, as long as a maximum number of allowed transmissions may not have been reached.

The contention resolution in NR is shown below as described in the MAC specifications (3GPP TS 38.321, v. 15.3.0 (2018-09), 3rd Generation Partnership Project; Technical Specification Group Radio Access Network; NR; Medium Access Control (MAC) protocol specification (Release 15)):

5.1.5 Contention Resolution

Once Msg3 is transmitted, the MAC entity shall:
1> start the ra-ContentionResolutionTimer and restart the ra-ContentionResolutionTimer at each HARQ retransmission in the first symbol after the end of the Msg3 transmission;
1> monitor the PDCCH while the ra-ContentionResolutionTimer is running regardless of the possible occurrence of a measurement gap;
1> if notification of a reception of a PDCCH transmission of the SpCell is received from lower layers:
   2> if the C-RNTI MAC CE was included in Msg3:
      3> if the Random Access procedure was initiated for beam failure recovery (as specified in subclause 5.17) and the PDCCH transmission is addressed to the C-RNTI; or
      3> if the Random Access procedure was initiated by a PDCCH order and the PDCCH transmission is addressed to the C-RNTI; or
      3> if the Random Access procedure was initiated by the MAC sublayer itself or by the RRC sublayer and the PDCCH transmission is addressed to the C-RNTI and contains a UL grant for a new transmission:
         4> consider this Contention Resolution successful;
         4> stop ra-ContentionResolutionTimer,
         4> discard the TEMPORARY_C-RNT1,
         4> consider this Random Access procedure successfully completed.
   2> else if the CCCH SDU was included in Msg3 and the PDCCH transmission is addressed to its TEMPORARY_C-RNTI:
      3> if the MAC PDU is successfully decoded:
         4> stop ra-ContentionResolutionTimer,
         4> if the MAC PDU contains a UE Contention Resolution Identity MAC CE; and
         4> if the UE Contention Resolution Identity in the MAC CE matches the CCCH SDU transmitted in Msg3:
            5> consider this Contention Resolution successful and finish the disassembly and demultiplexing of the MAC PDU;
            5> if this Random Access procedure was initiated for SI request:
               6> indicate the reception of an acknowledgement for SI request to upper layers.
            5> else:
               6> set the C-RNTI to the value of the TEMPORARY_C-RNTI;
            5> discard the TEMPORARY_C-RNTI;
            5> consider this Random Access procedure successfully completed.
         4> else:
            5> discard the TEMPORARY_C-RNTI;
            5> consider this Contention Resolution not successful and discard the successfully decoded MAC PDU.
1> if ra-ContentionResolutionTimer expires:
   2> discard the TEMPORARY_C-RNTI;
   2> consider the Contention Resolution not successful.
1> if the Contention Resolution is considered not successful:
   2> flush the HARQ buffer used for transmission of the MAC PDU in the Msg3 buffer;
   2> increment PREAMBLE_TRANSMISSION_COUNTER by 1;
   2> if PREAMBLE_TRANSMISSION_COUNTER= preambleTransMax+1:
      3> indicate a Random Access problem to upper layers.
      3> if this Random Access procedure was triggered for SI request:
         4> consider the Random Access procedure unsuccessfully completed.
   2> if the Random Access procedure is not completed:
      3> select a random backoff time according to a uniform distribution between 0 and the PREAMBLE_BACKOFF;
      3> if the criteria (as defined in subclause 5.1.2) to select contention-free Random Access Resources is met during the backoff time:
         4> perform the Random Access Resource selection procedure (see subclause 5.1.2);
      3> else:
         4> perform the Random Access Resource selection procedure (see subclause 5.1.2) after the backoff time.

5.1.2 Random Access Resource Selection

The MAC entity shall:
1> if the Random Access procedure was initiated for beam failure recovery (as specified in subclause 5.17); and
1> if the beamFailureRecoveryTimer (in subclause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
      3> set the PREAMBLE_INDEX to a ra-PreambleIndex corresponding to the SSB in candidate- BeamRSList which is quasi-colocated with the selected CSI-RS as specified in TS 38.214
2> else:
3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
2> set the PREAMBLE_INDEX to the signalled ra-PreambleIndex;
2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
2> select an SSB with SS-RSRP above rsrp-ThresholdSSB amongst the associated SSBs;
2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
2> select a CSI-RS with CSI-RSRP above rsrp-ThresholdCSI-RS amongst the associated CSI-RSs;
2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
2> if at least one of the SSBs with SS-RSRP above rsrp-ThresholdSSB is available:
3> select an SSB with SS-RSRP above rsrp-ThresholdSSB.
2> else:
3> select any SSB.
2> select a Random Access Preamble corresponding to the selected SSB, from the Random Access Preamble(s) determined according to ra-PreambleStartIndex as specified in TS 38.331 [5];
2> set the PREAMBLE_INDEX to selected Random Access Preamble.
1> else (i.e. for the contention-based Random Access preamble selection):
2> if at least one of the SSBs with SS-RSRP above rsrp-ThresholdSSB is available:
3> select an SSB with SS-RSRP above rsrp-ThresholdSSB.
2> else:
3> select any SSB.

5.1.3 Random Access Preamble Transmission

The MAC entity shall, for each Random Access Preamble:
1> if PREAMBLE_TRANSMISSION_COUNTER is greater than one; and
1> if the notification of suspending power ramping counter has not been received from lower layers; and
1> if SSB or CSI-RS selected is not changed from the selection in the last Random Access Preamble transmission:
2> increment PREAMBLE_POWER_RAMPING_COUNTER by 1.
1> select the value of DELTA_PREAMBLE according to subclause 7.3;
1> set PREAMBLE_RECEIVED_TARGET_POWER to preambleReceivedTargetPower+DELTA_PREAMBLE+(PREAMBLE_POWER_RAMPING_COUNTER−1)×PREAMBLE_POWER_RAMPING_STEP;
1> except for contention-free Random Access Preamble for beam failure recovery request, compute the RA-RNTI associated with the PRACH occasion in which the Random Access Preamble is transmitted;
1> instruct the physical layer to transmit the Random Access Preamble using the selected PRACH occasion, corresponding RA-RNTI (if available), PREAMBLE_INDEX and PREAMBLE_RECEIVED_TARGET_POWER.

The RA-RNTI associated with the PRACH occasion in which the Random Access Preamble is transmitted, is computed as:

$$RA-RNTI = 1 + s\_id + 14 \times t\_id + 14 \times 80 \times f\_id + 14 \times 80 \times 8 \times ul\_carrier\_id$$

where s_id is the index of the first OFDM symbol of the PRACH occasion (0≤s_id<14), t_id is the index of the first slot of the PRACH occasion in a system frame (0≤t_id<80), f_id is the index of the PRACH occasion in the frequency domain (0≤f_id<8), and ul_carrier_id is the UL carrier used for Random Access Preamble transmission (0 for NUL carrier, and 1 for SUL carrier).

5.1.4 Random Access Response Reception

Once the Random Access Preamble is transmitted and regardless of the possible occurrence of a measurement gap, the MAC entity shall:
1> if the contention-free Random Access Preamble for beam failure recovery request was transmitted by the MAC entity:
2> start the ra-Response Window configured in BeamFailureRecoveryConfig at the first PDCCH occasion as specified in TS 38.213 [6] from the end of the Random Access Preamble transmission;
2> monitor for a PDCCH transmission on the search space indicated by recoverySearchSpaceId of the SpCell identified by the C-RNTI while ra-Response Window is running.
1> else:
2> start the ra-Response Window configured in RACH-ConfigCommon at the first PDCCH occasion as specified in TS 38.213 [6] from the end of the Random Access Preamble transmission;
2> monitor the PDCCH of the SpCell for Random Access Response(s) identified by the RA-RNTI while the ra-Response Window is running
1> if notification of a reception of a PDCCH transmission on the search space indicated by recoverySearchSpaceId is received from lower layers on the Serving Cell where the preamble was transmitted; and
1> if PDCCH transmission is addressed to the C-RNTI; and
1> if the contention-free Random Access Preamble for beam failure recovery request was transmitted by the MAC entity:
2> consider the Random Access procedure successfully completed.

1> else if a downlink assignment has been received on the PDCCH for the RA-RNTI and the received TB is successfully decoded:
  2> if the Random Access Response contains a MAC subPDU with Backoff Indicator:
    3> set the PREAMBLE_BACKOFF to value of the BI field of the MAC subPDU using Table 7.2-1, multiplied with SCALING FACTOR BI.
  2> else:
    3> set the PREAMBLE_BACKOFF to 0 ms.
  2> if the Random Access Response contains a MAC subPDU with Random Access Preamble identifier corresponding to the transmitted PREAMBLE_INDEX (see subclause 5.1.3):
    3> consider this Random Access Response reception successful.
  2> if the Random Access Response reception is considered successful:
    3> if the Random Access Response includes a MAC subPDU with RAPID only:
      4> consider this Random Access procedure successfully completed;
      4> indicate the reception of an acknowledgement for SI request to upper layers.
    3> else:
      4> apply the following actions for the Serving Cell where the Random Access Preamble was transmitted:
        5> process the received Timing Advance Command (see subclause 5.2);
        5> indicate the preambleReceivedTargetPower and the amount of power ramping applied to the latest Random Access Preamble transmission to lower layers (i.e. (PREAMBLE_POWER_RAMPING_ COUNTER−1)× PREAMBLE_POWER_RAMPING_STEP);
        5> if the Serving Cell for the Random Access procedure is SRS-only SCell:
          6> ignore the received UL grant.
        5> else:
          6> process the received UL grant value and indicate it to the lower layers.
      4> if the Random Access Preamble was not selected by the MAC entity among the contention-based Random Access Preamble(s):
        5> consider the Random Access procedure successfully completed.
      4> else:
        5> set the TEMPORARY_C-RNTI to the value received in the Random Access Response;
        5> if this is the first successfully received Random Access Response within this Random Access procedure:
          6> if the transmission is not being made for the CCCH logical channel:
            7> indicate to the Multiplexing and assembly entity to include a C-RNTI MAC CE in the subsequent uplink transmission.
          6> obtain the MAC PDU to transmit from the Multiplexing and assembly entity and store it in the Msg3 buffer.
NOTE: If within a Random Access procedure, an uplink grant provided in the Random Access Response for the same group of contention-based Random Access Preambles has a different size than the first uplink grant allocated during that Random Access procedure, the UE behavior is not defined.
  1> if ra-Response Window configured in BeamFailureRecoveryConfig expires and if a PDCCH transmission on the search space indicated by recoverySearchSpaceId addressed to the C-RNTI has not been received on the Serving Cell where the preamble was transmitted; or
  1> if ra-Response Window configured in RACH-ConfigCommon expires, and if the Random Access Response containing Random Access Preamble identifiers that matches the transmitted PREAMBLE_INDEX has not been received:
    2> consider the Random Access Response reception not successful;
    2> increment PREAMBLE_TRANSMISSION_ COUNTER by 1;
    2> if PREAMBLE_TRANSMISSION_COUNTER= preambleTransMax+1:
      3> if the Random Access Preamble is transmitted on the SpCell:
        4> indicate a Random Access problem to upper layers;
        4> if this Random Access procedure was triggered for SI request:
          5> consider the Random Access procedure unsuccessfully completed.
      3> else if the Random Access Preamble is transmitted on a SCell:
        4> consider the Random Access procedure unsuccessfully completed.
    2> if the Random Access procedure is not completed:
      3> select a random backoff time according to a uniform distribution between 0 and the PREAMBLE_BACKOFF;
      3> if the criteria (as defined in subclause 5.1.2) to select contention-free Random Access Resources is met during the backoff time:
        4> perform the Random Access Resource selection procedure (see subclause 5.1.2);
      3> else:
        4> perform the Random Access Resource selection procedure (see subclause 5.1.2) after the backoff time.

The MAC entity may stop ra-Response Window (and hence monitoring for Random Access Response(s)) after successful reception of a Random Access Response containing Random Access Preamble identifiers that matches the transmitted PREAMBLE_INDEX. HARQ operation is not applicable to the Random Access Response reception.

2.1.7. Contention-Free Random Access (CFRA) in NR and fallback to CBRA

In NR, as in LTE, the UE may be configured to perform CFRA e.g., during handovers. That configuration may be comprised in the reconfigurationWithSync of IE ReconfigurationWithSync, which may be comprised in the CellGroupConfig IE, transmitted in the RRCReconfiguration message, as shown below:

```
ReconfigurationWithSync ::=   SEQUENCE {
    spCellConfigCommon        ServingCellConfigCommon
OPTIONAL,      -- Need M
    newUE-Identity            RNTI-Value
    t304                      ENUMERATED {ms50, ms100, ms150, ms200, ms500, ms1000,
ms2000, ms10000},
    rach-ConfigDedicated      CHOICE {
        uplink                    RACH-ConfigDedicated,
        supplementaryUplink       RACH-ConfigDedicated
    }
OPTIONAL,      -- Need N
    ...,
    [[
    smtc                      SSB-MTC
OPTIONAL       -- Need S
    ]]
}
```

| RACH-ConfigDedicated information element |
|---|

```
-- ASN1START
-- TAG-RACH-CONFIG-DEDICATED-START
RACH-ConfigDedicated ::=        SEQUENCE {
    cfra                        CFRA OPTIONAL, -- Need S
    ra-Prioritization           RA-Prioritization
OPTIONAL, -- Need N
    ...
}
CFRA ::=                        SEQUENCE {
    occasions                   SEQUENCE {
        rach-ConfigGeneric          RACH-ConfigGeneric
        ssb-perRACH-Occasion        ENUMERATED {oneEighth, oneFourth, oneHalf, one, two,
four, eight, sixteen}   OPTIONAL    -- Cond SSB-CFRA
    }
OPTIONAL, -- Need S
    resources                   CHOICE {
        ssb                         SEQUENCE {
            ssb-ResourceList            SEQUENCE (SIZE(1..maxRA-SSB-Resources)) OF CFRA-SSB-
Resource,
            ra-ssb-OccasionMaskIndex    INTEGER (0..15)
        },
        csirs                       SEQUENCE {
            csirs-ResourceList          SEQUENCE (SIZE(1..maxRA-CSIRS-Resources)) of CFRA-
CSIRS-Resource,
            rsrp-ThresholdCSI-RS        RSRP-Range
        }
    },
    ...,
    [[
    totalNumberOfRA-Preambles-v1530 INTEGER (1..63)                OPTIONAL      --
Cond Occasions
    ]]
}
CFRA-SSB-Resource ::=           SEQUENCE {
    ssb                         SSB-Index
    ra-PreambleIndex            INTEGER (0..63),
    ...
}
CFRA-CSIRS-Resource ::=         SEQUENCE {
    csi-RS                      CSI-RS-Index,
    ra-OccasionList             SEQUENCE (SIZE(1..maxRA-OccasionsPerCSIRS)) OF INTEGER
(0..maxRA-Occasions-1),
    ra-PreambleIndex            INTEGER (0..63),
    ...
}
-- TAG-RACH-CONFIG-DEDICATED-STOP
-- ASN1STOP
```

One first difference shown above, that is already highlighted in the section entitled "RACH configuration in NR" is that RACH resources may be mapped to beams, e.g., SSBs or CSI-RS resources that may be measured by the UE. Hence, when CFRA resources are provided they may be also mapped to beams and this may be done only for a subset of beams in a given target cell.

The consequence is that to use CFRA resources, the UE may need to select a beam for which it has CFRA resources configured in the dedicated configuration. In the case of SSBs, for example, that may be found in the ssb-ResourceList which is a SEQUENCE (SIZE(1..maxRA-SSB-Resources)) OF CFRA-SSB-Resource.

If an analogy with LTE were to be made, that is, if the NR solution would have been the same as LTE, upon selecting a beam with CFRA resource, e.g. a beam from the configured list, and not receiving the RAR, the UE would keep selecting the same resource and ramp the power before retransmitting the preamble. However, as in the case of NR CBRA, the UE has the option upon every failed attempt to select another beam. And, that another beam may either be in the list of beams for CFRA or it may not. In the case the selected beam is not, the UE may perform CBRA.

It may also be noticed that there may be a fallback between CSI-RS selection to SSB selection, in case CFRA may be provided for CSI-RS resources.

That is shown below, as captured in the MAC specifications (3GPP TS 38.331 V15.3.0 (2018-09), 3rd Generation Partnership Project; Technical Specification Group Radio Access Network; NR; Radio Resource Control (RRC) protocol specification (Release 15)):

5.1.2 Random Access Resource Selection

The MAC entity shall:

1> if the Random Access procedure was initiated for beam failure recovery (as specified in subclause 5.17); and
1> if the beamFailureRecoveryTimer (in subclause 5.17) is either running or not configured; and
1> if the contention-free Random Access Resources for beam failure recovery request associated with any of the SSBs and/or CSI-RSs have been explicitly provided by RRC; and
1> if at least one of the SSBs with SS-RSRP above rsrp-ThresholdSSB amongst the SSBs in candidateBeamRSList or the CSI-RSs with CSI-RSRP above rsrp-ThresholdCSI-RS amongst the CSI-RSs in candidateBeamRSList is available:
   2> select an SSB with SS-RSRP above rsrp-ThresholdSSB amongst the SSBs in candidateBeamRSList or a CSI-RS with CSI-RSRP above rsrp-ThresholdCSI-RS amongst the CSI-RSs in candidateBeamRSList;
   2> if CSI-RS is selected, and there is no ra-PreambleIndex associated with the selected CSI-RS:
      3> set the PREAMBLE_INDEX to a ra-PreambleIndex corresponding to the SSB in candidateBeamRSList which is quasi-colocated with the selected CSI-RS as specified in TS 38.214 [7].
   2> else:
      3> set the PREAMBLE_INDEX to a ra-PreambleIndex corresponding to the selected SSB or CSI-RS from the set of Random Access Preambles for beam failure recovery request.
1> else if the ra-PreambleIndex has been explicitly provided by PDCCH; and
1> if the ra-PreambleIndex is not 0b000000:
   2> set the PREAMBLE_INDEX to the signalled ra-PreambleIndex;
   2> select the SSB signalled by PDCCH.
1> else if the contention-free Random Access Resources associated with SSBs have been explicitly provided in rach-ConfigDedicated and at least one SSB with SS-RSRP above rsrp-ThresholdSSB amongst the associated SSBs is available:
   2> select an SSB with SS-RSRP above rsrp-ThresholdSSB amongst the associated SSBs;
   2> set the PREAMBLE_INDEX to a ra-PreambleIndex corresponding to the selected SSB.
1> else if the contention-free Random Access Resources associated with CSI-RSs have been explicitly provided in rach-ConfigDedicated and at least one CSI-RS with CSI-RSRP above rsrp-ThresholdCSI-RS amongst the associated CSI-RSs is available:
   2> select a CSI-RS with CSI-RSRP above rsrp-ThresholdCSI-RS amongst the associated CSI-RSs;
   2> set the PREAMBLE_INDEX to a ra-PreambleIndex corresponding to the selected CSI-RS.
1> else if the Random Access procedure was initiated for SI request (as specified in TS 38.331 [5]); and
1> if the Random Access Resources for SI request have been explicitly provided by RRC:
   2> if at least one of the SSBs with SS-RSRP above rsrp-ThresholdSSB is available:
      3> select an SSB with SS-RSRP above rsrp-ThresholdSSB.
   2> else:
      3> select any SSB.
   2> select a Random Access Preamble corresponding to the selected SSB, from the Random Access Preamble(s) determined according to ra-PreambleStartIndex as specified in TS 38.331 [5];
   2> set the PREAMBLE_INDEX to selected Random Access Preamble.
1> else (i.e. for the contention-based Random Access preamble selection):
   2> if at least one of the SSBs with SS-RSRP above rsrp-ThresholdSSB is available:
      3> select an SSB with SS-RSRP above rsrp-ThresholdSSB.
   2> else:
      3> select any SSB.
1> if the Random Access procedure was initiated for SI request (as specified in TS 38.331 [5]); and 1> if ra-AssociationPeriodIndex and si-RequestPeriod are configured:

The RACH optimization legacy mechanisms for LTE are not re-adaptable to NR. As stated earlier, a poorly configured RACH may result in delays, limited coverage, interference and affected system capacity.

SUMMARY

The NR RAT, part of the NG RAN system, has a new structure for the configuration of RACH resources and processes when compared to LTE. In NR RACH, resources and processes may be configured on a per beam basis, whereas in LTE RACH resources may be understood to be defined only on a cell granularity. Cell beams may be characterized by specific reference signals and communication channels. Therefore, mechanisms to detect and resolve RACH configuration conflicts in NR may require to identify the downlink reference signal beams whose RACH resources may be in conflict, as well as to optimize the RACH resources for such beams, so that no new conflict may be created with the RACH resource configuration of downlink reference signal beams belonging to other neighbouring cells.

Typically, beams signals and channels may not always be available in time for a given coverage area. The reason for this is that beams "sweep", namely their availability in terms of RS and communication channels may change in the time and spatial domain given that the beam orientation may be swept across a pre-set coverage area. Furthermore, the split architecture followed in NR and in other RATs such as E-UTRAN, may be understood to imply that information that may be needed to perform RACH optimization, such as RACH configurations of cells within a neighbourhood, indications on whether a possible RACH configuration conflict exists, indication of changes of RACH configuration to solve a RACH configuration conflict, may need to be exchanged between gNB-CU and gNB-DU, in the specific example of NR, or in general between the CU and the DU of the specific high layer split architecture for that RAT.

For example, while a CU may be aware of a conflict, it may not be able to change the RACH resources. Similarly, while a DU may be able to change RACH resources, it may not know the actual configuration of RACH resources of the neighbouring cells, which may be known by the CU.

The above factors create a problem when a RACH optimization solution may need to be supported because the legacy mechanisms for LTE, such as those described in the background section, are not re-adaptable to NR, hence new solutions may be needed.

Certain aspects of the present disclosure and their embodiments may provide solutions to this challenge or other challenges. There are, proposed herein, various embodiments which address one or more of the issues disclosed herein.

Embodiments herein may be understood to be related to a method for resolving RACH configuration conflicts with detection at a gNB-CU.

It is an object of embodiments herein to improve the handling of a Random Access Channel (RACH) configuration. It is a particular object of embodiments herein to improve the handling of a RACH configuration in a wireless communications network with a Radio Access Technology (RAT) with a split architecture, with a Centralized Unit (CU), and a Distributed Unit (DU).

According to a first aspect of embodiments herein, the object is achieved by a method performed by a first network node. The method is for handling a RACH configuration. The first network node operates in a wireless communications network with a RAT with a split architecture, wherein the first network node is a CU, and a second network node is a DU. The first network node detects a conflict between a first RACH configuration in a first cell, the first cell being a served cell, and a second RACH configuration in a second cell. The second cell is a neighbor cell to the first cell. The first network node then sends a first indication to the second network node operating in the wireless communications network. The first indication is based on the detected conflict. The first indication comprises at least one of: i) a notification of the conflict for the served cell, ii) assistance information associated to the detected conflict to assist the second network node to resolve the detected conflict for the served cell, iii) a request for assistance information associated to the detected conflict to assist the first network node to resolve the detected conflict for the served cell, and iv) a request for the second network node to resolve the detected conflict for the served cell. The first network node then receives one or more second indications from the second network node. The one or more second indications are based on the sent first indication. At least one of the received one or more second indications is based on a result of a verification of an existence of the detected conflict.

According to a second aspect of embodiments herein, the object is achieved by a method performed by the second network node. The method is for handling a RACH configuration. The second network node operates in the wireless communications network with the RAT with a split architecture, wherein the second network node is a DU, and the first network node is a CU. The second network node receives the first indication from the first network node operating in the wireless communications network. The first indication is based on the conflict between the first RACH configuration in the first cell, the first cell being a served cell, and the second RACH configuration in the second cell. The second cell is a neighbor cell to the first cell. The first indication comprises at least one of: i) the notification of the conflict for the served cell, ii) the assistance information associated to the detected conflict to assist the second network node to resolve the detected conflict for the served cell, iii) the request for assistance information associated to the detected conflict to assist the first network node to resolve the detected conflict for the served cell, and iv) the request for the second network node to resolve the detected conflict for the served cell. The second network node verifies an existence of the conflict based on the received first indication. The second network node sends the one or more second indications to the first network node. At least one of the sent one or more second indications is based on a result of the verification.

According to a third aspect of embodiments herein, the object is achieved by a the first network node. The first network node is for handling the RACH configuration. The first network node is configured to operate in the wireless communications network with the RAT with the split architecture, wherein the first network node is configured to be a CU, and the second network node is configured to be a DU. The first network node is configured to detect the conflict between the first RACH configuration in the first cell, the first cell being configured to be a served cell, and the second RACH configuration in the second cell. The second cell is configured to be a neighbor cell to the first cell. The first network node is further configured to send the first indication to the second network node configured to operate in the wireless communications network. The first indication is configured to be based on the detected conflict. The first indication is configured to comprise at least one of: i) the notification of the conflict for the served cell, ii) the assistance information associated to the detected conflict to assist the second network node to resolve the detected conflict for the served cell, iii) the request for assistance information configured to be associated to the detected conflict to assist the first network node to resolve the detected conflict for the served cell, and iv) the request for the second network node to resolve the detected conflict for the served cell. The first network node if also configured to receive the one or more second indications from the second network node. The one or more second indications are configured to be based on the sent first indication. At least one of the received one or more second indications is configured to be based on a result of a verification of the existence of the detected conflict.

According to a fourth aspect of embodiments herein, the object is achieved by the second network node, for handling the RACH configuration. The second network node is configured to operate in the wireless communications network the RAT with the split architecture, wherein the second network node is configured to be a DU, and the first network node is configured to be a CU. The second network node is further configured to receive the first indication from the first network node configured to operate in the wireless communications network. The first indication is configured to be based on the conflict between the first RACH configuration in the first cell, the first cell being configured to be a served cell, and the second RACH configuration in the second cell. The second cell is configured to be a neighbor cell to the first cell. The first indication is configured to comprise at least one of: i) the notification of the conflict for the served cell, ii) the assistance information configured to be associated to the detected conflict to assist the second network node to resolve the detected conflict for the served cell, iii) the request for assistance information configured to be associated to the detected conflict to assist the first network node to resolve the detected conflict for the served cell, and iv) the request for the second network node to resolve the detected conflict for the served cell. The second network node is further configured to verify the existence of the conflict based on the received first indication. The second network node is further configured to send one or more second indications to the first network node 111, wherein at least one of the one or more second indications is configured to be based on a result of the verification.

By the first network node detecting the conflict between the first RACH configuration in the first cell, the first cell being a served cell, and the second RACH configuration in the second cell, and sending the first indication to the second network node, the first network node enables to resolve the detected conflict, once the existence of the detected conflict may have been verified by the second network node. In a split RAN architecture, wherein the first network node is a CU, and the second network node is a DU, the first network node may have knowledge of the RACH resource configuration for all cells of the second network node, as well as the RACH resource configuration of neighbouring cells controlled by DUs connected to a neighbouring CU. As such, the first network node may determine whether the RACH configuration of any cell, or SSB beam, of the second network node may overlap with the RACH resources used by a cell, or SSB beam, of a neighbouring DU, thereby detecting a conflict between the first RACH configuration in the first cell, the first cell being a served cell, and the second RACH configuration in the second cell, the second cell being cell of a neighbor DU.

In some embodiments, the first network node may send a notification of the conflict to the second network node. In some embodiments, the first network node may enable to resolve the detected conflict by resolving it itself, by first sending the request for assistance information associated to the detected conflict to assist the first network node to resolve the detected conflict, and then receiving the one or more second indications. Upon receiving the notification, the second network node may determine whether a RACH configuration conflict exists for the served cell indicated in the notification with a neighboring cell. Such determination may not be performed by the first network node. The second network node may achieve this, for instance, by measuring statistics of the RACH performance for the indicated cell. Therefore, in one exemplifying example, the second network node may send assistance information associated to the detected conflict to the first network node, the assistance information comprising an either a positive acknowledgement, or a negative acknowledgment of the detected conflict.

In some embodiments, the first network node may enable to resolve the detected conflict by sending the request for the second network node to resolve the detected conflict. The first network node may provide assistance information associated to the detected conflict to assist the second network node to resolve the detected conflict for the served cell.

By the second network node receiving the first indication from the first network node, the second network node is enabled to verify the existence of the conflict, and then enable to resolve the detected conflict. In some embodiments, the second network node may receive a notification of the conflict from the first network node. In some embodiments, the second network node may enable to resolve the detected conflict by resolving it itself, by receiving the request for the second network node to resolve the detected conflict. The second network node may receive assistance information associated to the detected conflict from the first network node, to assist the second network node to resolve the detected conflict for the served cell. In some embodiments, the second network node may enable the first network node to resolve the detected conflict by first receiving the request for assistance information associated to the detected conflict from the first network node to assist the first network node to resolve the detected conflict, and then sending the one or more second indications.

BRIEF DESCRIPTION OF THE DRAWINGS

Examples of embodiments herein are described in more detail with reference to the accompanying drawings, and according to the following description.

FIG. 16 is a schematic block diagram illustrating two non-limiting examples, a) and b), of a first network node, according to embodiments herein.

FIG. 17 is a schematic block diagram illustrating two non-limiting examples, a) and b), of a second network node, according to embodiments herein.

FIG. 22 is a flowchart depicting embodiments of a method in a communications system including a host computer, a base station and a user equipment, according to embodiments herein.

FIG. 23 is a flowchart depicting embodiments of a method in a communications system including a host computer, a base station and a user equipment, according to embodiments herein.

FIG. 24 is a flowchart depicting embodiments of a method in a communications system including a host computer, a base station and a user equipment, according to embodiments herein.

FIG. 25 is a flowchart depicting embodiments of a method in a communications system including a host computer, a base station and a user equipment, according to embodiments herein.

DETAILED DESCRIPTION

As part of the development of embodiments herein, one or more challenges with the existing technology have been identified and discussed in the Summary section.

Embodiments herein may be understood to disclose a method for detecting and resolving RACH configuration conflicts between neighboring cells served by either different gNB-DUs either within the same gNB, that is, with gNB-DUs connected to the same gNB-CU, or belonging to different gNBs, that is, with gNB-DUs connected to the different gNB-CUs.

The building blocks of the embodiments herein are listed below.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 1:
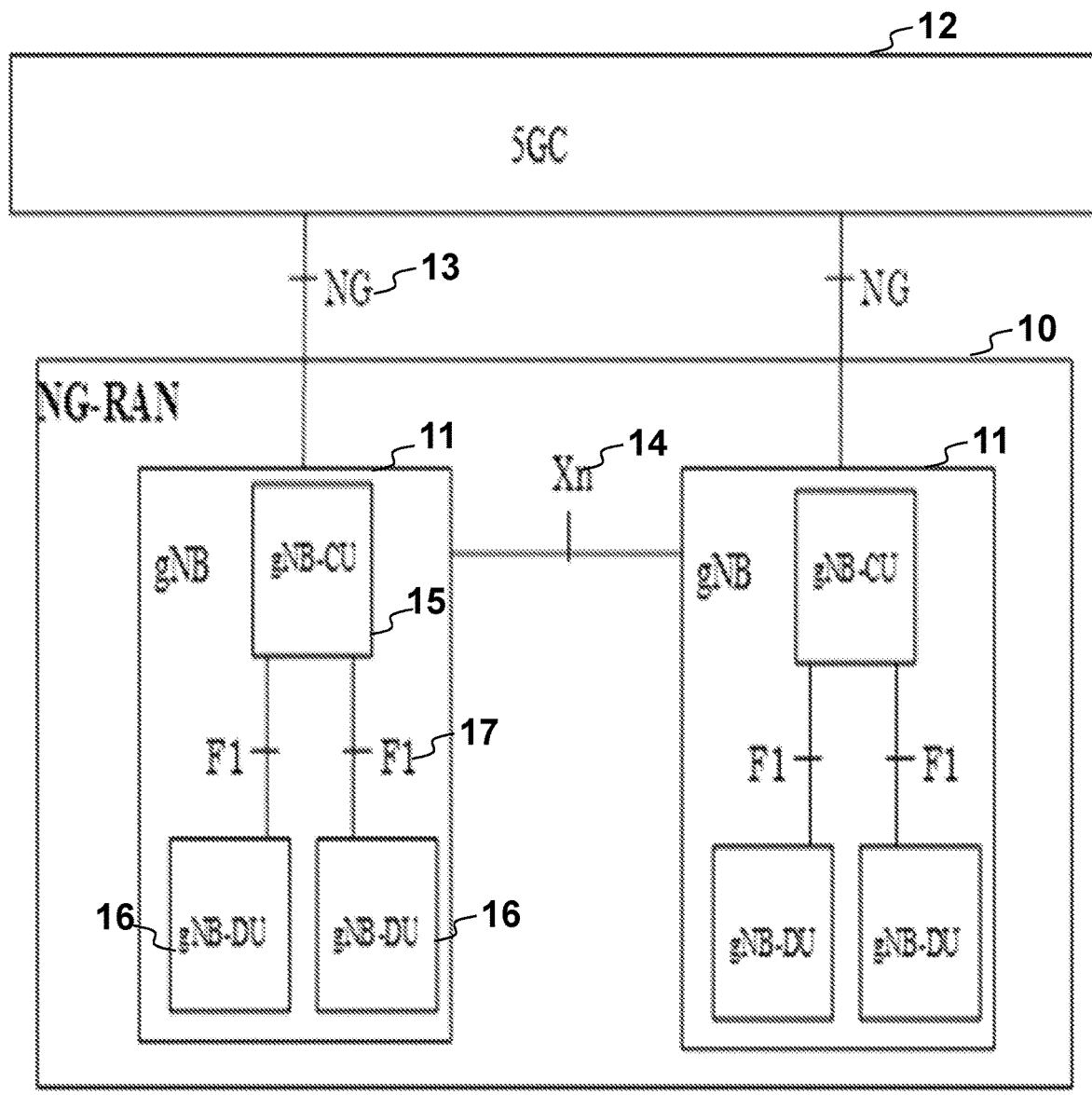
FIG. 1 is a schematic diagram illustrating an example of a NR architecture overview.
Figure 2:
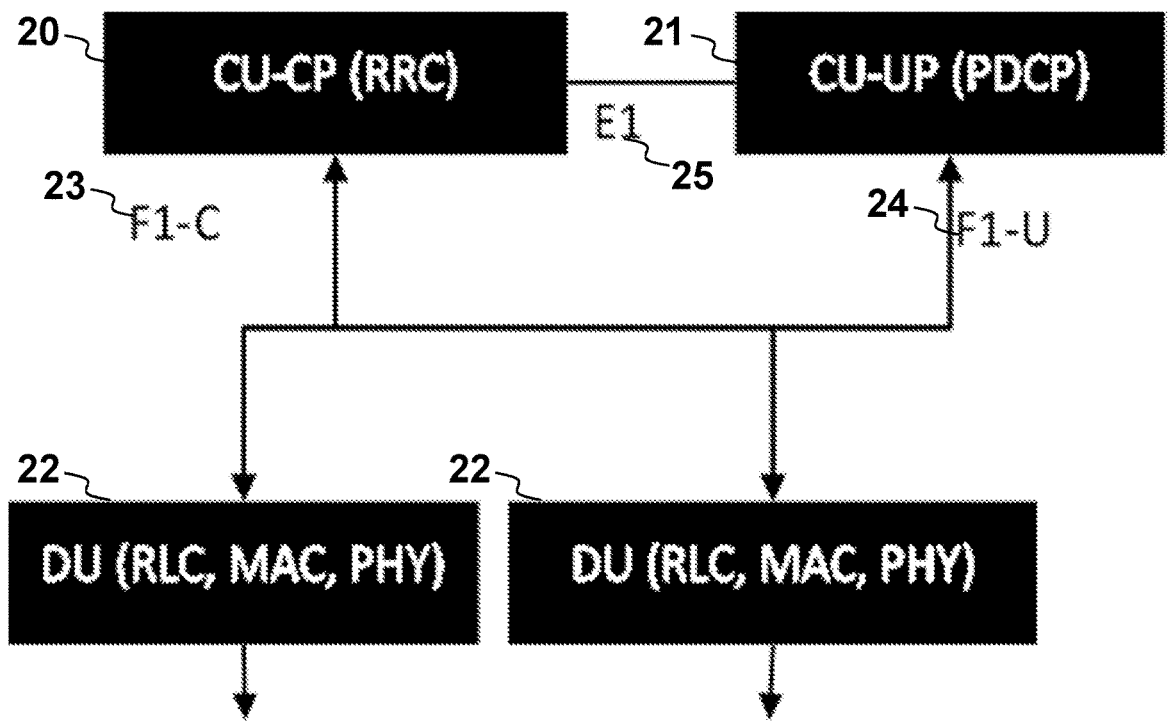
FIG. 2 is a signalling diagram depicting an example of split gNB architecture in NG RAN.
Figure 3:
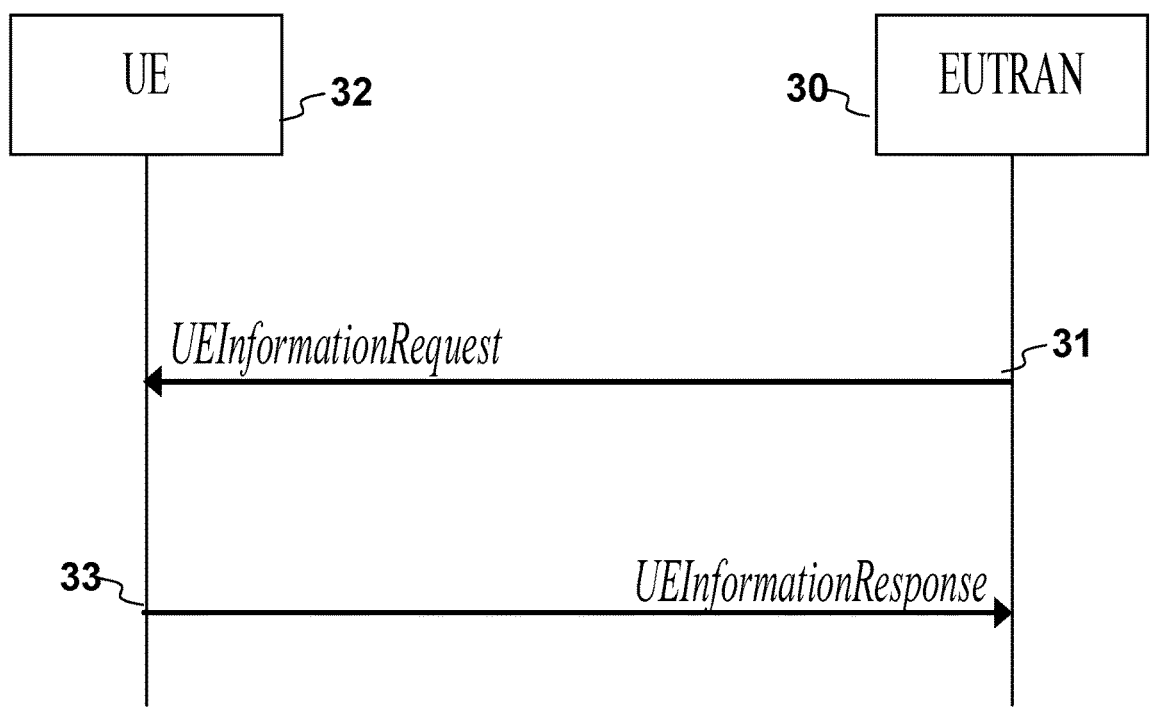
FIG. 3 is a signalling diagram depicting an example of UE information procedure as depicted in Figure 5.6.5.1-1 of 3GPP TS 36.331 V15.3.0 (2018-09).
Figure 4:
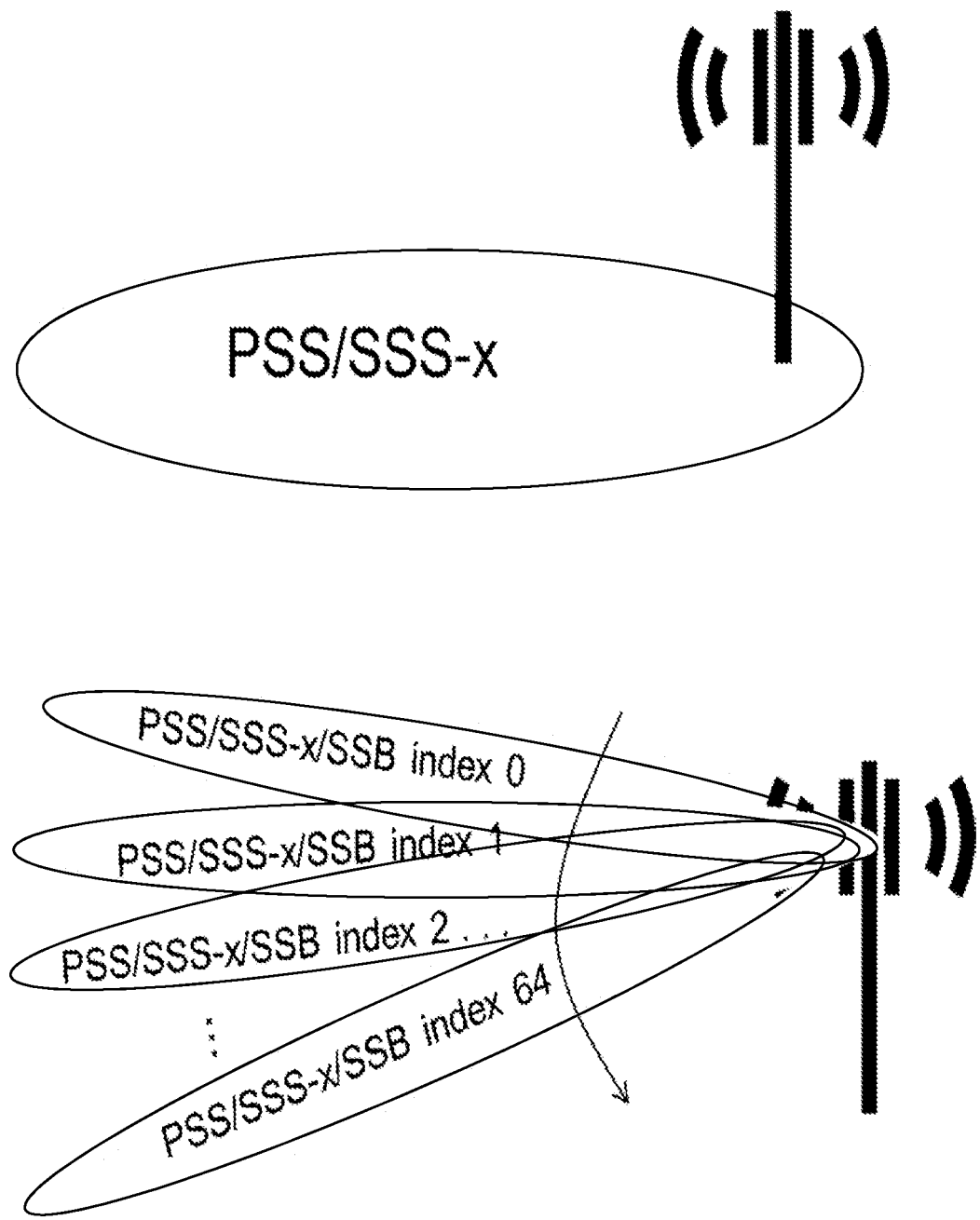
FIG. 4 is a signalling diagram illustrating an example of beam transmission in NR.
Figure 5:
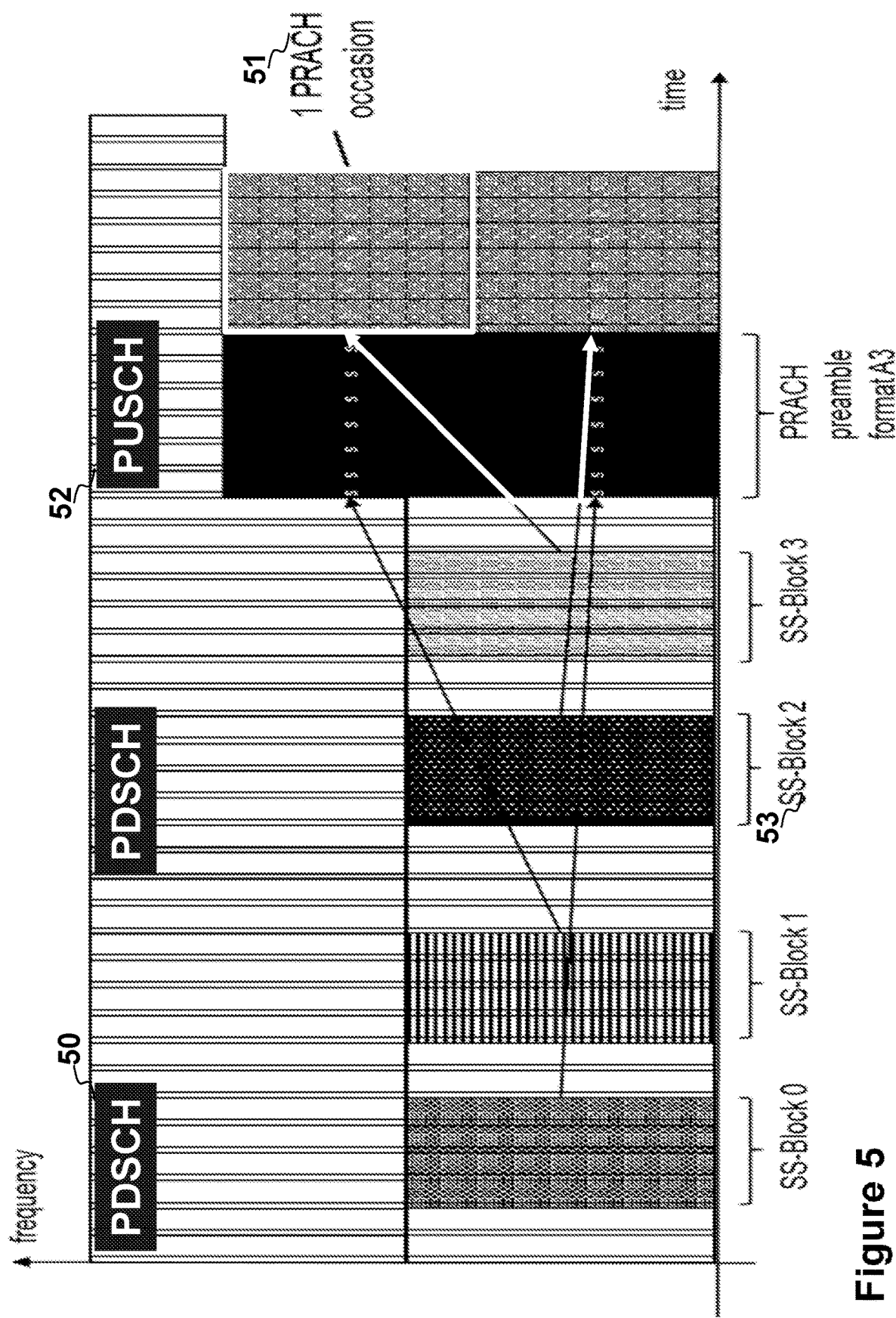
FIG. 5 is a schematic diagram illustrating an example of SSB transmission.
Figure 6:
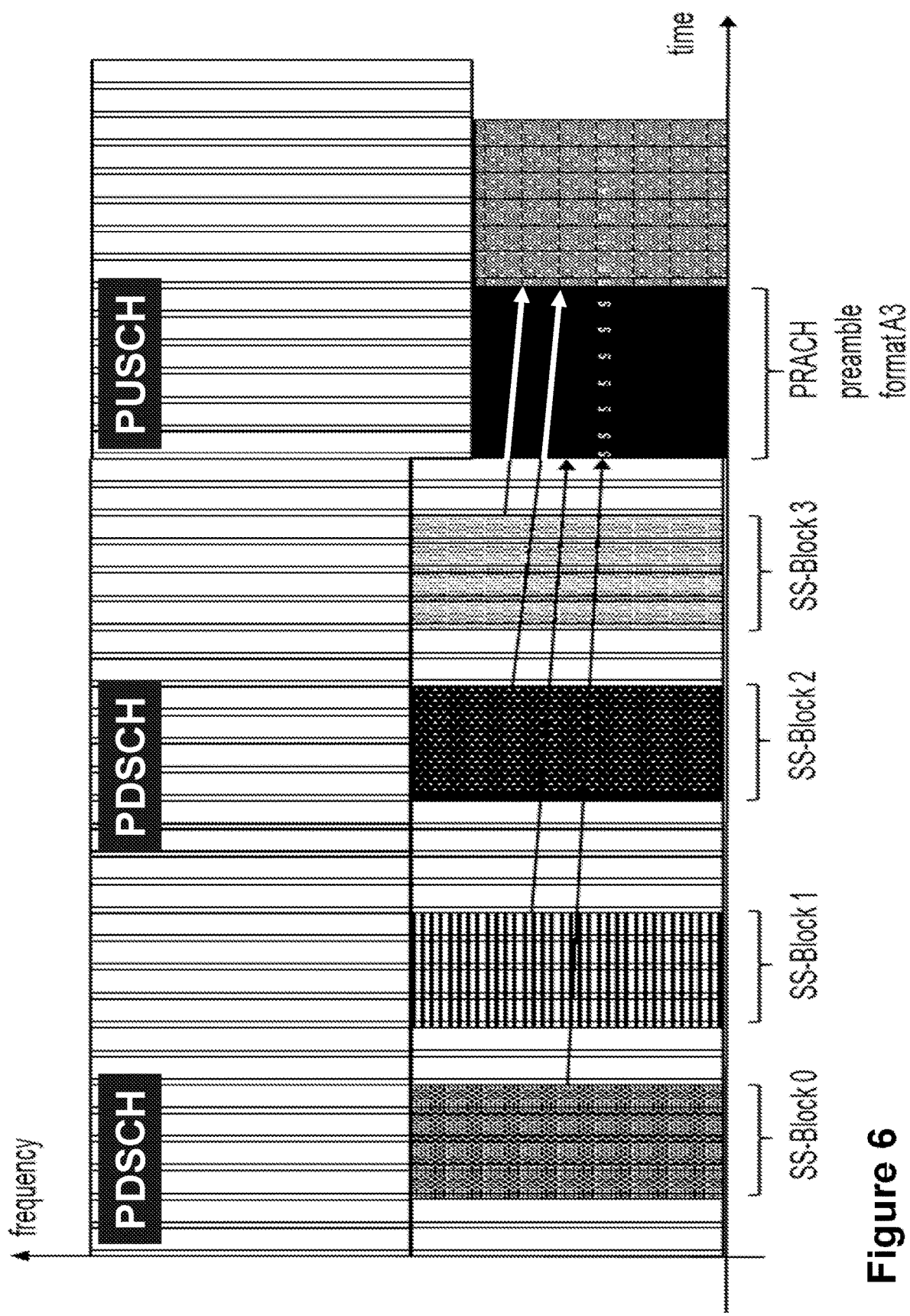
FIG. 6 is a schematic diagram illustrating another example of SSB transmission.
Figure 7:
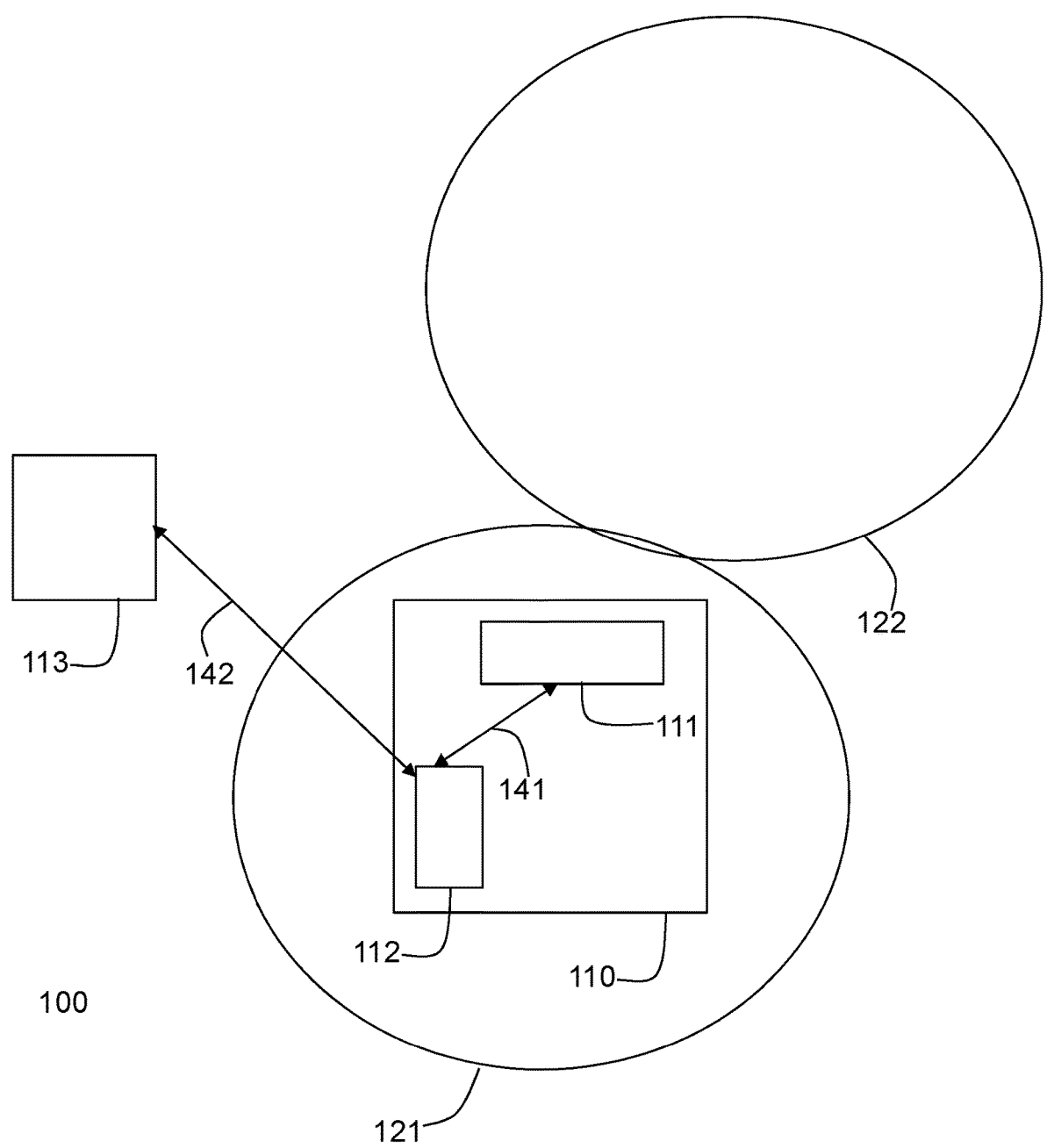
FIG. 7 is a schematic diagram illustrating a wireless communications network, according to embodiments herein.

FIG. 7 depicts a non-limiting example of a wireless communications network 100, sometimes also referred to as a wireless communications system, cellular radio system, or cellular network, in which embodiments herein may be implemented. The wireless communications network 100 may typically be a 5G system, 5G network, NR-U or Next Gen System or network, Licensed-Assisted Access (LAA), or MulteFire. The wireless communications network 100 may support a younger system than a 5G system. The wireless communications network 100 may support other technologies, such as, for example Long-Term Evolution (LTE), LTE-Advanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, etc. . . . . Other examples of other technologies the wireless communications network 100 may support may be Wideband Code Division Multiple Access (WCDMA), Universal Terrestrial Radio Access (UTRA) TDD, Global System for Mobile Communications (GSM) network, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), NarrowBand Internet of Things (NB-IoT), or any cellular network or system. Thus, although terminology from 5G/NR and LTE may be used in this disclosure to exemplify embodiments herein, this should not be seen as limiting the scope of the embodiments herein to only the aforementioned systems.

The wireless communications network 100 may comprise a plurality of network nodes, whereof a network node 110, a first network node 111 and a second network node 112 and a third network node 113 are depicted in the non-limiting example of FIG. 7.

Any, or both, of the first network node 111, and the second network node 112 may be co-localized, or be part of the network node 110, as depicted in panel in FIG. 7. The network node 110 may be, e.g., a radio network node or access node, such as a radio base station, or any other network node with similar features capable of serving a user equipment, such as a wireless device or a machine type communication device, in the wireless communications network 100. The first network node 111 may be a gNB-CU, or a network node with similar functionality. The second network node 112 may be a gNB-DU, or a network node with similar functionality. This particular example is depicted in the non-limiting example of FIG. 7.

The third network node 113 may be another network node, or a core network node. In some examples, the third network node 113 may be an Orchestration and Management (OAM) node, or OAM network node, or a node with similar functionality.

The wireless communications network 100 covers a geographical area which may be divided into cell areas, wherein each cell area may be served by a network node, although, one network node may serve one or several cells. In the non-limiting example of FIG. 7, the wireless communications network 100 comprises a first cell 121 and a second cell 122. As depicted in FIG. 7, the first cell 121 may be a served cell. The first cell 121 may be served by the network node 110, the first network node 111, and/or the second network node 112. The second cell 122 may be a neighbor cell to the first cell 121. In the context of this disclosure, that the second cell 122 may be a neighbor cell to the first cell 121 may be understood to mean that the second cell 122 may be a cell of a "neighbor DU". That is, a DU connected to a "neighbor CU" of the first network node 111, which may be understood to refer to a CU sharing an Xn interface with the first network node 111. In some particular examples, that the second cell 122 may be a neighbor cell to the first cell 121 may be understood to mean that the second cell 122 may be located in a physical proximity of the first cell 121. Any of the network node 110, the first network node 111, and the second network node 112 may be of different classes, such as, e.g., macro base station (BS), home BS or pico BS, based on transmission power and thereby also cell size. It may be understood that when co-localized, or being comprised in the same node, the network node 110, the first network node 111, and the second network node 112 may be of the same class. Any of the network node 110, the first network node 111 and the second network node 112 may be directly connected to one or more core networks, which are not depicted in FIG. 7 to simplify the Figure. In some examples, any of the network node 110, the first network node 111, and the second network node 112 may be a distributed node, such as a virtual node in the cloud, and it may perform its functions entirely on the cloud, or partially, in collaboration with a radio network node.

A plurality of wireless devices, such as a user equipment, may be located in the wireless communication network 100. The user equipment, e.g., a 5G UE, may be a wireless communication device which may also be known as e.g., a UE, a mobile terminal, wireless terminal and/or mobile station, a mobile telephone, cellular telephone, or laptop with wireless capability, just to mention some further examples. The user equipment may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. The user equipment that may be comprised in the wireless communications network 100 may be understood to be enabled to communicate wirelessly in the wireless communications network 100. The communication may be performed e.g., via a RAN, and possibly the one or more core networks, which may be comprised within the wireless communications network 100.

The first network node 111 may be configured to communicate in the wireless communications network 100 with the second network node 112 over a first link 141, e.g., a wired link. The second network node 112 may be configured to communicate in the wireless communications network 100 with the third network node 113 over a second link 142, e.g., a wired link or a radio link.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In general, the usage of "first", "second", "third" and/or "fourth" herein may be understood to be an arbitrary way to denote different elements or entities, and may be understood to not confer a cumulative or chronological character to the nouns they modify, unless otherwise noted, based on context.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first network node, such as the first network node 111, e.g., a gNB-CU, and embodiments related to a second network node, such as the second network node 112, e.g., a gNB-DU. Hereafter, the terminology first network node/gNB-DU and second network node/gNB-CU is used interchangeably.

Figure 8:
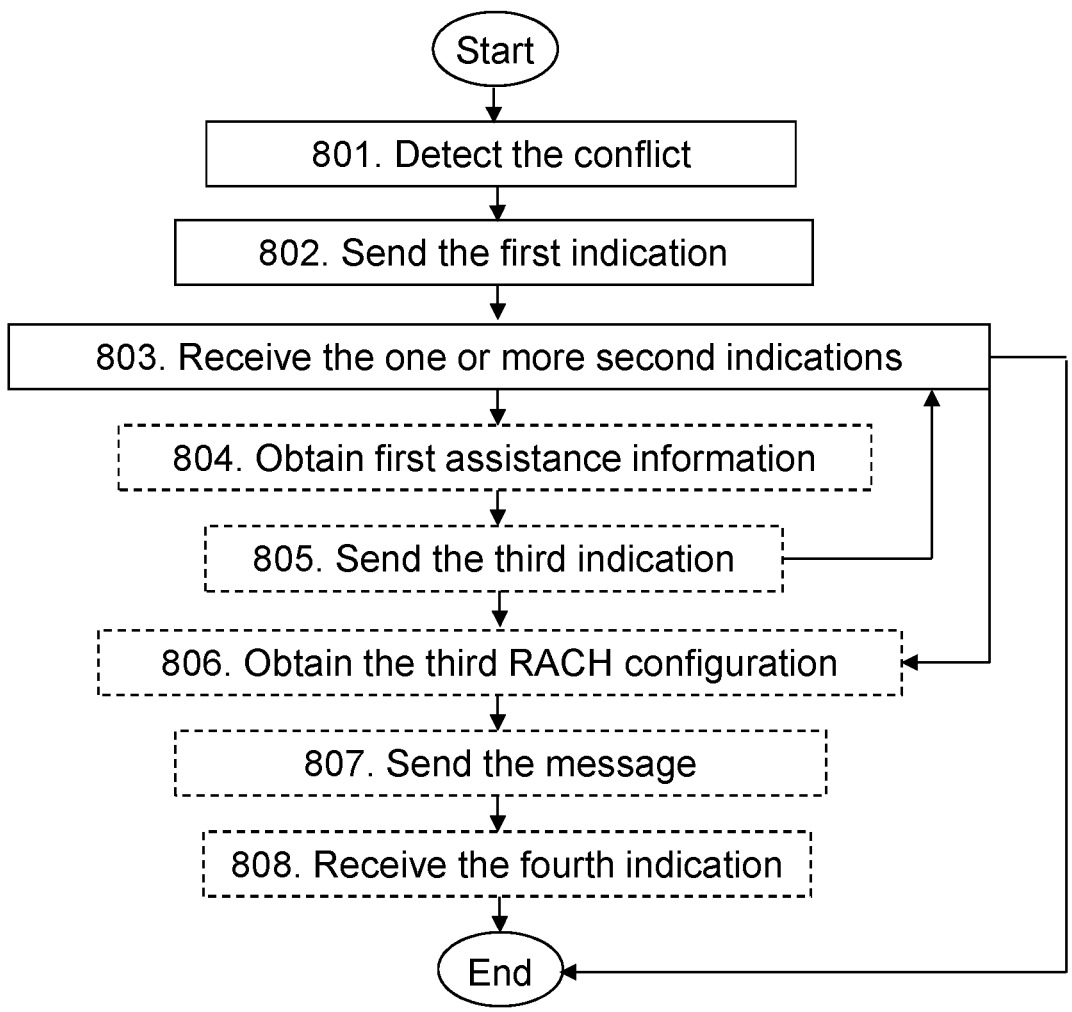
FIG. 8 is a flowchart depicting an example of a method in a first network node, according to embodiments herein.

Embodiments of a method, performed by the first network node 111, will now be described with reference to the flowchart depicted in FIG. 8. The method may be understood to be for handling a Random Access Channel (RACH) configuration. The first network node 111 may operate in the wireless communications network 100 with a Radio Access Technology (RAT) with a split architecture, wherein the first network node 111 is a Centralized Unit (CU), and a second network node 112 is a Distributed Unit (DU).

In embodiments herein, the example case of an NR RAT may be considered. In such example, the architecture taken into consideration may be a split architecture where a gNB-CU may host high layers, such as RRC, and where the gNB-DU may host lower layers, such as PHY, MAC and RLC. The methods described herein may be applied to any RAT that follows the same split architecture. For example they may be applied to the E-UTRAN split architecture or to the E-UTRA split architecture.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first network node 111 is depicted in FIG. 8. Some actions may be performed in a different order than that shown in FIG. 8. Some of the actions may be performed more than once, e.g., iteratively.

In some embodiments, the first network node 111 may be a gNB-CU.

In some embodiments, the second network node 112 may be a gNB-DU.

In some embodiments, the first network node 111 may be a gNB-CU and the second network node 112 may be a gNB-DU.

Action 801

A RACH configuration for an NG RAN cell may consists of a set of time-frequency resources as well as set of RACH preambles that may be generated starting from a specific root sequence. Ideally, neighboring cells may need to be allocated with orthogonal RACH resources, with orthogonality realized in time, frequency or code domain, or a combination thereof. However, due to the limited time-frequency resources and root sequences, not all the available RACH configurations may be orthogonal but may in fact share some resources, e.g., in time and/or frequency, or the same RACH configuration may be reused in different cells.

While it may be possible to configure different cells either with the same RACH configuration or with not fully orthogonal RACH configurations, this may need to be avoided in the case of neighboring cells as it may lead to failure or delay of the UE random access procedure. Hereafter this case is referred to as a RACH configuration conflict.

In this Action 801, the first network node 111 detects, or determines an existence of, a conflict between a first RACH configuration in the first cell 121, the first cell 121 being a served cell, and a second RACH configuration in the second cell 122.

In some embodiments, the second cell 122 may be a neighbor cell to the first cell 121. For example, the second cell 122 may be a cell of a neighbor DU, as described earlier. In a particular example, this Action 801 may be understood to be drawn to detection of a RACH configuration conflict at the gNB-CU between a served cell and a neighboring cell. The first network node 111 may only be able to determine whether the RACH configuration of a serving cell of an underlying DU such as the first cell 121 of the second network node 122, may collide with the RACH configuration of another cell, such as the second cell 122, belonging to another CU. However, the first network node 111 may not be able to determine the physical proximity of such cells. Only the second network node 112 may be able to determine the physical proximity of such cells. Therefore, the first network node 111 may only be able to inform the second network node 112 about a "potential RACH configuration conflict" for the served cell, that is, for the first cell 121. The second network node 112, on the other hand, may be able to detect and/or confirm whether the RACH configuration conflict may indeed exist, based on embodiments of the invention Determining may be understood as calculating, or deriving.

In some embodiments, the conflict may be between a RACH configuration associated to a first Synchronization Signal Block (SSB) beam of the first cell 121, and another RACH configuration associated to a second SSB beam of the second cell 122.

Assuming that the second network node 112, e.g., a gNB-DU, may be able to report its RACH configuration per cell to the first network node 111, e.g., a gNB-CU, and that the first network node 111 may be able to signal the RACH configuration per served cell to neighboring NG RAN nodes, the first network node 111 may be able to determine whether a cell served by a neighbouring gNB may be likely to incur in a RACH configuration conflict. The latter may be achieved by comparing RACH configurations and determining if they incur in a RACH resource overlap from a time and/or frequency point of view and if the root sequence in use may generate the same RACH preambles. This information alone, however, may be understood to not be enough to declare a RACH configuration conflict.

In fact, the first network node 111 may need to first verify that the two cells in question are neighbours. The notion of whether cells are neighbouring may be achieved by collecting UE measurements reporting detected cells and deducing that cells reported by the same UE may be within the same neighbourhood with one another and with cells previously associated to the same neighbourhood. Further, the notion of neighbouring cells may be gained by configuration at the gNB-CU Cell relation information, such as a list of neighbouring cells, may be derived from a UE RRM measurement report based, for instance, on Reference Signal Received Power (RSRP) measurements of neighbouring cells monitored by the UE. RRM measurements may have been reported by RRC_Connected mode UEs. Accordingly, in some non-limiting examples, Action 801 may comprise the first network node 111 detecting a RACH configuration conflict for a served cell such as the first cell 121 by means of comparing different RACH configurations of cells associated to connected gNB-DUs and of cells served by neighbor gNBs, determining which cells may be neighbouring each other by means of analyzing UE measurements reporting detected neighbor cells, and pinpointing the cells in the same neighbourhood that may have an overlapping RACH configuration.

By detecting the conflict between the first RACH configuration and the second RACH configuration in this Action 801, the first network node 111 may then be enabled to take action in order to resolve it, by performing the next Action 802. An advantage of this this Action 801 may be understood to be to reduce the signalling overhead and measurements required to detect and resolve a RACH configuration conflict, thereby enabling more efficient RACH optimization. In a split RAN architecture, wherein the first network node 111 is a CU, and the second network node 112 is a DU, the first network node 111 may have knowledge of the RACH resource configuration for all cells of the second network node 112, as well as the RACH resource configuration of cells controlled by DUs connected to one or more neighboring CUs. As such, the first network node 111 may determine whether the RACH configuration of any serving cell, or SSB beam, of the second network node 112 may overlap with the RACH resources used by a cell, or SSB beam, of a neighboring DU, thereby detecting the conflict between the first RACH configuration in the first cell 121, the first cell 121 being a served cell, and the second RACH configuration in the second cell 122, the second cell 122 being, e.g., a cell of a neighbor DU. This may be achieved without any signalling information with the second network node 112, or without measurements of RACH performance required from the second network node 112. The first network node 111 may then configure the second network node 112 to report, and/or perform measurements of RACH performance, only for the first cell 121 detected in conflict with the second cell 122.

Action 802

In this Action 802, the first network node 111 sends a first indication to the second network node 112 operating in the wireless communications network 100. The first indication is based on the detected conflict. The first indication comprises at least one of: i) a notification of the conflict for the served cell, ii) assistance information associated to the detected conflict to assist the second network node 112 to resolve the detected conflict for the served cell, iii) a request for assistance information associated to the detected, or determined, conflict to assist the first network node 111 to resolve the detected conflict for the served cell, and iv) a request for the second network node 112 to resolve the detected conflict for the served cell.

Sending may be understood as transmitting, or providing, e.g., via the first link 141.

The first indication may be, according to option i) above, for example, a CU RACH conflict verification message which may indicate a flag indicating of a possible RACH configuration conflict detected for the served cell.

In particular examples, the first network 111 may, in this Action 802, transmit, to the second network node 112, e.g., the gNB-DU, a message notifying the gNB-DU that one of its served cells, possibly specified by one or more of the cell identifiers, is subject to RACH configuration conflict. Such message may be issued via an existing procedure or via a new procedure. For the sake of simplicity this message may be called gNB CU RACH configuration config conflict message, indicating a possible RACH configuration conflict for a cell served by the gNB-DU.

In another example according to option i) above, the first indication may be, a gNB CU RACH config conflict message indicating a possible RACH configuration conflict for the served cell. Such a message may indicate to the second network node 112, e.g., the gNB-DU, one or more cells may be subject to a RACH configuration conflict. That is, the message may comprise the notification of the conflict, according to option i) above. Additionally, the message may indicate one or more of the following information. In some options, the message may additionally indicate the request for the second network node 112 to resolve the detected conflict for the served cell. In some options, the message may additionally indicate the assistance information associated to the detected conflict to assist the second network node 112 to resolve the detected conflict for the served cell. For example, in a first option, the message may indicate, that the second network node 112 is tasked with selecting a new RACH configuration for each of such cells. In a second option, the message may indicate that the second network node 112 is tasked with selecting a new RACH configuration for each of such cells, where the second network node 112, for a given cell in RACH configuration conflict, may need to avoid selection of the RACH configurations indicated by the first network node 111 as not suitable for that cell. In a third option, the message may indicate that the second network node 112 has to adopt for a given cell, indicated by one or more cell identifiers, a RACH configuration with parameters within ranges provided by the first network node 111. In this case, the first network node 111 may provide an exact RACH configuration to be adopted by the second network node 112.

In other options wherein the message may comprise the notification of the conflict, such as in a fourth option, the message may additionally indicate that the second network node 112 may need to verify that the cells indicated by the first network node 111 are subject to RACH configuration conflict. In some options, the message may additionally indicate the request for assistance information associated to the detected, or determined, conflict to assist the first network node 111 to resolve the detected conflict for the served cell. For example, in a fifth option, the message may indicate that a second network node 112 cell identified by one or more cell identifiers is subject to RACH configuration conflict and that the second network node 112 may need to provide to the first network node 111 assistance information to allow the first network node 111 to make an appropriate choice of the RACH configuration for the cell in question.

The first indication may be, according to option ii) above, for example, a request to resolve the detected RACH conflict at the second network node 112. The first network node 111 may request the second network node 112 to solve the issue itself at the first network node 111, which may include: assistance information associated to detected RACH conflict, as above, a set of RACH preferred or not preferred configurations, and a set of preferred parameters for optimization of RACH configuration.

The first indication may be, according to option iii) above, for example, a request for assistance information for resolving the detected RACH conflict. The first network node 111 may ask for conflict confirmation from the second network node 112, and request some additional information to resolve the issue at the first network node 11, such as, a request for ACKnowledgement of the conflict, and a set of resources for optimizing RACH resources.

In some examples, the first network node 111 may instruct, according to option iv) above, the second network node 112 to resolve the RACH configuration conflict for the served cell without any further assistance information. Namely the first network node 111 may signal to the second network node 112 that a cell identified by one or more of its identifiers may be in need of RACH configuration change.

In some examples, the first network node 111 may instruct, according to options ii) and iv) above, the second network node 112 to resolve the RACH configuration conflict for the served cell with additional assistance information, such as: a) information related to RACH configuration of neighbouring cells that may be creating the RACH configuration conflict, b) information related to RACH configuration of other neighbouring cells that may need to be avoided, and c) a range of parameters for the RACH configuration that the second network node 112 may use to resolve the RACH configuration conflict.

Option a) may keep all the advantages of option-1, that is, a lean and flexible approach, while ensuring that the second network node 112 may have enough information to change the RACH configuration and avoid any RACH configuration conflict with neighbouring cells. Option 2a may be integrated with option 2b to avoid that the new RACH configuration determined by the second network node 112 creates a conflict with neighbouring cells. In this case, the RACH configurations provided to second network node 112 may be for cells in the neighbourhood of the cell subject to RACH configuration conflict. Hence a change of RACH configuration may need to not overlap such cells in the neighbourhood.

Option c) may be understood to shift some of the RACH optimization at the first network node 111. In this option, the second network node 112 may be limited to choose among a subset of RACH configurations where such subset may be determined by the range of RACH configuration parameters the first network node 111 may signal to the second network node 112. As part of this option, the first network node 111 may determine a single RACH configuration and signal it to the second network node 112.

By sending the first indication in this Action 802, the first network node 111 may then enable the conflict to be resolved, either by resolving it itself, e.g., using the assistance information requested from the second network node 112, or by assisting the second network node 112 to resolve it, e second network node 112, with the assistance information provided to it. Upon detecting that the conflict between the RACH configuration of any serving cell, or SSB beam, of the second network node 112 and the RACH resources used by a cell, or SSB beam, of a neighbouring DU may exist, the first network node 111 may transmit the first indication to the second network node 112. In one exemplifying case, the first indication may comprise a request for assistance information for the second network node 112. The second network node 112 may then be enabled to determine whether the RACH configuration conflict exists for the serving cell, that is, the first cell 121, or SSB beams of the serving cell, indicated by the first network node 111, for instance by monitoring the RACH performance for the indicated cell, or SSB beams, using PRACH signals transmitted by user equipments in the indicated cell, or SSB beams.

Action 803

In this Action 803, the first network node 111 receives one or more second indications from the second network node 112. The one or more second indications are based on the sent first indication. Additionally, at least one of the received one or more second indications is based on a result of a verification of an existence of the detected, or determined, conflict.

That the one or more second indications are based on the sent first indication may be understood to mean that the one or more second indications are received in response to the sent first indication.

For example, in some cases such as when the first network node 111 may have signaled a single RACH configuration to the second network node 112, the second network node 112 may not be able to adopt the RACH configuration suggested by the first network node 111 or indeed the range of RACH parameters suggested. In such case, one of the one or more second indications may comprise a rejection of the suggested configuration. Such rejection of the suggested configuration, or configuration parameters, may be due to a number of reasons. As an example, it may be up to the second network node 112 implementation how much RACH resource allocation may be needed to ensure correct detection of RACH access: a too narrow resource allocation may not be suitable for the second network node 112 implementation, while a too large resource allocation may result in waste of resources. As a different example, resource partitioning policies at the second network node 112, such as those in place for each network slice supported by the second network node 112, may pose limitations on the amount of UP resources employed as RACH resources. A rejection of a RACH configuration suggested by the first network node 111 may derive into a negotiation between second network node 112 and first network node 111 about the best RACH configuration to adopt. This is yet another method that may be added to embodiments herein.

Indeed, a negotiation mechanism may be needed between the first network node 111 and the second network node 112 so that the second network node 112 may, for instance, reject a RACH configuration suggested by the first network node 111 if this is not feasible in light of implementation and policies of the second network node 112. As part of the negotiation mechanism, the second network node 112 may then assist the first network node 111 with information associated to the user plane requirements for the cell. That is, the second network node 112 may provide additional assistance information. For example the second network node 112 may specify to the first network node 111, in the same second indication or another of the one or more second indications, the minimum or maximum amount of RACH resources that may be used for its configuration. In alternative, the second network node 112 may suggest, in the same or another of the one or more second indications, a list of preferred RACH configurations to the first network node 111, which in turn may choose one that may not create any RACH conflict with neighbouring cells and signal it back to the second network node 112, based, for instance, on the RACH configuration information received by neighbouring gNB-CUs.

An example of the one or more second indications may be a gNB DU Configuration Update message. Other examples of the one or more second indications may be a gNB DU RACH config conflict message, a DU RACH conflict verification message, a gNB DU Assistance information message or DU RACH assistance info messages.

In some embodiments, the conflict may be a RACH conflict and the one or more second indications may comprise at least one of: an instruction to resolve the conflict, an acknowledgement (ACK) of the conflict, an acknowledgement of the conflict and an instruction to resolve the conflict, which may be implicit, a request for additional assistance information, and additional assistance information from the second network node 112. In a particular example, the at least one of the foregoing may be sent in a gNB DU RACH config conflict message.

The request for additional assistance information may be sent in a gNB CU Assistance information message. The request of additional information may comprise: assistance information to resolve RACH conflict, such as: ranges of acceptable values for parameters forming the RACH configurations, and/or minimum and/or maximum amounts of RACH resources that may be supported for the cell.

The additional assistance information may be understood to be for RACH optimization. Such assistance information may comprise one or more of the following: PRACH performance statistics, ranges of acceptable values for parameters forming the RACH configurations, minimum and/or maximum amounts of RACH resources that may be supported for the cell, RACH configuration of conflicting neighboring cell(s), RACH configuration of neighboring cells that may need to be avoided, a range of values for a set of parameters for optimization of RACH configuration at the second network node 112. The additional assistance information may be sent in DU RACH assistance info messages.

Another example of the one or more second indications may be a gNB DU RACH config conflict message.

By receiving the one or more second indications, the first network node 111 may be enabled to receive, for example, assistance information from the second network node 112, e.g., comprising an acknowledgement of the RACH conflict, which may then enable the first network node 111 to resolve the conflict.

Action 804

In this Action 804, the first network node 111 may obtain first assistance information based on the determined conflict.

Obtaining may be understood as determining, calculating, deriving, or retrieving, e.g., from an internal memory. The first assistance information may be understood as assistance information derived by the first network node 111. The first assistance information may be understood to be assistance information associated to the detected RACH conflict, such as ID of the conflicting cell at the second network node 112, subset of RACH resources where the possible conflict has been detected, RACH configuration of cells in the neighbourhood of the cell subject to RACH configuration conflict, and range of RACH parameters within which the new RACH configuration may need to be chosen.

By obtaining the first assistance information in this Action 804, the first network node 111 may then be enabled to provide the obtained first assistance information to the second network node 112, and thereby help the second network node 112 to resolve the detected conflict.

Action 805

In this Action 805, the first network node 111 may send a third indication to the second network node 112. The third indication may indicate the obtained first assistance information. At least one of the received one or more second indications may be based on the sent third indication. That at least one of the received one or more second indications may be based on the sent third indication may typically be because the first network node 111 may receive a plurality of second indications, which may be received at different times. Therefore, one of the additional second indications may be received based on the sent third indication. Nevertheless, as explained earlier, the usage of "second" and "third" does not by itself convey a chronological order, wherein second precedes third. Accordingly, in some examples wherein only one second indication may be received, it may also be based on the sent third indication, indicating the obtained first assistance information.

The sending in this Action 805 may be implemented via the first link 141.

In some embodiments, the conflict may be a RACH conflict and at least one of: the assistance information comprised in the first indication and the first assistance information may comprises at least one of: information related to RACH configurations of neighbouring cells that may be creating the RACH configuration conflict, information related to RACH configurations of other neighbouring cells to be avoided, and a range of parameters for RACH configuration available for use by the second network node 112 to resolve the RACH configuration conflict.

The third indication may be, for example, a gNB CU Assistance information message.

By sending the third indication in this Action 805, the first network node 111 may enable the second network node 112 to obtain the first assistance information, and thereby help it to resolve the detected conflict.

Action 806

In this Action 806, the first network node 111 may obtain a first third RACH configuration based on the detected conflict, to change the first RACH configuration to the first third RACH configuration. A third RACH configuration may be understood herein as a different RACH configuration than the first RACH configuration. The first third RACH configuration may be understood as a first instance of the third RACH configuration, for example a third RACH configuration, as it may be calculated or derived by the first network node 111, or as recommended to or by the first network node 111.

As stated earlier, obtaining may be understood as determining, calculating, deriving, retrieving, or receiving, e.g., via the first link 141.

The obtaining in this Action 806 of the first third RACH configuration may be based on the detected conflict. The obtaining in this action 806 of the first third RACH configuration may be to change and/or update the first RACH configuration to the first third RACH configuration.

In some embodiments, the first third RACH configuration may be based on the received one or more second indications. That is, the first third RACH configuration may be calculated based on the received one or more second indications, e.g., using the additional assistance information from the second network node 112. For example, the first network node 111 may determine the new RACH configuration based on the information included in the gNB DU RACH config conflict message. In another example, the first network node 111 may determine the new RACH configuration based on gNB DU Assistance information message and the additional RACH assistance information provided from DU RACH assistance info messages. In some embodiments, one of: a) the one or more second indications may indicate the first third RACH configuration, and b) the first third RACH configuration may be obtained based on the one or more second indications.

The first third RACH configuration may be based on the received one or more second indications. In some particular embodiments, at least one of the one or more second indications may indicate the first third RACH configuration.

By obtaining the first third RACH configuration in this Action 806, the first network node 111 may be enabled to change and/or update the first RACH configuration in order to resolve the detected conflict.

Action 807

In this Action 807, the first network node 111 may send a message to the second network node 112 indicating the obtained first third RACH configuration.

The sending in this Action 807 may be implemented, e.g., via the first link 141.

For example, the first network node 111 may, in this Action 807, transmit new RACH configuration to the second network node 112 by gNB CU configuration update message.

By sending the message in this Action 807, the first network node 111 may enable the second network node 112 to also change or update the first RACH configuration to the first third RACH configuration, thereby enabling the second network node 112 to resolve the detected conflict.

Action 808

In this Action 808, the first network node 111 may receive a fourth indication from the second network node 112 operating in the wireless communications network 100. The fourth indication may be based on a second third RACH configuration, and/or on the first RACH configuration as changed to the second third RACH configuration by the second network node 112. The fourth indication may notify an occurred change of RACH configuration for the served cell in the conflict, to the second third RACH configuration.

Receiving in this Action 808 may be performed, e.g., via the first link 141.

The second third RACH configuration may be the same as the first third RACH configuration, e.g., in the event that the second network node 112 may confirm that it has updated the first RACH configuration to the first third RACH configuration as recommended by the first network node 111. In other examples, the second third RACH configuration may be different than the first third RACH configuration, for example, in the event that Action 807 has not been performed, and the first network node 111 may not have obtained and/or indicated the first third RACH configuration. This may for example be the case if the second network node 112 and not the first network node 111, may have resolved the detected conflict.

By receiving the fourth indication in this Action 808, the first network node 111 may be enabled to either obtain a confirmation that the second network node 112 has changed or updated its first RACH configuration to the second third RACH configuration, and/or may obtain a recommendation or an instruction from the second network node 112 to update and/or change the first RACH configuration of the first network node 111 to the second third RACH configuration in order to resolve the detected conflict.

The fourth indication may be, for example, a gNB-DU Configuration Update message. For example, the second network node 112 may have applied a change of such configuration and signal to the first network node 111 the new RACH configuration adopted for the cell, for example by issuing the gNB-DU Configuration Update including the new RACH configuration for the cell in question. If the new configuration adopted by the second network node 112 is still subject to RACH configuration conflict, the first network node 111 may repeat the operation of sending to the second network node 112 the first indication, e.g., another message, indicating that the cell may be in need of a change of RACH configuration change. The procedure may be reiterated until a conflict free cell deployment may be achieved. For example, the fourth indication may be a message rejecting a suggested RACH configuration or a range of values to be adopted for a RACH configuration for the cell subject to RACH configuration conflict. Additionally, this message may contain suggested value ranges for the RACH configuration to be adopted or one or more specific RACH configurations the second network node 112 may d adopt for the cell subject to RACH configuration conflict.

The fourth indication may be, in another example, a gNB DU RACH config conflict message comprising an updated RACH configuration for the served cell.

Examples of these actions and the indications are provided later in this document.

Figure 9:
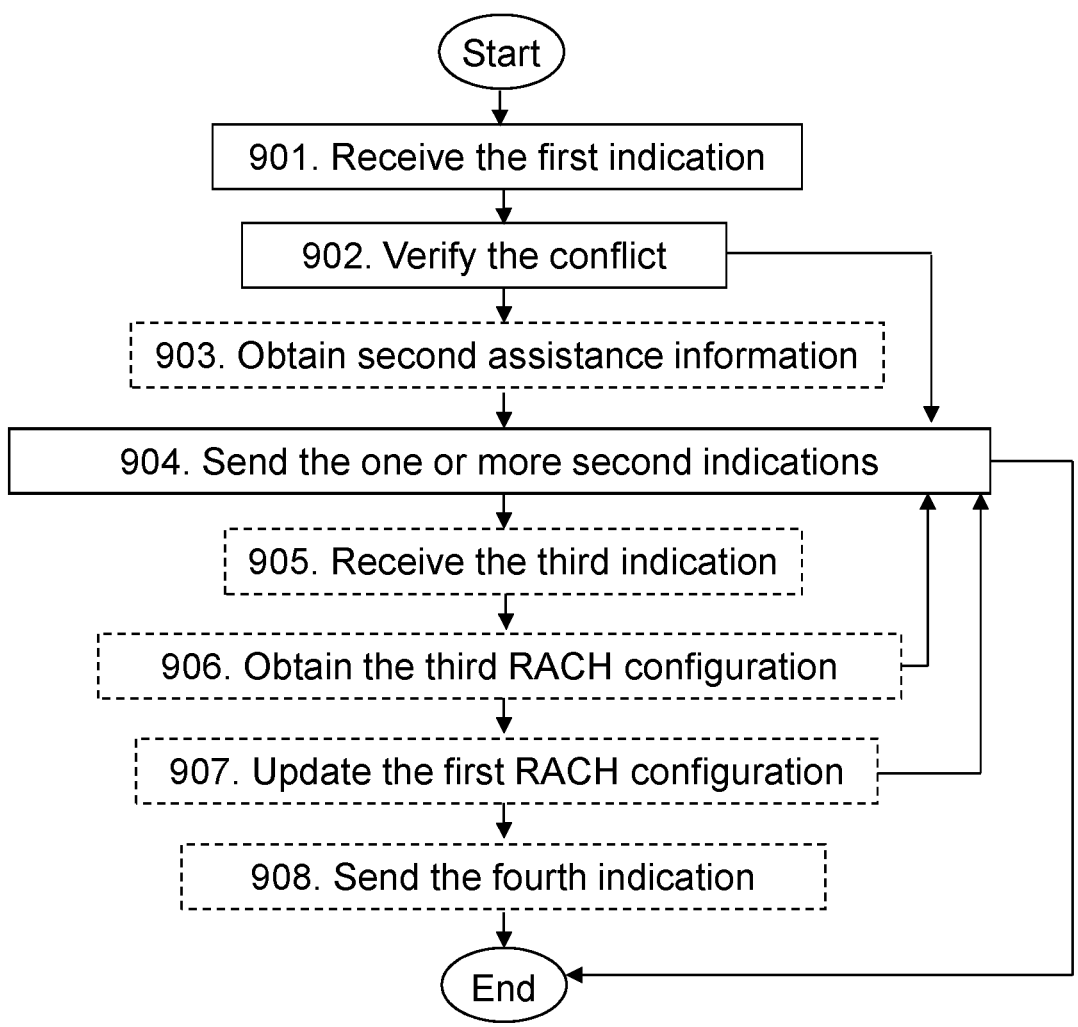
FIG. 9 is a flowchart depicting an example of a method in a second network node, according to embodiments herein.

Embodiments of a method performed by the second network node 112, will now be described with reference to the flowchart depicted in FIG. 9. The method may be understood to be for handling a RACH configuration. The second network node 112 operates in the wireless communications network 100 with a RAT with a split architecture, wherein the second network node 112 is a DU, and the first network node 111 is a CU.

In embodiments herein, the example case of an NR RAT may be considered. In such example, the architecture taken into consideration may be a split architecture where a gNB-CU may host high layers, such as RRC, and where the gNB-DU may host lower layers, such as PHY, MAC and RLC. The methods described herein may be applied to any RAT that follows the same split architecture. For example they may be applied to the E-UTRAN split architecture or to the E-UTRA split architecture.

Several embodiments are comprised herein. In some embodiments all the actions may be performed. In some embodiments, one or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the second network node 112 is depicted in FIG. 9. Some actions may be performed in a different order than that shown in FIG. 9. Some of the actions may be performed more than once, e.g., iteratively.

The detailed description of some of the following corresponds to the same references provided above, in relation to the actions described for the first network node 111, and will thus not be repeated here to simplify the description. For example, in some embodiments, the second network node 112 may be a gNB-DU.

In some embodiments, the first network node 111 may be a gNB-CU.

In some embodiments, the first network node 111 may be a gNB-CU and the second network node 112 may be a gNB-DU.

Action 901

In this Action 901 the second network node 112 receives the first indication from the first network node 111 operating in the wireless communications network 100. As stated earlier, the first indication is based on the conflict between the first RACH configuration in the first cell 121, the first cell 121 being the served cell, and the second RACH configuration in the second cell 122. The first indication comprises at least one of: i) the notification of the conflict for the served cell, ii) the assistance information associated to the detected conflict to assist the second network node 112 to resolve the detected conflict for the served cell, iii) the request for assistance information associated to the detected conflict to assist the first network node 111 to resolve the detected conflict for the served cell, and iv) the request for the second network node 112 to resolve the detected conflict for the served cell.

In some embodiments, the second cell 122 may be a neighbor cell to the first cell 121. For example, the second cell 122 may be a cell of a neighbor DU, as described earlier.

Receiving may be performed, e.g., via the first link 141.

In a particular example of this Action 901, the second network node 112 may receive, from the first network node 111, a RACH configuration conflict message indicating a RACH configuration conflict detection/verification for a served cell.

The conflict may be between the RACH configuration associated to the first SSB beam of the first cell 121 and the another RACH configuration associated to the second SSB beam of the second cell 122.

By receiving the first indication in this Action 901, the second network node 112 may be enabled to verify the existence of the conflict in the next Action 902.

Action 902

In this Action 902, the second network node 112 verifies the existence of the conflict based on the received first indication.

For example, depending on the content of the RACH configuration conflict message, the second network 112 may verify whether the RACH configuration conflict event for the served cell may exist, and signal such result to the first network node 111.

At least one of the sent one or more second indications may be based on a result of the verification.

Action 903

In this Action 903, the second network node 112 may obtain the second assistance information based on the received first indication. By receiving the first indication Action 901, the second network node 112 may be enabled to verify the existence of the conflict in Action 902, and then, in this Action 903, obtain the second assistance information, e.g., comprising an acknowledgement of the RACH conflict, which, in the next Action 904, may be then indicated to the first network node 111 and enable the first network node 111 to resolve the conflict.

At least one of the sent one or more second indications may be based on the obtained second assistance information.

Obtaining may be understood as determining, calculating, deriving, retrieving, or receiving, e.g., via the first link 141.

Action 904

In this Action 904, the second network node 112 sends the one or more second indications to the first network node 111. At least one of the sent one or more second indications is based on a result of the verification. For example, one of the one or more second indications may be a gNB DU RACH config conflict message if a RACH conflict is detected. The at least one of the sent one or more second indications may comprise, for example, a positive acknowledgment (ACK) of the conflict, if the conflict is verified; or, a negative acknowledgment (NACK) if the conflict is not verified.

Sending may be understood as transmitting, or providing, e.g., via the first link 141.

The one or more second indications may be based on the received first indication. For example, depending on the content of the RACH configuration conflict message, the second network 112 may take appropriate actions to either resolve the RACH configuration conflict internally, adopting the information received by the first network node 111, or preparing the assistance information to resolve the RACH conflict issue at the first network node 111.

In another example, depending on the content of the RACH configuration conflict message, the second network 112 may transmit, to the first network node 111, a gNB DU Configuration Update message comprising an instruction or assistance information to resolve the RACH configuration conflict.

In some embodiments, at least one of the one or more second indications may indicate the second third RACH configuration.

By sending the one or more second indications in this Action 904, e.g., indicating second assistance information comprising an acknowledgement of the RACH conflict, the first network node 111 may then be enabled to resolve the conflict.

Action 905

In this Action 905, the second network node 112 may receive the third indication from the first network node 111. The third indication may be based on the first assistance information. At least one of the sent one or more second indications may be based on the received third indication.

Action 906

In this Action 906, the second network node 112 may obtain the second third RACH configuration based on the first indication. The second third RACH configuration may be performed to change, or update, the first RACH configuration to the second third RACH configuration. At least one of the sent one or more second indications may be based on the obtained second third RACH configuration.

For example, if the verification of RACH configuration conflict indicates a conflict at a serving cell of a gNB DU, the second network node 112 may resolve the RACH configuration conflict of the conflicting serving cell based on the assistance information provided by gNB CU. determine a new RACH configuration in this Action 906, and apply the configuration to the conflicting serving cell, in the next Action 907.

In another example, if the verification of the RACH configuration conflict indicates a conflict at a serving cell of the second network node 112, the second network node may resolve the RACH configuration conflict by additional assistance information received from the first network node 111, receive the additional RACH assistance information from the first network node 111, as part of gNB CU Assistance information message, resolve the RACH configuration conflict of the conflicting serving cell based on the assistance information provided by the first network node 111, and determine a new RACH configuration in this Action 906, apply to the configuration of the conflicting serving cell in the next Action 907, and update the first network node 111 by means of a gNB DU configuration update message in Action 908, as will be explained later.

In some embodiments, at least one of the one or more second indications may indicate the third RACH configuration.

Action 907

In this Action 907, the second network node 112 may change, or update, the first RACH configuration to the second third RACH configuration, based on the received first indication. In a particular example, the second network node 112 may update the RACH configuration for the served cell based on the RACH configuration indicated by the first network node 111 within the RACH config. update message.

Action 908

In this Action 908, the second network node 112 may send the fourth indication to at least one of the first network node 111 and the third network node 113 operating in the wireless communications network 100. The fourth indication may be based on the second third RACH configuration, and/or on the first RACH configuration as changed, or updated, to the second third RACH configuration by the second network node 112. The fourth indication may notify the occurred change of RACH configuration for the served cell in the conflict.

The fourth indication may be, e.g., a RACH config. update message to the first network node 111 and a DU OAM.

In a particular example, the second network node 112 may inform, in this Action 908, the first network node 111 and a DU OAM when the conflict may be resolved, and the new RACH configuration may have been applied to the conflicting cell at the second network node 112 in Action 907.

In some embodiments, at least one of the one or more second indications may indicate the third RACH configuration.

Some embodiments herein will now be further described with some non-limiting examples.

In the following description, any reference to a/the gNB-CU may be understood to equally refer to the first network node 111; any reference to a/the gNB-DU may be understood to equally refer to the second network node 112; any reference to a/the served cell may be understood to equally refer the first cell 121; any reference to a/the neighbour cell may be understood to equally refer the second cell 122; any reference to a/the UE may be understood to equally refer the user equipment described earlier.

In embodiments herein, the example case of an NR RAT is considered. In such example, the architecture taken into consideration is a split architecture where a gNB-CU hosts high layers such as RRC and where the gNB-DU hosts lower layers such as PHY, MAC and RLC. The methods described herein can be applied to any RAT that follows the same split architecture. For example they can be applied to the E-UTRAN split architecture or to the E-UTRA split architecture.

As a summarized overview, examples of embodiments herein may be understood to disclose a method for RACH configuration conflict resolution that may be executed by a gNB-DU wherein the gNB-DU may change the RACH configuration for a controlled cell such as the first cell 121, based on the detection of a RACH configuration conflict with another cell such as the second cell 122, by the gNB-CU.

Figure 10:
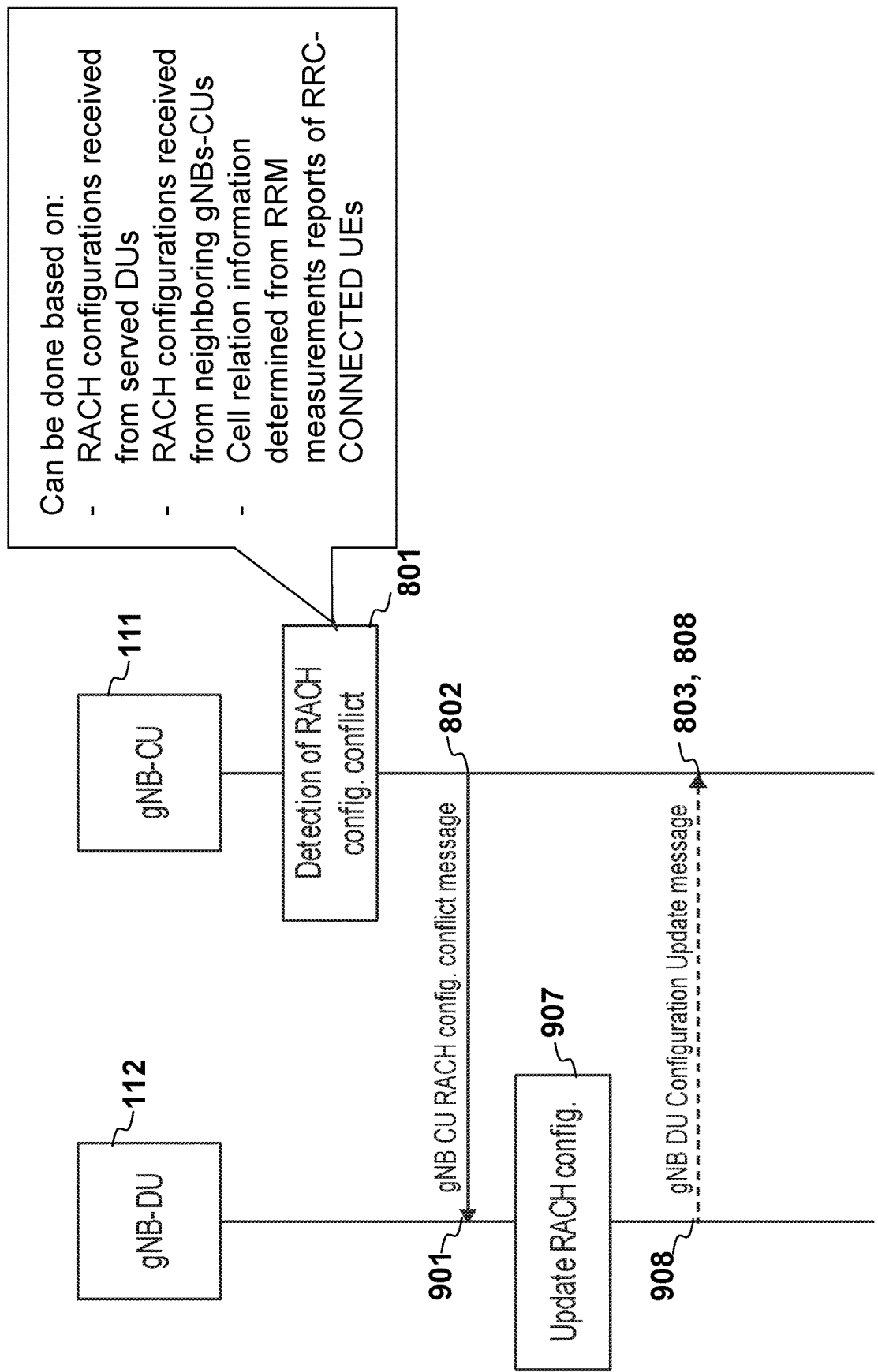
FIG. 10 is a signalling diagram illustrating a non-limiting example of a method, according to embodiments herein.

FIG. 10 is a signalling diagram illustrating a non-limiting example of embodiments herein. The reference numerals correspond to the Actions described earlier for each of the first network node 111, and the second network node 112. The direction of the arrows represents the direction of the signalling. The different indications mentioned in the actions are exemplified with particular messages. In FIG. 10, the method performed by the first network node 111 is depicted with a particular exemplary combination of actions the second network node 112 may perform. Embodiments herein may comprise a method executed by the first network node 111, e.g., the gNB-CU, for detecting a RACH configuration conflict between a served cell such as the first cell 121, and a neighboring cell such as the second cell 122 in some examples. The method may comprise detecting, according to Action 801, a RACH configuration conflict for the served cell. This may be carried out by means of comparing RACH configuration information of cells served by connected gNB-DUs, as well as RACH configuration of cells served by neighbor gNBs, and determining that a possible RACH configuration conflict may occur between neighbouring cells. The notion of whether cells are neighbouring may be achieved by collecting UE measurements reporting detected cells, and deducing that cells reported by the same UE may be within the same neighbourhood with one another, and with cells previously associated to the same neighbourhood. Further, the notion of neighbouring cells may be gained by configuration at the gNB-CU. The method may also comprise the first network node 111, according to Action 802, transmitting, to the second network node 112 e.g., the gNB-DU, a message notifying the gNB-DU that one of its served cells, possibly specified by one or more of the cell identifiers, may be subject to RACH configuration conflict. Such message may be issued via an existing procedure, or via a new procedure. For the sake of simplicity, this message may be called gNB CU RACH configuration config conflict message, indicating a possible RACH configuration conflict for the cell served by the gNB-DU.

Hereafter, the terminology first network node 111 and/or gNB-CU and second network node 112 and/or gNB-DU may be used interchangeably.

Embodiments herein may further comprise a method executed by the second network node 112, e.g., the gNB-DU. The method may comprise, according to Action 901, receiving, from the first network node 111, e.g., the gNB-CU, a message indicating a RACH configuration conflict for the served cell such as the first cell 121. Optionally, in a method associated to embodiments herein for the second network node 112, the gNB-DU may verify whether a RACH configuration conflict may exist for the served cell. In absence of such check, the gNB-DU may assume that the RACH configuration conflict occurs. The method may also comprise the second network node 112 taking appropriate actions to either resolve the RACH configuration conflict internally, or preparing the assistance information to resolve, according to Action 907, the RACH conflict issue at the first network node 111, e.g., gNB-CU. The method may also comprise the second network node 112, according to Action 908, transmitting a message from the gNB-DU to the gNB-CU to notify the gNB-CU of an occurred change of RACH configuration for the cell in RACH configuration conflict. Such message may be a new message or an existing message such as the F1: gNB-DU Configuration Update message. The method may also comprise the second network node 112 optionally transmitting, to the first network node 111, a gNB DU Configuration update message comprising an instruction and/or assistance information to resolve the RACH configuration conflict. When this message may be generated, the gNB-DU may request the gNB-CU to determine the new RACH configuration for the cell in conflict, or to provide assistance information back to the gNB-DU to help in the detection of an appropriate RACH configuration for the cell in conflict.

Continuing with the summarized overview, embodiments herein may comprise actions aimed at the resolution of the RACH configuration conflict, as follows. Upon detecting, according to Action 801, the RACH configuration conflict as described above, a number of options may be available on how to resolve the conflict. According to a first option (Option-1), the gNB-CU may, according to Action 802, instruct the gNB-DU to resolve the RACH configuration conflict for the served cell without any further assistance information. Namely, the gNB-CU may signal to the gNB-DU that a cell identified by one or more of its identifiers may be in need of RACH configuration change. The gNB-DU may therefore apply, according to Action 907, a change of such configuration and signal, according to Action 908, to the gNB-CU the new RACH configuration adopted for the cell, for example by issuing a gNB-DU Configuration Update including the new RACH configuration for the cell in question. If the new configuration adopted by the gNB-DU is still subject to RACH configuration conflict, the gNB-CU may repeat the operation of sending, according to Action 802, to the gNB-DU a message indicating that the cell may be in need of a change of RACH configuration change. The procedure may be reiterated until a conflict free cell deployment may be achieved. According to a second option (Option-2), the gNB-CU may instruct, according to Action 802, the gNB-DU to resolve the RACH configuration conflict for the served cell with additional assistance information, such as: a) information related to RACH configuration of neighbouring cells that may create the RACH configuration conflict, b) information related to RACH configuration of other neighbouring cells that may need to be avoided, and c) a range of parameters for the RACH configuration that the gNB-DU may use to resolve the RACH configuration conflict. Option 2a may be understood to keep all the advantages of Option-1, that is, lean and flexible approach, while ensuring that the gNB-DU has enough information to change the RACH configuration, and avoid any RACH configuration conflict with neighbouring cells. Option 2a may be integrated with option 2b to avoid that the new RACH configuration determined by the gNB-DU may create a conflict with neighbouring cells. In this case, the RACH configurations provided to gNB-DU may be for cells in the neighbourhood of the cell subject to RACH configuration conflict, hence a change of RACH configuration may need to not overlap such cells in the neighbourhood. Option 2c may be understood to shift some of the RACH optimization at the gNB-CU. In this option, the gNB-DU may be limited to choose among a subset of RACH configurations where such subset may be determined by the range of RACH configuration parameters the gNB-CU may, according to Action 805, signal to the gNB-DU. As part of this option, the gNB-CU may determine, according to Action 804, a single RACH configuration and signal it, according to Action 805, to the gNB-DU. In this case, the gNB-DU may not be able to adopt the RACH configuration suggested by the gNB-CU or indeed the range of RACH parameters suggested. Such rejection of the suggested configuration, or configuration parameters, may be due to a number of reasons. As an example, it may be up to the gNB-DU implementation how much RACH resource allocation may be needed to ensure correct detection of RACH access: a too narrow resource allocation may not be suitable for the gNB-DU implementation, while a too large resource allocation may result in waste of resources. As a different example, resource partitioning policies at the gNB-DU, such as those in place for each network slice supported by the gNB-DU, may pose limitations on the amount of UP resources employed as RACH resources. A rejection of a RACH configuration suggested by the gNB-CU may derive into a negotiation between gNB-DU and gNB-CU about the best RACH configuration to adopt. This is yet another procedure that may be added to the solution.

Indeed, a negotiation mechanism may be needed between the gNB-CU and the gNB-DU so that the gNB-DU may, for instance, reject a RACH configuration suggested by the gNB-CU if this may not be feasible in light of gNB-DU implementation and policies. As part of the negotiation mechanism, the gNB-DU may then assist the gNB-CU with information associated to the user plane requirements for the cell. For example, the gNB-DU may, according to Action 904, specify to the gNB-CU the minimum or maximum amount of RACH resources that may be used for its configuration. In an alternative, the gNB-DU may suggest a list of preferred RACH configurations to the gNB-CU, which in turn may choose one that does not create any RACH conflict with neighbouring cells and signal it back to the gNB-DU, based, for instance, on the RACH configuration information received by neighbouring gNB-CUs.

Figure 11:
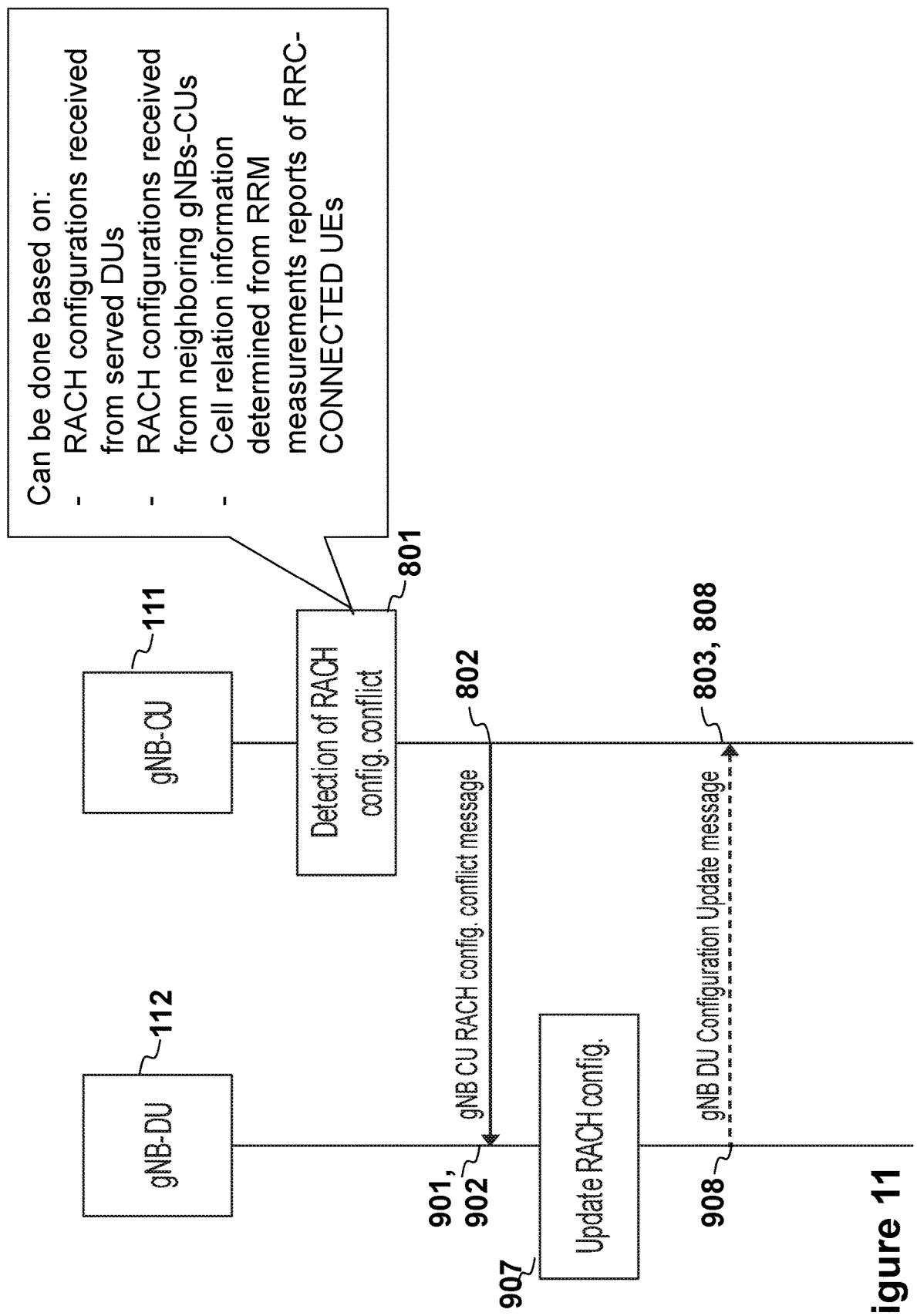
FIG. 11 is a signalling diagram illustrating a non-limiting example of a method, according to embodiments herein.
Figure 12:
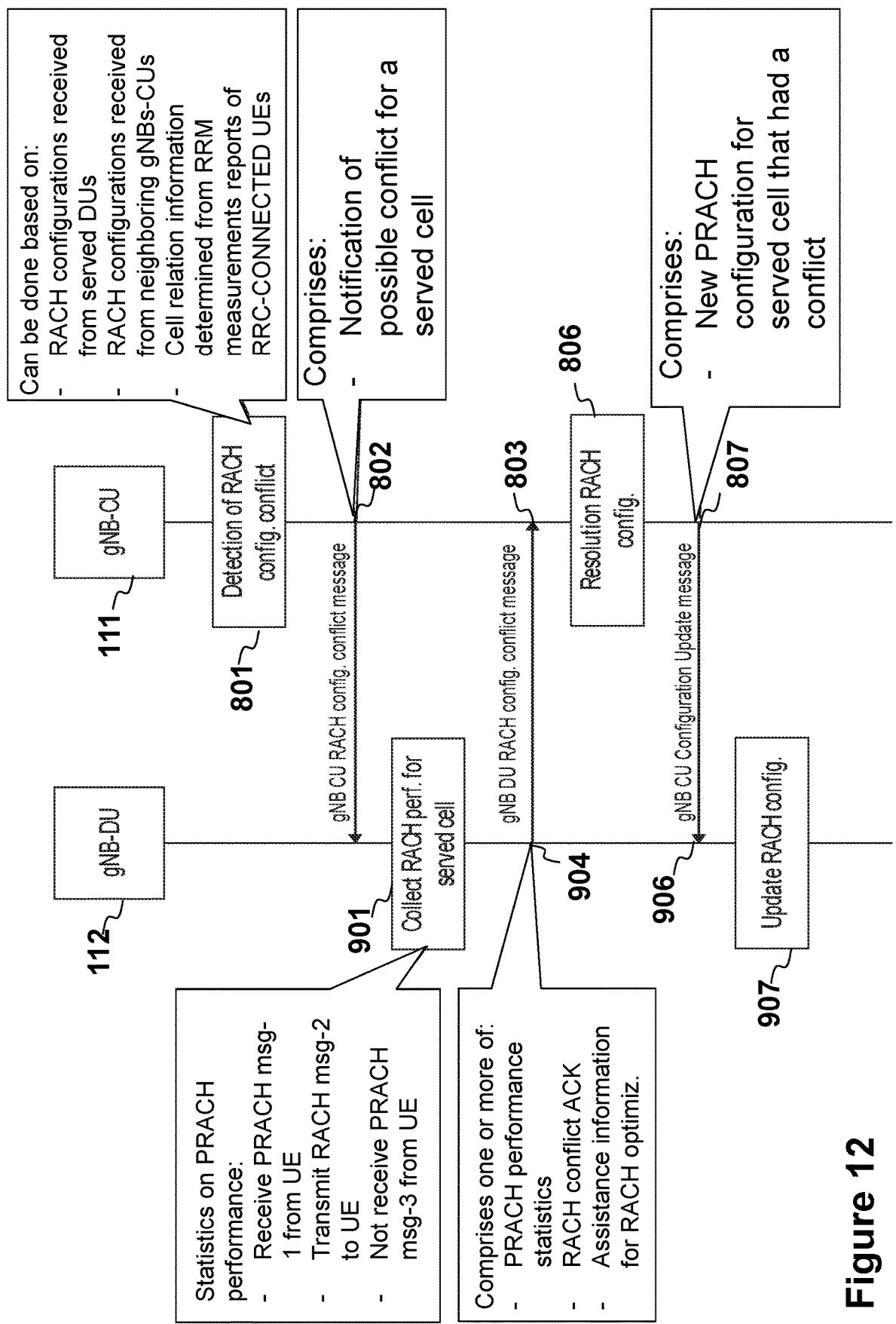
FIG. 12 is a signalling diagram illustrating a non-limiting example of a method, according to embodiments herein.
Figure 13:
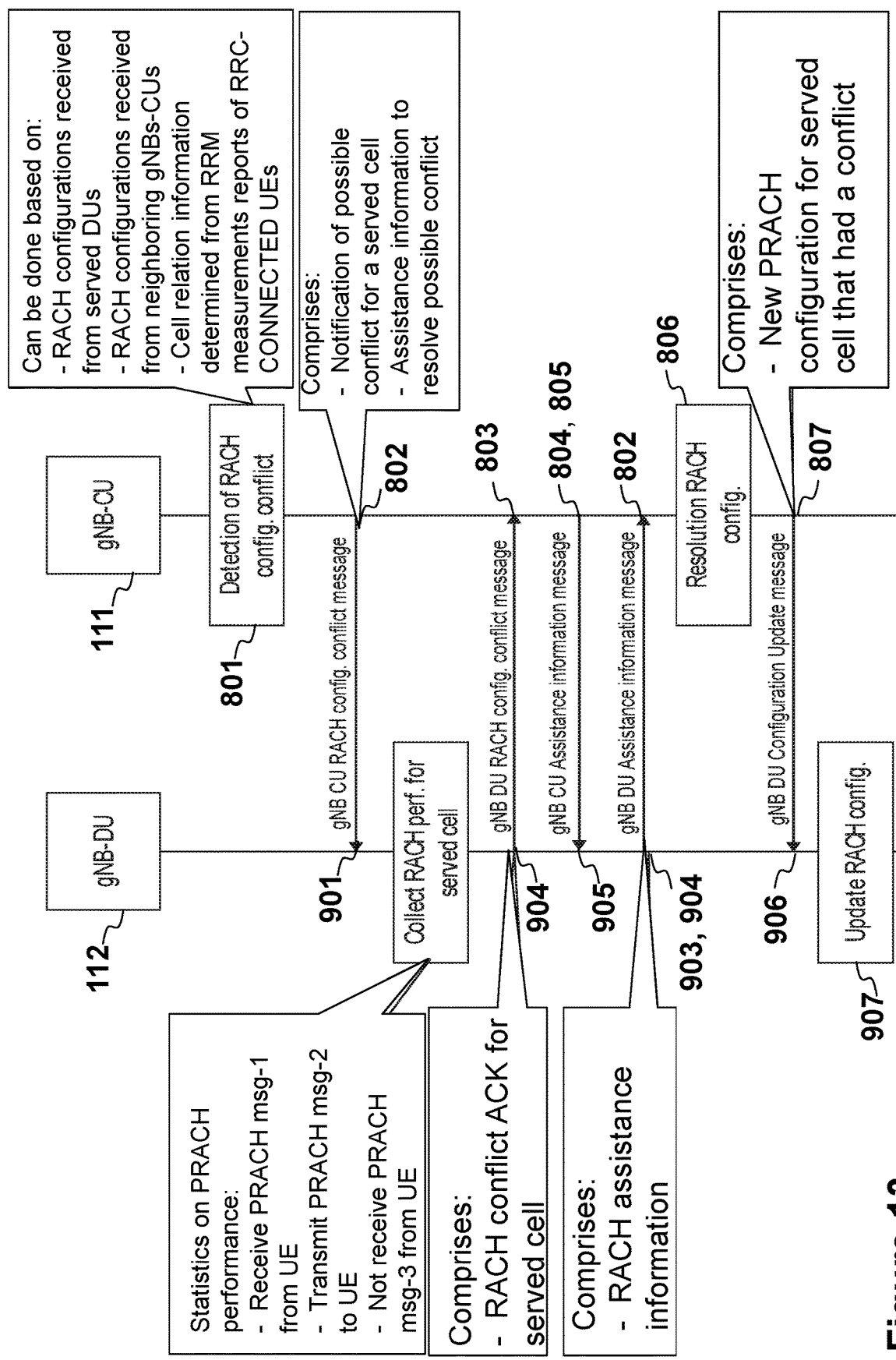
FIG. 13 is a signalling diagram illustrating a non-limiting example of a method, according to embodiments herein.
Figure 14:
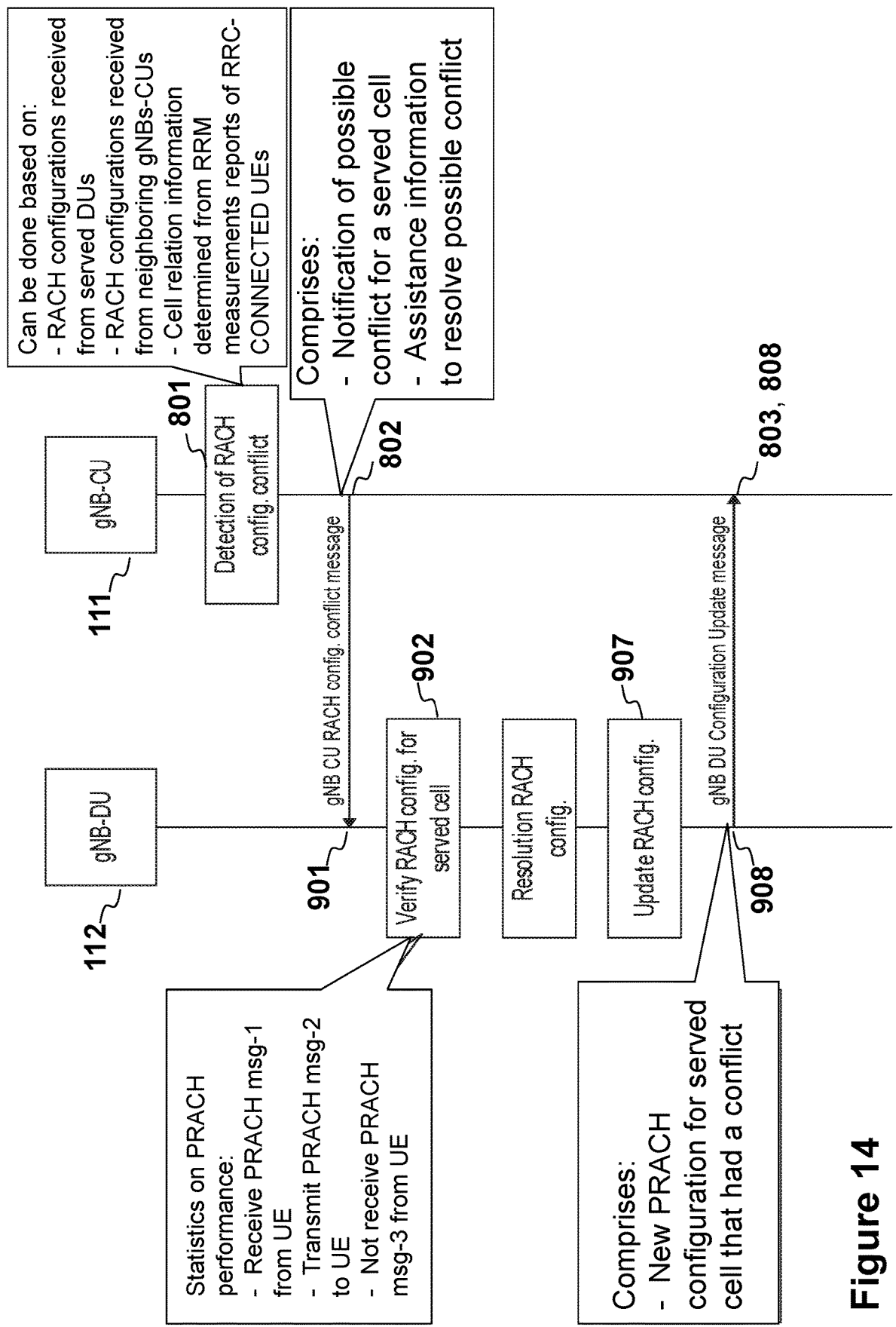
FIG. 14 is a signalling diagram illustrating a non-limiting example of a method, according to embodiments herein.
Figure 15:
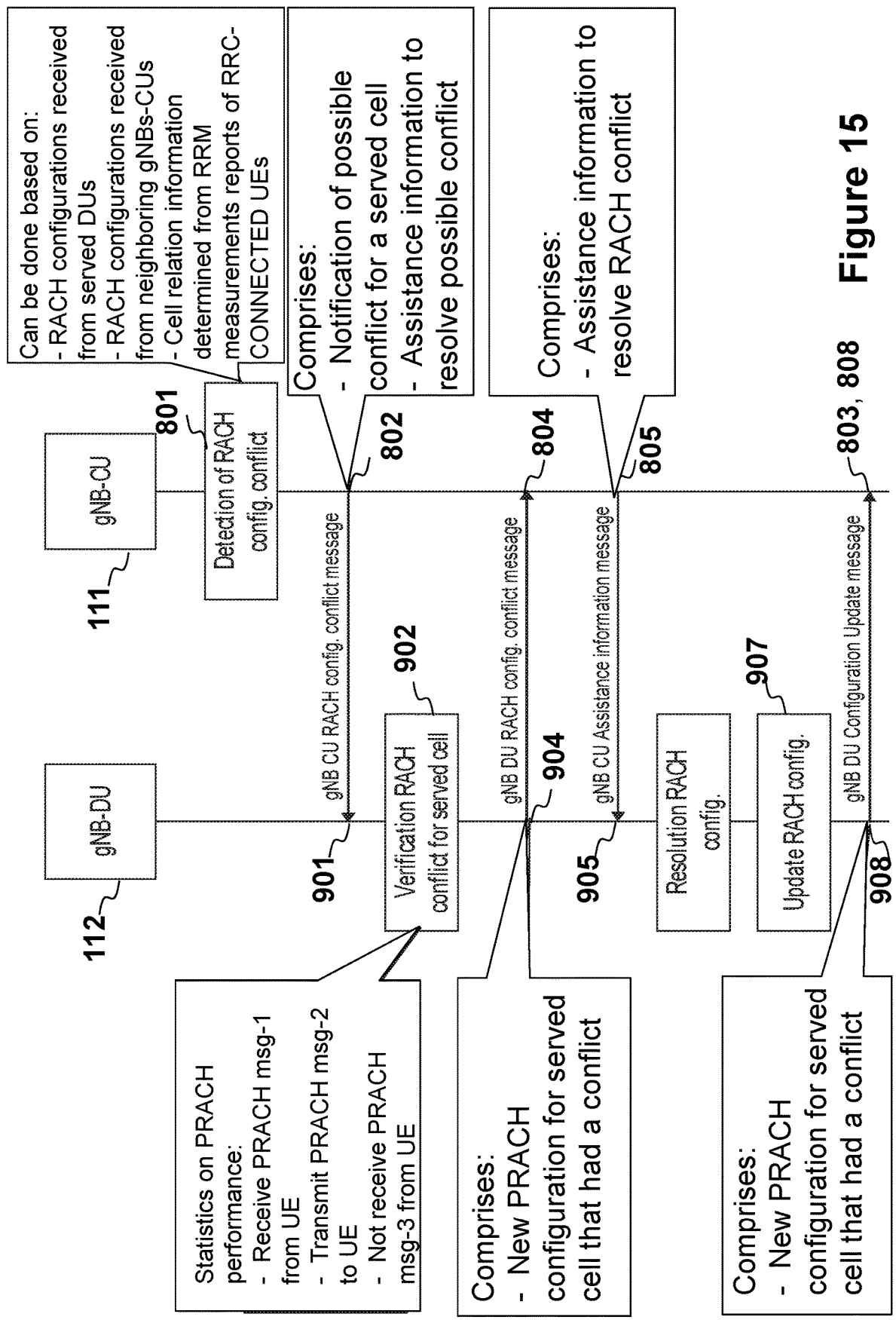
FIG. 15 is a signalling diagram illustrating a non-limiting example of a method, according to embodiments herein.

In light of the descriptions above, a number of particular non-limiting examples of the methods of embodiments herein may be described. FIGS. 11-13 depict non-limiting examples of the method performed by the first network node 111, according to embodiments herein. FIGS. 14-15 depict non-limiting examples of the method performed by the first network node 111 and the second network node 112, according to embodiments herein.

Examples of Embodiments for the First Network Node 111, e.g., the gNB-CU

FIG. 11 is a signalling diagram illustrating another non-limiting example of a method performed by the first network node 111, according to embodiments herein. The reference numerals correspond to the Actions described earlier for each of the first network node 111, and the second network node 112. The direction of the arrows represents the direction of the signalling. The different indications mentioned in the actions are exemplified with particular messages. In FIG. 11, the method performed by the first network node 111 is depicted with a particular exemplary combination of actions the second network node 112 may perform. Embodiments herein may comprise a method executed by the first network node 111 e.g., the gNB-CU, for detecting a RACH configuration conflict between the served cell and a neighboring cell. The method may comprise detecting, according to Action 801, a RACH configuration conflict for the served cell by means of comparing different RACH configurations of cells associated to connected gNB-DUs and of cells served by neighbor gNBs, determining which cells may be neighbouring each other by means of analyzing UE measurements reporting detected neighbor cells, and pinpointing the cells in the same neighbourhood that may have an overlapping RACH configuration. The first network node 111 may also, according to Action 802, transmit, to the second network node 112, e.g., the gNB-DU, a gNB CU RACH config conflict message indicating a possible RACH configuration conflict for the served cell. Such message indicating to the gNB-DU one or more cells subject to RACH configuration conflict, may additionally indicate one or more of the following information: a) that the gNB-DU is tasked with selecting a new RACH configuration for each of such cells, b) that the gNB-DU is tasked with selecting a new RACH configuration for each of such cells, where the gNB-DU, for a given cell in RACH configuration conflict, may need to avoid selection of the RACH configurations indicated by the gNB-CU as not suitable for that cell, c) that the gNB-DU has to adopt for a given cell, indicated by one or more cell identifiers, a RACH configuration with parameters within ranges provided by the gNB-CU; in this case, the gNB-CU may provide an exact RACH configuration to be adopted by the gNB-DU, d) that the gNB-DU may need to verify that the cells indicated by the gNB-CU are subject to RACH configuration conflict, e) that a gNB-DU cell identified by one or more cell identifiers is subject to RACH configuration conflict and that the gNB-DU may need to provide to the gNB-CU assistance information to allow the gNB-CU to make an appropriate choice of the RACH configuration for the cell in question.

Embodiments herein may further comprise a method executed by the second network node 112, e.g., the gNB-DU, the method comprising, according to Action 901, receiving, from the first network node 111, e.g., the gNB-CU, a RACH configuration conflict message indicating a RACH configuration conflict detection/verification for the served cell. Depending on the content of the RACH configuration conflict message, the second network node 112 may perform one or more of the following actions. The second network node 112, according to Action 902, verifies whether a RACH configuration conflict event for the served cell exists, and may signal, according to Action 904, such result to the gNB-CU. The second network node 112 may then take appropriate actions to either resolve, according to Actions 906 and 907, the RACH configuration conflict internally, adopting the information received by the gNB-CU, or prepare, according to Action 903, the assistance information to resolve the RACH conflict issue at the first network node 111, e.g., the gNB-CU. Such assistance information may constitute one or more of the following: ranges of acceptable values for parameters forming the RACH configurations, and minimum and/or maximum amounts of RACH resources that can be supported for the cell. The second network node 112 may transmit, according to Action 908, to the first network node 111, a gNB DU Configuration Update message comprising an instruction or assistance information to resolve the RACH configuration conflict. The second network node 112 may transmit, according to Action 907, to the first network node 111, a message such as the gNB-DU Configuration Update message, communicating to the gNB-CU the newly adopted RACH configuration for the cell in RACH configuration conflict. The second network node 112 may, according to Action 907, transmit, to the first network node 111, a message rejecting a suggested RACH configuration or a range of values to be adopted for a RACH configuration for the cell subject to RACH configuration conflict. Additionally, this message may contain suggested value ranges for the RACH configuration to be adopted or one or more specific RACH configurations the gNB-DU may adopt for the cell subject to RACH configuration conflict.

FIG. 12 is a signalling diagram illustrating another non-limiting example of a method performed by the first network node 111, according to embodiments herein. The reference numerals correspond to the Actions described earlier for each of the first network node 111, and the second network node 112. The direction of the arrows represents the direction of the signalling. The different indications mentioned in the actions are exemplified with particular messages. In FIG. 12, the method performed by the first network node 111 is depicted with a particular exemplary combination of actions the second network node 112 may perform. In this example of the embodiments for first network node 111, e.g., gNB- CU, the first network node 111 detects, according to Action 801, the RACH configuration conflict. This may be performed based on the RACH configurations received from the served gNB-DUs, and configuration received from neighboring gNB-CUs in addition to the cell relation information determined from RRM measurement reported by RRC_Connected mode UEs. The CU RACH conflict verification message, which may referred to as the gNB CU RACH config. Conflict message, may indicate: a) a flag indicating a possible RACH configuration conflict detected for the served cell, b) assistance information associated to detected RACH conflict, such as: ID of the conflicting cell at gNB-DU, subset of RACH resources where possible conflict has been detected, RACH configuration of cells in the neighbourhood of the cell subject to RACH configuration conflict, and range of RACH parameters within which the new RACH configuration may need to be chosen, c) request of assistance information for resolving RACH conflict, that is, the CU may ask for conflict confirmation from the DU, and request some additional information to resolve the issue at CU, such as: request for ACK of conflict, and/or a set of resources for optimizing RACH resources, d) request to resolve RACH conflict at the gNB-DU, that is, the CU may request the DU to solve the issue itself at the DU, which may include: assistance information associated to detected RACH conflict, as above, a set of RACH preferred or not preferred configurations, and/or a set of preferred parameters for optimization of RACH configuration. Embodiments herein may comprise a resolution of the RACH configuration conflict at the gNB-CU, according to Action 806. This may be performed according to different solutions or approaches. In a first solution, Solution 1, depicted in FIG. 12, the first network node 111 may receive, according to Action 803, a gNB DU RACH config conflict message from the gNB-DU which may comprise: an instruction to resolve the RACH conflict with an implicit ACK, an ACK of a RACH conflict with an implicit instruction to resolve it, an ACK and instruction to resolve RACH conflict, any assistance information for RACH optimization, such as PRACH performance statistics. The first network node 111 may then, according to Action 806, determine new RACH configuration based on the information included in gNB DU RACH config conflict message. The first network node 111 may also transmit, according to Action 807, the new RACH configuration to the gNB-DU by sending a gNB CU configuration update message. Another solution, Solution 2, is provided in FIG. 13.

FIG. 13 is a signalling diagram illustrating another non-limiting example of a method performed by the first network node 111, according to embodiments herein. The reference numerals correspond to the Actions described earlier for each of the first network node 111, and the second network node 112. The direction of the arrows represents the direction of the signalling. The different indications mentioned in the actions are exemplified with particular messages. In FIG. 13, the method performed by the first network node 111 is depicted with a particular exemplary combination of actions the second network node 112 may perform. In the second solution, Solution 2, the first network node 111 may receive, according to Action 803, a gNB DU RACH config conflict message from the gNB-DU which may comprise: an instruction to resolve the RACH conflict, with an implicit ACK, an ACK of a RACH conflict, with an implicit instruction to resolve it, and/or ACK and instruction to resolve RACH conflict. The ACK and instruction to resolve RACH conflict may in turn: a) request additional assistance information, e.g., a gNB CU Assistance information message, for example: assistance information to resolve RACH conflict, such as ranges of acceptable values for parameters forming the RACH configurations, and/or minimum and/or maximum amounts of RACH resources that can be supported for the cell, and b) receive additional RACH assistance information, e.g., DU RACH assistance info messages. The first network node 111 may then, according to Action 806, determine a new RACH configuration based on gNB DU Assistance information message and the additional RACH assistance information provided from DU RACH assistance info messages. The first network node 111 may then, according to Action 807, transmit the new RACH configuration to the gNB-DU by sending a gNB CU configuration update message.

Examples of Embodiments for the Second Network Node 112, e.g., the gNB-DU

FIG. 14 is a signalling diagram illustrating another non-limiting example of methods performed by the first network node 111 and the second network node 112, according to embodiments herein. The reference numerals correspond to the Actions described earlier for each of the first network node 111, and the second network node 112. The direction of the arrows represents the direction of the signalling. The different indications mentioned in the actions are exemplified with particular messages. The second network node 112 verifies, according to Action 902, whether a RACH configuration conflict event for the served cell has taken place. The second network node 112 may then perform a resolution of the RACH configuration conflict at the gNB-DU. According to a first solution, Solution 1, if the verification of the RACH configuration conflict indicates a conflict at the serving cell of the gNB DU the second network node 112 may: a) resolve the RACH configuration conflict of the conflicting serving cell based on the assistance information provided by gNB CU, and b) determine, according to Action 906, a new RACH configuration and apply, according to Action 907, to the configuration of the conflicting serving cell. The second network node 112 may then send, according to Action 908, a RACH configuration update message to the gNB-CU and the DU OAM informing the gNB-CU and the DU OAM when the conflict is resolved, and the new RACH configuration is applied to the conflicting cell at the DU.

FIG. 15 is a signalling diagram illustrating another non-limiting example of methods performed by the first network node 111 and the second network node 112, according to embodiments herein. The reference numerals correspond to the Actions described earlier for each of the first network node 111, and the second network node 112. The direction of the arrows represents the direction of the signalling. The different indications mentioned in the actions are exemplified with particular messages. The second network node 112, according to Action 902, verifies whether a RACH configuration conflict event for the served cell has taken place. The second network node 112 may then, according to Action 904, send a gNB DU RACH config conflict message if a RACH conflict is detected, by transmitting a DU RACH conflict verification message which may comprise: a) an instruction to resolve the RACH conflict, with an implicit ACK, b) an ACK of the RACH conflict, with an implicit instruction to resolve it, c) ACK and instruction to resolve the RACH conflict, assistance information to resolve RACH conflict, such as: RACH configuration of conflicting neighboring cell(s), RACH configuration of neighboring cells that may need to be avoided, and/or, if RACH resolution is performed at the CU, a range of values for a set of parameters for optimization of RACH configuration at the gNB-DU. If RACH resolution is performed at the DU, the DU RACH conflict verification message may comprise d) an updated RACH configuration for the served cell. According to a first solution, Solution 2, if the verification of RACH configuration conflict indicates the conflict at the serving cell of the gNB DU, the second network node 112 may: a) resolve the RACH configuration conflict by additional assistance information received from the gNB-CU, b) receive, according to Action 905, the additional RACH assistance information from the CU, as part of the gNB CU Assistance information message, c) resolve the RACH configuration conflict of the conflicting serving cell based on the assistance information provided by gNB CU, d) determine, according to Action 906, a new RACH configuration and apply to the configuration of the conflicting serving cell, and e) update, according to Action 907, the gNB CU by means of gNB DU configuration update message.

According to examples of embodiments herein, the second network node 112 may update, according to Action 907, the RACH configuration at the gNB-DU when the conflict may be resolved at the gNB-CU by updating the RACH configuration for the served cell based on the RACH configuration indicated, according to Action 906, by the gNB-CU within the RACH configuration update message.

According to examples of embodiments herein, the second network node 112 may, according to Action 908, send a RACH configuration update message to the gNB-CU and the DU OAM informing the gNB-CU and the DU OAM when the conflict is resolved, and the new RACH configuration may be applied to the conflicting cell at the DU.

As may be understood from the foregoing disclosure, existing methods for detecting and resolving RACH conflict in a traditional, non-split, architecture cannot be applied to the case of a split architecture where a first and a second node may be understood to have only access to partial information about the status of the RACH configuration with neighboring cells. Certain embodiments disclosed herein may provide one or more of the following technical advantage(s), which may be summarized as follows. Embodiments herein may provide a solution to the problem of RACH optimization in NR based on detection of RACH configuration conflict at the gNB-CU. By adopting this solution, the network will be able to automatically resolve any case of RACH conflict and therefore to prevent possible delays in UE access to the network or even failures to UE access due to interference generated to cells in proximity with one another and adopting an overlapping set of RACH resources.

FIG. 16 depicts two different examples in panels a) and b), respectively, of the arrangement that the first network node 111 may comprise. In some embodiments, the first network node 111 may comprise the following arrangement depicted in FIG. 16a. The first network node 111 may be understood to be for handling a RACH, configuration. The first network node 111 is configured to operate in the wireless communications network 100 with a RAT with a split architecture, wherein the first network node 111 is configured to be the CU, and the second network node 112 is configured to be the DU.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 16, optional units are indicated with dashed boxes. The detailed description of some of the following corresponds to the same references provided above, in relation to the actions described for the first network node 111, and will thus not be repeated here. For example, in some embodiments, the first network node 111 may be a gNB-CU. In some embodiments, the second network node 112 may be a gNB-DU. In some embodiments, the first network node 111 may be a gNB-CU and the second network node 112 may be a gNB-DU.

The first network node 111 is configured to perform the detecting of Action 801, e.g. by means of a determining unit 1601 within the first network node 111, configured to detect the conflict between the first RACH configuration in the first cell 121, the first cell 121 being configured to be the served cell, and the second RACH configuration in the second cell 122. The determining unit 1601 may be a processor 1606 of the first network node 111, or an application running on such processor.

In some embodiments, the second cell 122 may be configured to be a neighbor cell to the first cell 121. For example, the second cell 122 may be configured to be a cell of a neighbor DU, as described earlier.

The first network node 111 is configured to perform the sending of Action 802, e.g. by means of a sending unit 1602, configured to perform send the first indication to the second network node 112 configured to operate in the wireless communications network 100. The first indication is configured to be based on the detected conflict. The first indication is configured to comprise at least one of: i) the notification of the conflict for the served cell, ii) the assistance information associated to the detected conflict to assist the second network node 112 to resolve the detected conflict for the served cell, iii) the request for the assistance information configured to be associated to the detected conflict to assist the first network node 111 to resolve the detected conflict for the served cell, and iv) the request for the second network node 112 to resolve the detected conflict for the served cell. The sending unit 1602 may be a processor 1606 of the first network node 111, or an application running on such processor.

The first network node 111 is configured to perform the receiving of Action 803, e.g. by means of a receiving unit 1603, configured to receive the one or more second indications from the second network node 112. The one or more second indications are configured to be based on the sent first indication. At least one of the received one or more second indications is configured to be based on the result of the verification of the existence of the detected conflict. The receiving unit 1603 may be a processor 1606 of the first network node 111, or an application running on such processor.

In some embodiments, the conflict may be configured to be the RACH conflict and the one or more second indications may be configured to comprise at least one of: the instruction to resolve the conflict, the acknowledgement of the conflict, the acknowledgement of the conflict and the instruction to resolve the conflict, the request for additional assistance information, and the additional assistance information from the second network node 112.

In some embodiments, the first network node 111 may be further configured to perform the obtaining of Action 806, e.g. by means of an obtaining unit 1604, configured to obtain the first third RACH configuration based on the detected conflict, to change the first RACH configuration to the first third RACH configuration. The obtaining unit 1604 may be a processor 1606 of the first network node 111, or an application running on such processor.

In some embodiments, the first network node 111 may be further configured to perform the sending of Action 807, e.g. by means of the sending unit 1602, configured to send the message to the second network node 112 being configured to indicate the obtained first third RACH configuration.

In some embodiments, the first third RACH configuration may be may be configured to operate based on the received one or more second indications.

In some embodiments, one of the following may apply: the one or more second indications may be configured to indicate the first third RACH configuration, and the first third RACH configuration may be configured to obtained based on the one or more second indications.

In some embodiments, the first network node 111 may be further configured to perform the obtaining of Action 804, e.g. by means of the obtaining unit 1604, configured to obtain the first assistance information based on the determined conflict.

In some embodiments, the first network node 111 may be configured to perform the sending of Action 805, e.g. by means of the sending unit 1602, configured to send the third indication to the second network node 112. The third indication may be configured to indicate the obtained first assistance information. At least one of the received one or more second indications may be configured to be based on the third indication configured to be sent.

In some embodiments, the conflict may be configured to be a RACH conflict and at least one of: the assistance information configured to be comprised in the first indication and the first assistance information may be configured to comprise at least one of: the information related to RACH configurations of neighbouring cells that may create the RACH configuration conflict, the information related to RACH configurations of other neighbouring cells to be avoided, and the range of parameters for RACH configuration available for use by the second network node 112 to resolve the RACH configuration conflict.

In some embodiments, the first network node 111 may be further configured to perform the receiving of Action 808, e.g. by means of the receiving unit 1603, configured to receive the fourth indication from the second network node 112 configured to operate in the wireless communications network 100. The fourth indication may be configured to be based on the second third RACH configuration, and/or on the first RACH configuration as changed to the second third RACH configuration by the second network node 112. The fourth indication may be configured to notify the occurred change of RACH configuration for the served cell in the conflict to the second third RACH configuration In some embodiments, the conflict may be configured to be between the RACH configuration associated to the first SSB beam of the first cell 121 and the another RACH configuration associated to the second SSB beam of the second cell 122.

Other units 1605 may be comprised in the first network node 111.

The embodiments herein in the first network node 111 may be implemented through one or more processors, such as a processor 1606 in the first network node 111 depicted in FIG. 16*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1607 comprising one or more memory units. The memory 1607 is arranged to be used to store obtained information, store data, configurations, schedulings, and applications etc. to perform the methods herein when being executed in the first network node 111.

In some embodiments, the first network node 111 may receive information from, e.g., the second network node 112, or the user equipment described earlier, through a receiving port 1608. In some embodiments, the receiving port 1608 may be, for example, connected to one or more antennas in first network node 111. In other embodiments, the first network node 111 may receive information from another structure in the wireless communications network 100 through the receiving port 1608. Since the receiving port 1608 may be in communication with the processor 1606, the receiving port 1608 may then send the received information to the processor 1606. The receiving port 1608 may also be configured to receive other information.

The processor 1606 in the first network node 111 may be further configured to transmit or send information to e.g., the second network node 112, the user equipment, or the third network node 113, or another structure in the wireless communications network 100, through a sending port 1609, which may be in communication with the processor 1606, and the memory 1607.

Those skilled in the art will also appreciate that the determining unit 1601, the sending unit 1602, the receiving unit 1603, the obtaining unit 1604 and the other units 1605 described above may refer to a combination of analog and digital circuits, and/or one or more processors configured with software and/or firmware, e.g., stored in memory, that, when executed by the one or more processors such as the processor 1606, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1601-1605 described above may be implemented as one or more applications running on one or more processors such as the processor 1606.

Thus, the methods according to the embodiments described herein for the first network node 111 may be respectively implemented by means of a computer program 1610 product, comprising instructions, i.e., software code portions, which, when executed on at least one processor 1606, cause the at least one processor 1606 to carry out the actions described herein, as performed by the first network node 111. The computer program 1610 product may be stored on a computer-readable storage medium 1611. The computer-readable storage medium 1611, having stored thereon the computer program 1610, may comprise instructions which, when executed on at least one processor 1606, cause the at least one processor 1606 to carry out the actions described herein, as performed by the first network node 111. In some embodiments, the computer-readable storage medium 1611 may be a non-transitory computer-readable storage medium, such as a CD ROM disc, or a memory stick. In other embodiments, the computer program 1610 product may be stored on a carrier containing the computer program 1610 just described, wherein the carrier is one of an electronic signal, optical signal, radio signal, or the computer-readable storage medium 1611, as described above.

The first network node 111 may comprise a communication interface configured to facilitate communications between the first network node 111 and other nodes or devices, e.g., the second network node 112, the user equipment, the third network node 113, or another structure. The interface may, for example, include a transceiver configured to transmit and receive radio signals over an air interface in accordance with a suitable standard.

In other embodiments, the first network node 111 may comprise the following arrangement depicted in FIG. 16*b*. The first network node 111 may comprise a processing circuitry 1606, e.g., one or more processors such as the processor 1606, in the first network node 111 and the memory 1607. The first network node 111 may also comprise a radio circuitry 1612, which may comprise e.g., the receiving port 1608 and the sending port 1609. The processing circuitry 1606 may be configured to, or operable to, perform the method actions according to FIG. 8, FIGS. 10-15 and/or FIGS. 19-23, in a similar manner as that described in relation to FIG. 16*a*. The radio circuitry 1612 may be configured to set up and maintain at least a wireless connection with the second network node 112, the user equipment, the third network node 113, or another structure. Circuitry may be understood herein as a hardware component.

Hence, embodiments herein also relate to the first network node 111 operative to operate in the wireless communications network 100. The first network node 111 may comprise the processing circuitry 1606 and the memory 1607, said memory 1607 containing instructions executable by said processing circuitry 1606, whereby the first network node 111 is further operative to perform the actions described herein in relation to the first network node 111, e.g., in FIG. 8, FIGS. 10-15 and/or FIGS. 19-23.

FIG. 17 depicts two different examples in panels a) and b), respectively, of the arrangement that the second network node 112 may comprise. In some embodiments, the second network node 112 may comprise the following arrangement depicted in FIG. 17*a*. The second network node 112 may be understood to be for handling a RACH, configuration. The second network node 112 is configured to operate in the wireless communications network 100 with the RAT with the split architecture, wherein the second network node 112 is configured to be the DU, and the first network node 111 is configured to be the CU.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. In FIG. 17, optional units are indicated with dashed boxes. The detailed description of some of the following corresponds to the same references provided above, in relation to the actions described for the first network node 111, and will thus not be repeated here. For example, in some embodiments, the second network node 112 may be a gNB-DU. In some embodiments, the first network node 111 may be a gNB-CU. In some embodiments, the first network node 111 may be a gNB-CU and the second network node 112 may be a gNB-DU.

The second network node 112 may be configured to perform the receiving of Action 901, e.g. by means of a receiving unit 1701 within the second network node 112, configured to receive the first indication from the first network node 111 configured to operate in the wireless communications network 100. The first indication is configured to be based on the conflict between the first RACH configuration in the first cell 121, the first cell 121 being configured to be the served cell, and the second RACH configuration in the second cell 122. The first indication is configured to comprise at least one of: i) the notification of the conflict for the served cell, ii) the assistance information configured to be associated to the detected conflict to assist the second network node 112 to resolve the detected conflict for the served cell, iii) the request for the assistance information configured to be associated to the detected conflict to assist the first network node 111 to resolve the detected conflict for the served cell, and iv) the request for the second network node 112 to resolve the detected conflict for the served cell. The receiving unit 1701 may be a processor 1707 of the second network node 112, or an application running on such processor.

In some embodiments, the second cell 122 may be configured to be a neighbor cell to the first cell 121. For example, the second cell 122 may be configured to be a cell of a neighbor DU, as described earlier.

The second network node 112 is configured to perform the verifying of Action 902, e.g. by means of a verifying unit 1702, configured to verify the existence of the conflict based on the received first indication. The verifying unit 1702 may be a processor 1707 of the second network node 112, or an application running on such processor.

The second network node 112 is configured to perform the sending of Action 904, e.g. by means of a sending unit 1703, configured to send the one or more second indications to the first network node 111. At least one of the one or more second indications is configured to be based on the result of the verification. The sending unit 1703 may be a processor 1707 of the second network node 112, or an application running on such processor.

In some embodiments, the second network node 112 may be configured to perform the obtaining of Action 903, e.g. by means of an obtaining unit 1704, configured to obtain the second third RACH configuration based on the first indication, to update the first RACH configuration to the second third RACH configuration. At least one of the one or more second indications configured to be sent is configured to be based on the second third RACH configuration configured to be obtained. The obtaining unit 1704 may be a processor 1707 of the second network node 112, or an application running on such processor.

In some embodiments, the first network node 111 may be configured to perform the changing of Action 907, e.g. by means of a changing unit 1705, configured to change the first RACH configuration to the second third RACH configuration, based on the first indication configured to be received. The changing unit 1705 may be a processor 1707 of the first network node 111, or an application running on such processor.

In some embodiments, the second network node 112 may be configured to perform the obtaining of Action 906, e.g. by means of the obtaining unit 1704, configured to obtain second assistance information based on the first indication configured to be received. At least one of the one or more second indications configured to be sent may be configured to be based on the second assistance information configured to be obtained.

In some embodiments, at least one of the one or more second indications may be configured to indicate the second third RACH configuration.

In some embodiments, the second network node 112 may be configured to perform the sending of Action 908, e.g. by means of the sending unit 1703, configured to send the fourth indication to at least one of the first network node 111 and the third network node 113 configured to operate in the wireless communications network 100. The fourth indication may be configured to be based on the second third RACH configuration, and/or on the first RACH configuration as changed to the second third RACH configuration by the second network node 112. The fourth indication may be configured to notify the occurred change of RACH configuration for the served cell in the conflict.

In some embodiments, the second network node 112 may be configured to perform the receiving of Action 905, e.g. by means of the receiving unit 1701, configured to receive the third indication from the first network node 111. The third indication may be configured to be based on the first assistance information. At least one of the one or more second indications configured to be sent may be based on the third indication configured to be received.

In some embodiments, the conflict may be configured to be between the RACH configuration configured to be associated to the first SSB beam of the first cell 121 and another RACH configuration configured to be associated to the second SSB beam of the second cell 122.

Other units 1706 may be comprised in the second network node 112.

The embodiments herein in the second network node 112 may be implemented through one or more processors, such as a processor 1707 in the second network node 112 depicted in FIG. 17*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1708 comprising one or more memory units. The memory 1708 is arranged to be used to store obtained information, store data, configurations, schedulings, and applications etc. to perform the methods herein when being executed in the second network node 112.

In some embodiments, the second network node 112 may receive information from, e.g., the first network node 111, the user equipment or the third network node 113, through a receiving port 1709. In some embodiments, the receiving port 1709 may be, for example, connected to one or more antennas in second network node 112. In other embodiments, the second network node 112 may receive information from another structure in the wireless communications network 100 through the receiving port 1709. Since the receiving port 1709 may be in communication with the processor 1707, the receiving port 1709 may then send the received information to the processor 1707. The receiving port 1709 may also be configured to receive other information.

The processor 1707 in the second network node 112 may be further configured to transmit or send information to e.g., the first network node 111, the third network node 113, the user equipment, or another structure in the wireless communications network 100, through a sending port 1710, which may be in communication with the processor 1707, and the memory 1708.

Those skilled in the art will also appreciate that the receiving unit 1701, the verifying unit 1702, the sending unit 1703, the obtaining unit 1704, the changing unit 1705, and the other units 1706 described above may refer to a combination of analog and digital circuits, and/or one or more processors configured with software and/or firmware, e.g., stored in memory, that, when executed by the one or more processors such as the processor 1707, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1701-1706 described above may be implemented as one or more applications running on one or more processors such as the processor 1707.

Thus, the methods according to the embodiments described herein for the second network node 112 may be respectively implemented by means of a computer program 1711 product, comprising instructions, i.e., software code portions, which, when executed on at least one processor 1707, cause the at least one processor 1707 to carry out the actions described herein, as performed by the second network node 112. The computer program 1711 product may be stored on a computer-readable storage medium 1712. The computer-readable storage medium 1712, having stored thereon the computer program 1711, may comprise instructions which, when executed on at least one processor 1707, cause the at least one processor 1707 to carry out the actions described herein, as performed by the second network node 112. In some embodiments, the computer-readable storage medium 1712 may be a non-transitory computer-readable storage medium, such as a CD ROM disc, or a memory stick. In other embodiments, the computer program 1711 product may be stored on a carrier containing the computer program 1711 just described, wherein the carrier is one of an electronic signal, optical signal, radio signal, or the computer-readable storage medium 1712, as described above.

The second network node 112 may comprise a communication interface configured to facilitate communications between the second network node 112 and other nodes or devices, e.g., the first network node 111, the third network node 113, the user equipment or another structure. The interface may, for example, include a transceiver configured to transmit and receive radio signals over an air interface in accordance with a suitable standard.

In other embodiments, the second network node 112 may comprise the following arrangement depicted in FIG. 17*b*. The second network node 112 may comprise a processing circuitry 1707, e.g., one or more processors such as the processor 1707, in the second network node 112 and the memory 1708. The second network node 112 may also comprise a radio circuitry 1713, which may comprise e.g., the receiving port 1709 and the sending port 1710. The processing circuitry 1707 may be configured to, or operable to, perform the method actions according to FIG. 9, FIGS. 10-15 and/or FIGS. 19-23, in a similar manner as that described in relation to FIG. 17*a*. The radio circuitry 1713 may be configured to set up and maintain at least a wireless connection with e.g., the first network node 111, the third network node 113, the user equipment or another structure. Circuitry may be understood herein as a hardware component.

Hence, embodiments herein also relate to the second network node 112 operative to operate in the wireless communications network 100. The second network node 112 may comprise the processing circuitry 1707 and the memory 1708, said memory 1708 containing instructions executable by said processing circuitry 1707, whereby the second network node 112 is further operative to perform the actions described herein in relation to the second network node 112, e.g., in FIG. 9, FIGS. 10-15 and/or FIGS. 19-23.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Examples Related to Embodiments Herein

Some other examples related to embodiments herein will now be described.

Several examples are comprised herein. It should be noted that the examples herein are not mutually exclusive. Components from one example may be tacitly assumed to be present in another example and it will be obvious to a person skilled in the art how those components may be used in the other exemplary examples.

More specifically, the following are examples related to a first network node, such as the first network node 111, e.g., a gNB-CU, and examples related to a second network node, such as the second network node 112, e.g., a gNB-DU.

The first network node examples relate to FIG. 18, FIG. 16 and FIGS. 19-23.

A method, performed by a first network node, such as the first network node 111, is described herein. The method may be understood to be for handling a Random Access Channel (RACH) configuration. The first network node 111 may operate in the wireless communications network 100.

Figure 18:
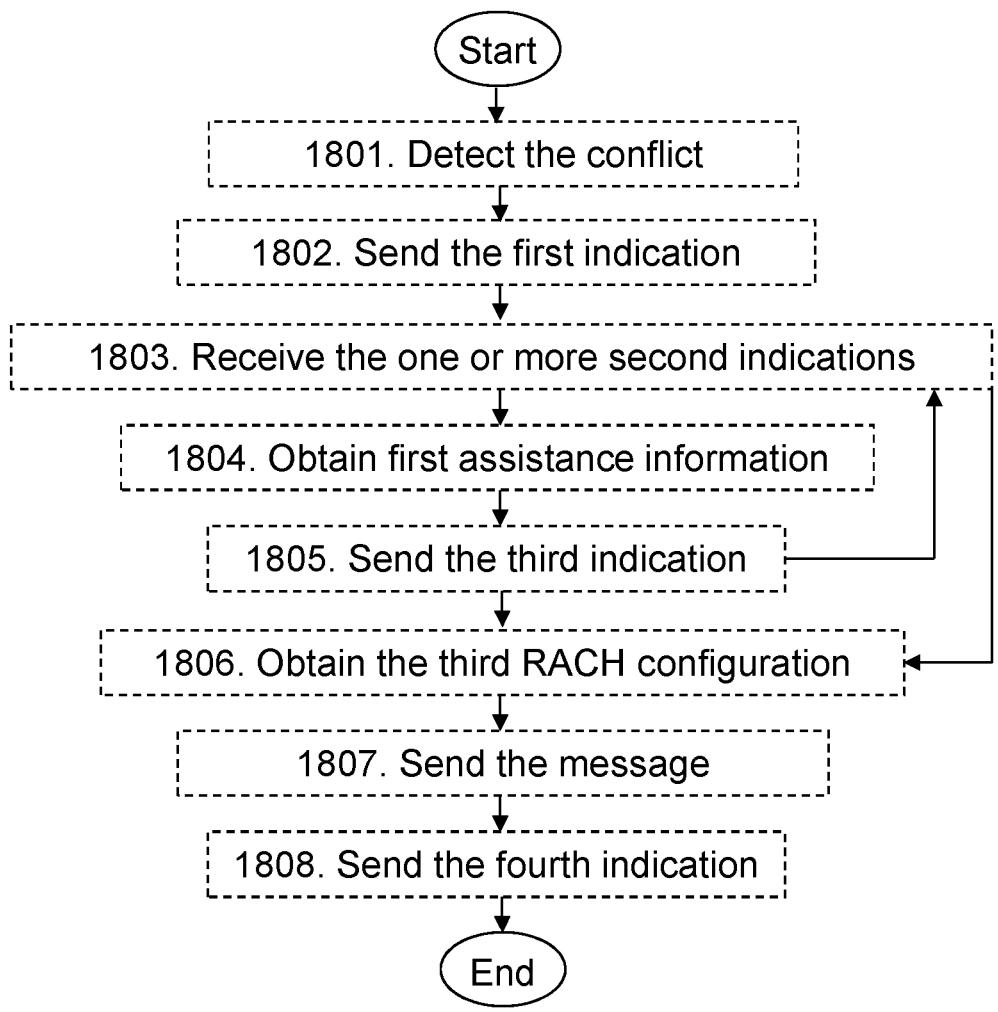
FIG. 18 is a flowchart depicting an example of a method in a first network node, according to an example related to embodiments herein.

Several examples are comprised herein. In some examples all the actions may be performed. In some examples, one or more actions may be performed. It should be noted that the examples herein are not mutually exclusive. One or more examples may be combined, where applicable. All possible combinations are not described to simplify the description. Components from one example may be tacitly assumed to be present in another example and it will be obvious to a person skilled in the art how those components may be used in the other exemplary examples. A non-limiting example of the method performed by the first network node 111 is depicted in FIG. 18. Some actions may be performed in a different order than that shown in FIG. 18. Some of the actions may be performed more than once, e.g., iteratively.

In some examples, the first network node 111 may be a gNB-CU.

In some examples, the second network node 112 may be a gNB-DU.

In some examples, the first network node 111 may be a gNB-CU and the second network node 112 may be a gNB-DU.

Detecting 1801, or determining an existence of, a conflict. The conflict may be between a first RACH configuration, e.g., in the first cell 121, wherein the first cell 121 may be a served cell, and a second RACH configuration, e.g., in a second cell 122, wherein the second cell 122 may be a neighbor cell to the first cell 121. The first network node 111 may be configured to perform this detecting 1801 action, e.g. by means of a determining unit 1601 within the first network node 111, configured to perform this action. The determining unit 1601 may be a processor 1606 of the first network node 111, or an application running on such processor.

Determining may be understood as calculating, or deriving.

Sending 1802 a first indication to a second network node, such as the second network node 112 operating in the wireless communications network 100. The first network node 111 may be configured to perform this sending action 1802, e.g. by means of a sending unit 1602, configured to perform this action. The sending unit 1602 may be a processor 1606 of the first network node 111, or an application running on such processor.

The first indication may be based on the detected/determined conflict.

Sending may be understood as transmitting, or providing, e.g., via the first link 141.

Obtaining 1806 a third RACH configuration. The first network node 111 may be configured to perform this obtaining action 1806, e.g. by means of an obtaining unit 1604, configured to perform this action. The obtaining unit 1604 may be a processor 1606 of the first network node 111, or an application running on such processor.

Obtaining may be understood as determining, calculating, deriving, retrieving, or receiving, e.g., via the first link 141.

The obtaining in this action 1806 of the third RACH configuration may be based on the detected conflict. The obtaining in this action 1806 of the third RACH configuration may be to change/update the first RACH configuration to the third RACH configuration.

Sending 1807 a message to the second network node 112. The first network node 111 may be configured to perform this sending action 1807, e.g. by means of the sending unit 1602, configured to perform this action.

The message may indicate the obtained third RACH configuration.

Receiving 1803 one or more second indications from the second network node 112. The first network node 111 may be configured to perform this receiving action 1803, e.g. by means of a receiving unit 1603, configured to perform this action. The receiving unit 1603 may be a processor 1606 of the first network node 111, or an application running on such processor.

The one or more second indications may be based on the sent first indication. The third RACH configuration may be based on the received one or more second indications.

In some examples, the second indication may indicate the third RACH configuration.

In some examples, the third RACH configuration may be obtained based on the one or more second indications.

Obtaining 1804 first assistance information. The first network node 111 may be configured to perform this obtaining action 1804, e.g. by means of the obtaining unit 1604, configured to perform this action.

The first assistance information may be based on the determined conflict.

Sending 1805 a third indication to the second network node 112. The first network node 111 may be configured to perform this sending action 1805, e.g. by means of the sending unit 1602, configured to perform this action.

The third indication may be based on the obtained first assistance information. At least one of the received one or more second indications may be based on the sent third indication.

Receiving 1808 a fourth indication from the second network node 112 operating in the wireless communications network 100. The first network node 111 may be configured to perform this receiving action 1808, e.g. by means of the receiving unit 1603, configured to perform this action.

The fourth indication may be based on the obtained third RACH configuration, and/or on the first RACH configuration as changed/updated to the third RACH configuration by the second network node 112.

Receiving in this Action 1808 may be performed, e.g., via the first link 141.

Examples of these actions and the indications are provided later in this document.

Other units 1605 may be comprised in the first network node 111.

The first network node 111 may also be configured to communicate user data with a host application unit in a host computer 1910, e.g., via another link such as 1950.

In FIG. 16, optional units are indicated with dashed boxes.

The first network node 111 may comprise an interface unit to facilitate communications between the first network node 111 and other nodes or devices, e.g., the second network node 112, the user equipment, the host computer 1910, or any other nodes. In some particular examples, the interface may, for example, include a transceiver configured to transmit and receive radio signals over an air interface in accordance with a suitable standard.

Figure 19:
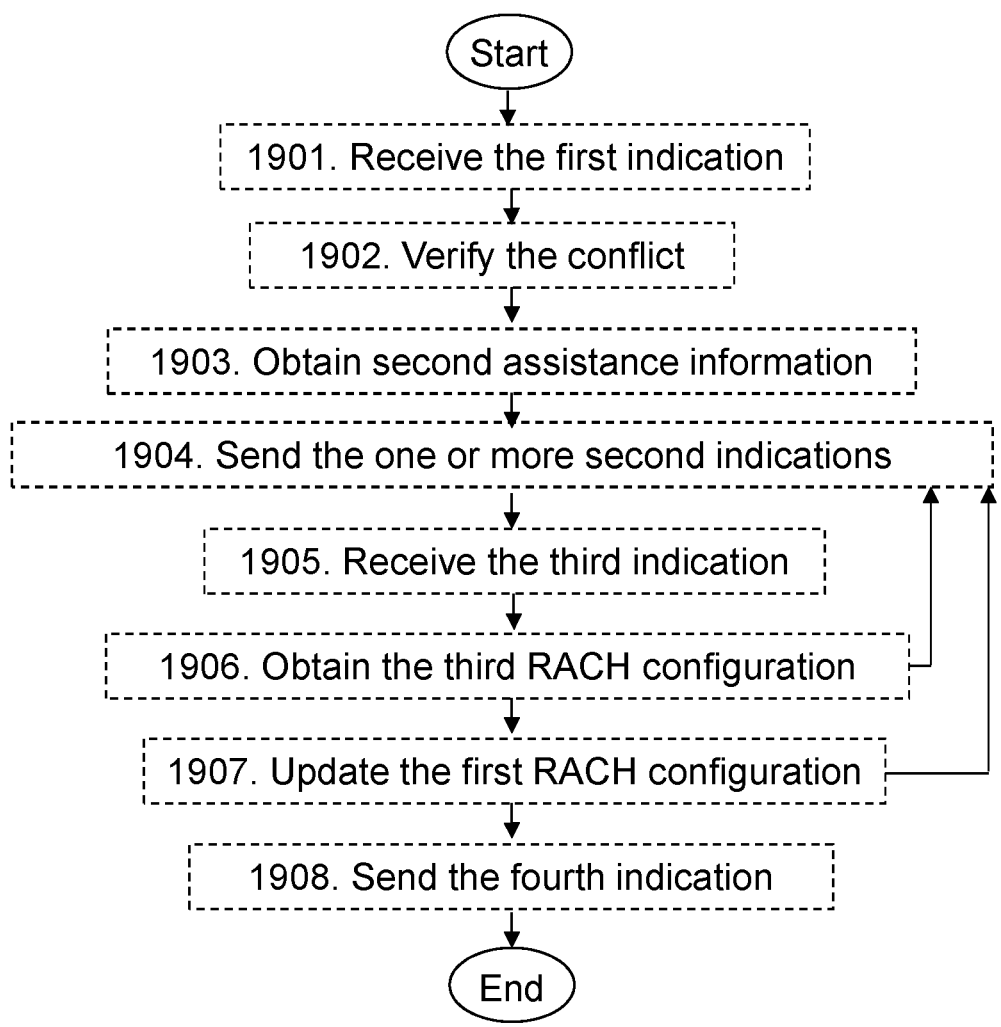
FIG. 19 is a flowchart depicting an example of a method in a second network node, according to an example related to embodiments herein.

The first network node 111 may comprise an arrangement as shown in FIG. 16 or in FIG. 19.

The first network node examples relate to FIG. 19, FIG. 17 and FIGS. 19-23.

A method, performed by a second network node, such as the second network node 112, is described herein. The method may be understood to be for handling a Random Access Channel (RACH) configuration. The second network node 112 may operate in the wireless communications network 100.

Several examples are comprised herein. In some examples all the actions may be performed. In some examples, one or more actions may be performed. It should be noted that the examples herein are not mutually exclusive. One or more examples may be combined, where applicable. All possible combinations are not described to simplify the description. Components from one example may be tacitly assumed to be present in another example and it will be obvious to a person skilled in the art how those components may be used in the other exemplary examples. A non-limiting example of the method performed by the second network node 112 is depicted in FIG. 19. Some actions may be performed in a different order than that shown in FIG. 19. Some of the actions may be performed more than once, e.g., iteratively.

In some examples, the second network node 112 may be a gNB-DU.

In some examples, the first network node 111 may be a gNB-CU.

In some examples, the first network node 111 may be a gNB-CU and the second network node 112 may be a gNB-DU.

Receiving 1901 the first indication from a first network node such as the first network node 111 operating in the wireless communications network 100. The second network node 112 may be configured to perform this receiving 1901 action, e.g. by means of a receiving unit 1701 within the second network node 112, configured to perform this action. The receiving unit 1701 may be a processor 1707 of the second network node 112, or an application running on such processor.

The first indication may be based on the conflict between the first RACH configuration in the first cell 121, wherein the first cell 121 may be a served cell, and the second RACH configuration in the second cell 122, wherein the second cell 122 may be a neighbor cell to the first cell 121.

Receiving may be performed, e.g., via the first link 141.

Sending 1904 the one or more second indications to the first network node 111. The second network node 112 may be configured to perform this sending action 1904, e.g. by means of a sending unit 1703, configured to perform this action. The sending unit 1703 may be a processor 1707 of the second network node 112, or an application running on such processor.

Sending may be understood as transmitting, or providing, e.g., via the first link 141.

The one or more second indications may be based on the received first indication.

Changing 1907, or updating, the first RACH configuration to a third RACH configuration, based on the received first indication. The first network node 111 may be configured to perform this changing action 1907, e.g. by means of a changing unit 1705, configured to perform this action. The changing unit 1705 may be a processor 1707 of the first network node 111, or an application running on such processor.

Obtaining 1903 second assistance information. The second network node 112 may be configured to perform this obtaining action 1903, e.g. by means of an obtaining unit 1704, configured to perform this action. The obtaining unit 1704 may be a processor 1707 of the second network node 112, or an application running on such processor.

The obtaining in this Action 1903 may be based on the received first indication. At least one of the sent one or more second indications may be based on the obtained second assistance information.

Obtaining may be understood as determining, calculating, deriving, retrieving, or receiving, e.g., via the first link 141.

Verifying 1902 an existence of the conflict based on the received first indication. The second network node 112 may be configured to perform this verifying action 1902, e.g. by means of a verifying unit 1702, configured to perform this action. The verifying unit 1702 may be a processor 1707 of the second network node 112, or an application running on such processor.

At least one of the sent one or more second indications may be based on a result of the verification.

Obtaining 1906 the third RACH configuration. The second network node 112 may be configured to perform this obtaining action 1906, e.g. by means of the obtaining unit 1704, configured to perform this action.

The obtaining in this Action 1906 may be based on the first indication. The third RACH configuration may be to change/update the first RACH configuration to the third RACH configuration. At least one of the sent one or more second indications may be based on the obtained third RACH configuration.

In some examples, at least one of the one or more second indications may indicate the third RACH configuration.

Receiving 1905 the third indication from the first network node 111. The second network node 112 may be configured to perform this receiving action 1905, e.g. by means of the receiving unit 1701, configured to perform this action.

The third indication and/or the receiving 1905 may be based on the first assistance information. At least one of the sent one or more second indications may be based on the received third indication Sending 1908 the fourth indication to at least one of the first network node 111 and the third network node 113 operating in the wireless communications network 100. The second network node 112 may be configured to perform this sending action 1908, e.g. by means of the sending unit 1703, configured to perform this action.

The fourth indication may be based on the third RACH configuration, and/or on the first RACH configuration as changed/updated to the third RACH configuration by the second network node 112.

Examples of these actions and the indications are provided later in this document.

Other units 1706 may be comprised in the second network node 112.

The second network node 112 may also be configured to communicate user data with a host application unit in a host computer 1910, e.g., via another link such as 1950.

In FIG. 17, optional units are indicated with dashed boxes.

The second network node 112 may comprise an interface unit to facilitate communications between the second network node 112 and other nodes or devices, e.g., the first network node 111, the third network node 113, the user equipment, the host computer 1910, or any other nodes. In some particular examples, the interface may, for example, include a transceiver configured to transmit and receive radio signals over an air interface in accordance with a suitable standard.

The second network node 112 may comprise an arrangement as shown in FIG. 17 or in FIG. 19.

Some examples related to embodiments herein may be as follows.

Example 1. A method performed by a first network node (111), the method being for handling a Random Access Channel, RACH, configuration, the first network node (111) operating in a wireless communications network (100), the method comprising:

detecting/determining an existence of (801) a conflict between a first RACH configuration in a first cell (121), the first cell (121) being a served cell, and a second RACH configuration in a second cell (122), the second cell (122) being a neighbor cell to the first cell (121) and sending (802) a first indication to a second network node (112) operating in the wireless communications network (100), the first indication being based on the detected/determined conflict.

Example 2. The method according to example 1, the method further comprising:

obtaining (806) a third RACH configuration based on the detected conflict, to change/update the first RACH configuration to the third RACH configuration.

Example 3. The method according to example 2, the method further comprising:

sending (807) a message to the second network node (112) indicating the obtained third RACH configuration.

Example 4. The method according to any of examples 2-3, the method further comprising:

receiving (803) one or more second indications from the second network node (112), the one or more second indications being based on the sent first indication, and wherein the third RACH configuration is based on the received one or more second indications.

Example 5. The method according to example 4, wherein one of:

the second indication indicates the third RACH configuration, and the third RACH configuration is obtained based on the one or more second indications.

Example 6. The method according to any of examples 4-5, the method further comprising:

obtaining (804) first assistance information based on the determined conflict, and sending (805) a third indication to the second network node (112), the third indication being based on the obtained first assistance information and wherein at least one of the received one or more second indications is based on the sent third indication.

Example 7. The method according to any of examples 1-6, the method further comprising:

receiving (808) a fourth indication from a second network node (112) operating in the wireless communications network (100), the fourth indication being based on a third RACH configuration, and/or on the first RACH configuration as changed/updated to the third RACH configuration by the second network node (112).

Example 8. A method performed by a second network node (112), the method being for handling a Random Access Channel, RACH, configuration, the second network node (112) operating in a wireless communications network (100), the method comprising:

receiving (901) a first indication from a first network node (111) operating in the wireless communications network (100), the first indication being based on a conflict between a first RACH configuration in a first cell (121), the first cell (121) being a served cell, and a second RACH configuration in a second cell (122), the second cell (122) being a neighbor cell to the first cell (121), and sending (904) one or more second indications to the first network node (111), the one or more second indications being based on the received first indication.

Example 9. The method according to examples 8, the method further comprising:

changing/updating (907) the first RACH configuration to a third RACH configuration, based on the received first indication.

Example 10. The method according to any of examples 8-9, the method further comprising:
obtaining (903) second assistance information based on the received first indication, and wherein at least one of the sent one or more second indications are based on the obtained second assistance information.

Example 11. The method according to any of examples 8-9, the method further comprising:
verifying (902) an existence of the conflict based on the received first indication, and wherein at least one of the sent one or more second indications are based on a result of the verification.

Example 12. The method according to any of examples 8-11, the method further comprising:
obtaining (906) a third RACH configuration based on the first indication, to change update the first RACH configuration to the third RACH configuration, wherein at least one of the sent one or more second indications are based on the obtained third RACH configuration.

Example 13. The method according to example 12, wherein one at least one of the one or more second indication indicates the third RACH configuration.

Example 14. The method according to any of examples 8-13, the method further comprising:
receiving (905) a third indication from the first network node (111), the third indication being based on first assistance information and wherein at least one of the sent one or more second indications is based on the received third indication.

Example 15. The method according to any of examples 12-14, the method further comprising:
sending (908) a fourth indication to at least one of the first network node (111) and a third network node (113) operating in the wireless communications network (100), the fourth indication being based on the third RACH configuration, and/or on the first RACH configuration as changed/updated to the third RACH configuration by the second network node (112).

Further Extensions And Variations

Figure 20:
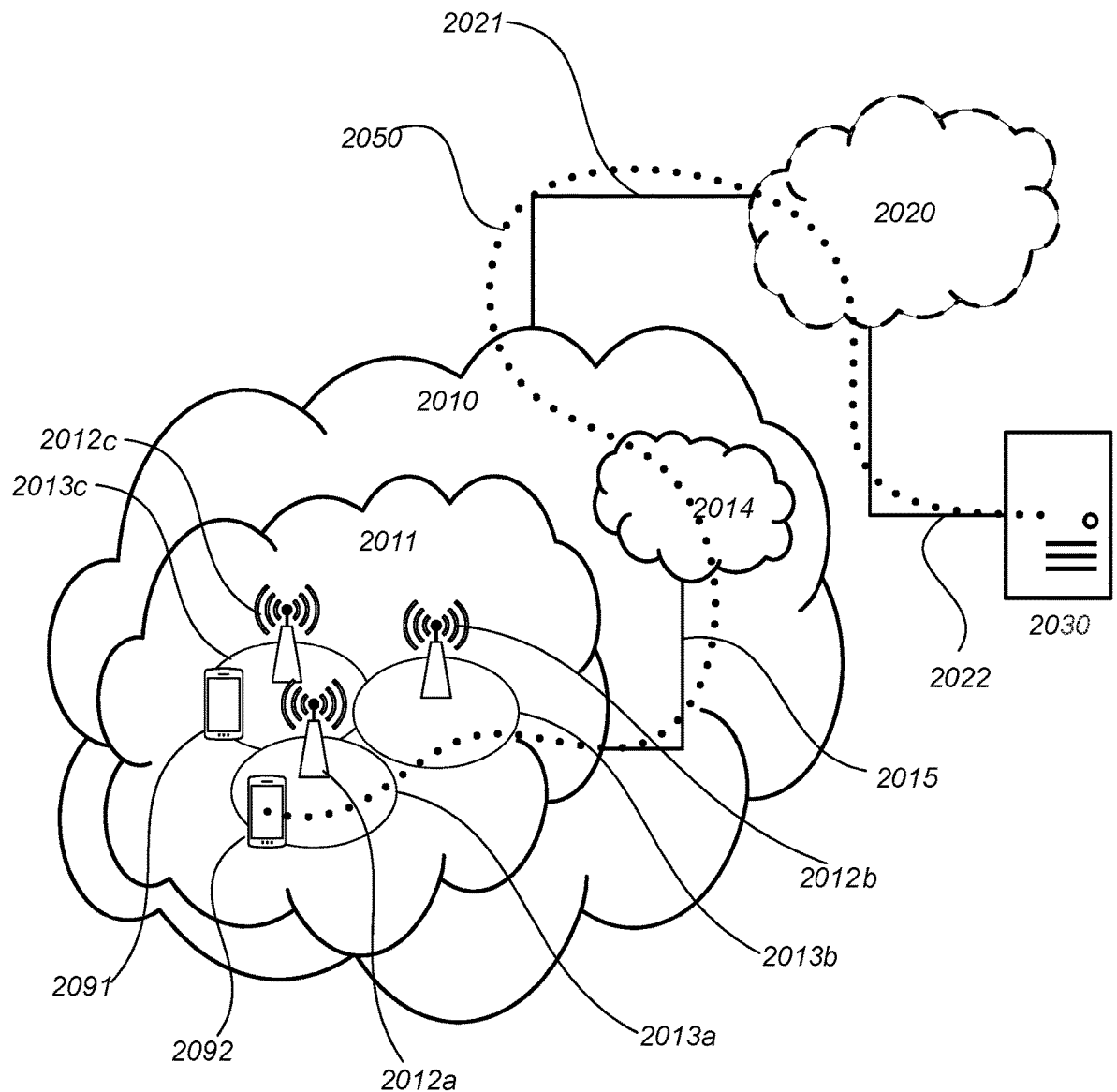
FIG. 20 is a schematic block diagram illustrating a telecommunication network connected via an intermediate network to a host computer, according to embodiments herein.

FIG. 20: Telecommunication Network Connected Via an Intermediate Network to a Host Computer in Accordance with Some Embodiments With reference to FIG. 20, in accordance with an embodiment, a communication system includes telecommunication network 2010 such as the wireless communications network 100, for example, a 3GPP-type cellular network, which comprises access network 2011, such as a radio access network, and core network 2014. Access network 2011 comprises a plurality of network nodes such as the network node 110, which may comprise any or both of the first network node 111 and the second network node 112. For example, base stations 2012a, 2012b, 2012c, such as NBs, eNBs, gNBs or other types of wireless access points, each defining a corresponding coverage area 2013a, 2013b, 2013c. Each base station 2012a, 2012b, 2012c is connectable to core network 2014 over a wired or wireless connection 2015. A plurality of wireless devices, such as the user equipment mentioned earlier in the description of FIG. 7, which will be referred to herein as the user equipment 130, are comprised in the wireless communications network 100. In FIG. 20, a first UE 2091 located in coverage area 2013c is configured to wirelessly connect to, or be paged by, the corresponding base station 2012c. A second UE 2092 in coverage area 2013a is wirelessly connectable to the corresponding base station 2012a. While a plurality of UEs 2091, 2092 are illustrated in this example, the disclosed embodiments are equally applicable to a situation where a sole UE is in the coverage area or where a sole UE is connecting to the corresponding base station 2012. Any of the UEs 2091, 2092 are examples of the user equipment 130.

Telecommunication network 2010 is itself connected to host computer 2030, which may be embodied in the hardware and/or software of a standalone server, a cloud-implemented server, a distributed server or as processing resources in a server farm. Host computer 2030 may be under the ownership or control of a service provider, or may be operated by the service provider or on behalf of the service provider. Connections 2021 and 2022 between telecommunication network 2010 and host computer 2030 may extend directly from core network 2014 to host computer 2030 or may go via an optional intermediate network 2020. Intermediate network 2020 may be one of, or a combination of more than one of, a public, private or hosted network; intermediate network 2020, if any, may be a backbone network or the Internet; in particular, intermediate network 2020 may comprise two or more sub-networks (not shown).

The communication system of FIG. 20 as a whole enables connectivity between the connected UEs 2091, 2092 and host computer 2030. The connectivity may be described as an over-the-top (OTT) connection 2050. Host computer 2030 and the connected UEs 2091, 2092 are configured to communicate data and/or signaling via OTT connection 2050, using access network 2011, core network 2014, any intermediate network 2020 and possible further infrastructure (not shown) as intermediaries. OTT connection 2050 may be transparent in the sense that the participating communication devices through which OTT connection 2050 passes are unaware of routing of uplink and downlink communications. For example, base station 2012 may not or need not be informed about the past routing of an incoming downlink communication with data originating from host computer 2030 to be forwarded (e.g., handed over) to a connected UE 2091. Similarly, base station 2012 need not be aware of the future routing of an outgoing uplink communication originating from the UE 2091 towards the host computer 2030.

In relation to FIGS. 21, 22, 23, 24, and 25, which are described next, it may be understood that a UE is an example of the user equipment 130, and that any description provided for the UE equally applies to the user equipment 130. It may be also understood that the base station is an example of the network node 110, and that any description provided for the base station equally applies to the network node 110, which may comprise any or both of the first network node 111 and the second network node 112.

Figure 21:
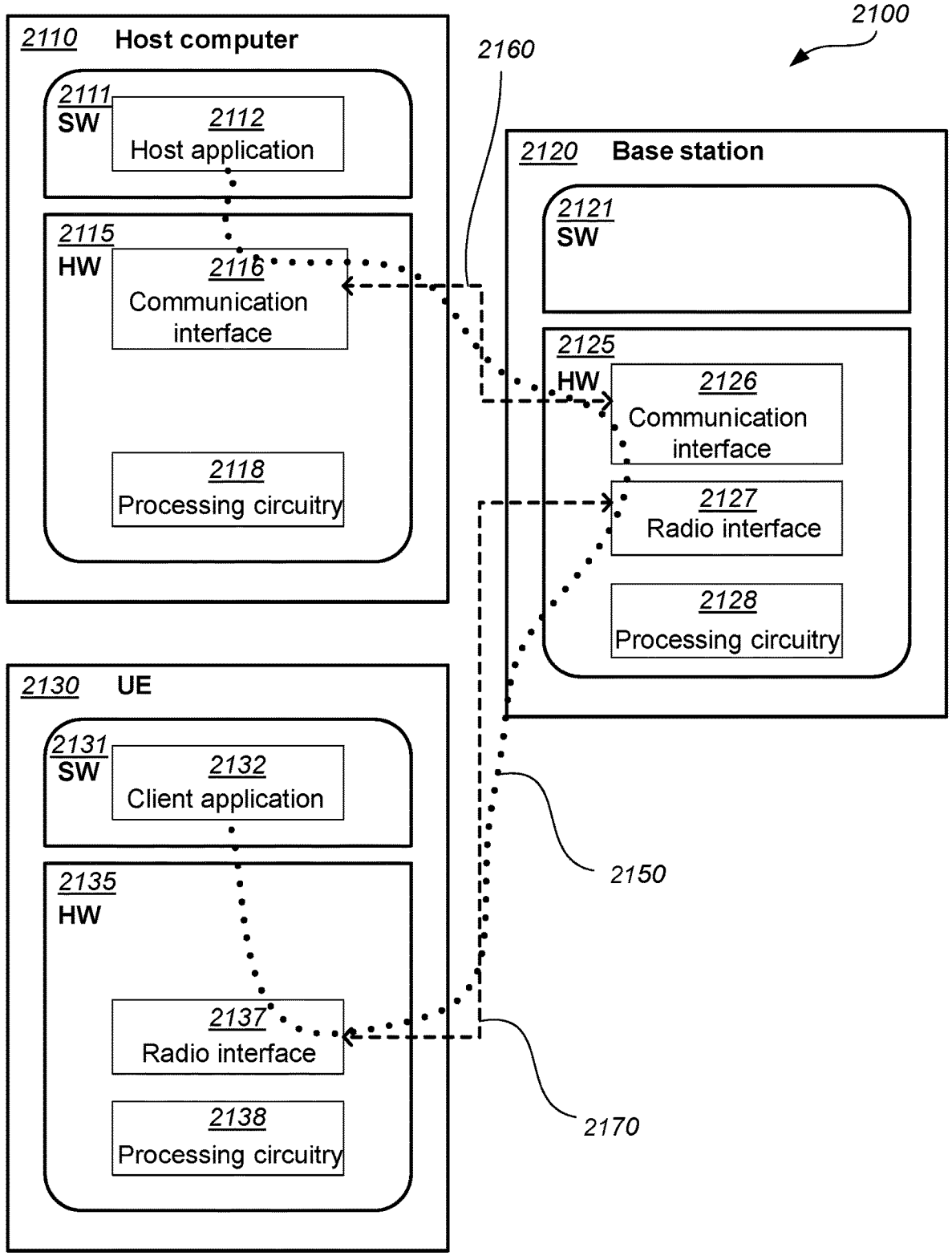
FIG. 21 is a generalized block diagram of a host computer communicating via a base station with a user equipment over a partially wireless connection, according to embodiments herein.

FIG. 21: Host Computer Communicating Via a Base Station with a User Equipment Over a Partially Wireless Connection in Accordance with Some Embodiments Example implementations, in accordance with an embodiment, of the user equipment 130, e.g., a UE, the network node 110, e.g., a base station and host computer discussed in the preceding paragraphs will now be described with reference to FIG. 21. In communication system 2100, such as the wireless communications network 100, host computer 2110 comprises hardware 2115 including communication interface 2116 configured to set up and maintain a wired or wireless connection with an interface of a different communication device of communication system 2100. Host computer 2110 further comprises processing circuitry 2118, which may have storage and/or processing capabilities. In particular, processing circuitry 2118 may comprise one or more programmable processors, application-specific integrated circuits, field programmable gate arrays or combinations of these (not shown) adapted to execute instructions.

Host computer 2110 further comprises software 2111, which is stored in or accessible by host computer 2110 and executable by processing circuitry 2118. Software 2111 includes host application 2112. Host application 2112 may be operable to provide a service to a remote user, such as UE 2130 connecting via OTT connection 2150 terminating at UE 2130 and host computer 2110. In providing the service to the remote user, host application 2112 may provide user data which is transmitted using OTT connection 2150.

Communication system 2100 further includes the network node 110, exemplified in FIG. 21 as a base station 2120 provided in a telecommunication system and comprising hardware 2125 enabling it to communicate with host computer 2110 and with UE 2130. Hardware 2125 may include communication interface 2126 for setting up and maintaining a wired or wireless connection with an interface of a different communication device of communication system 2100, as well as radio interface 2127 for setting up and maintaining at least wireless connection 2170 with the user equipment 130, exemplified in FIG. 21 as a UE 2130 located in a coverage area (not shown in FIG. 21) served by base station 2120. Communication interface 2126 may be configured to facilitate connection 2160 to host computer 2110. Connection 2160 may be direct or it may pass through a core network (not shown in FIG. 21) of the telecommunication system and/or through one or more intermediate networks outside the telecommunication system. In the embodiment shown, hardware 2125 of base station 2120 further includes processing circuitry 2128, which may comprise one or more programmable processors, application-specific integrated circuits, field programmable gate arrays or combinations of these (not shown) adapted to execute instructions. Base station 2120 further has software 2121 stored internally or accessible via an external connection.

Communication system 2100 further includes UE 2130 already referred to. Its hardware 2135 may include radio interface 2137 configured to set up and maintain wireless connection 2170 with a base station serving a coverage area in which UE 2130 is currently located. Hardware 2135 of UE 2130 further includes processing circuitry 2138, which may comprise one or more programmable processors, application-specific integrated circuits, field programmable gate arrays or combinations of these (not shown) adapted to execute instructions. UE 2130 further comprises software 2131, which is stored in or accessible by UE 2130 and executable by processing circuitry 2138. Software 2131 includes client application 2132. Client application 2132 may be operable to provide a service to a human or non-human user via UE 2130, with the support of host computer 2110. In host computer 2110, an executing host application 2112 may communicate with the executing client application 2132 via OTT connection 2150 terminating at UE 2130 and host computer 2110. In providing the service to the user, client application 2132 may receive request data from host application 2112 and provide user data in response to the request data. OTT connection 2150 may transfer both the request data and the user data. Client application 2132 may interact with the user to generate the user data that it provides.

It is noted that host computer 2110, base station 2120 and UE 2130 illustrated in FIG. 21 may be similar or identical to host computer 2030, one of base stations 2012a, 2012b, 2012c and one of UEs 2091, 2092 of FIG. 20, respectively. This is to say, the inner workings of these entities may be as shown in FIG. 21 and independently, the surrounding network topology may be that of FIG. 20.

In FIG. 21, OTT connection 2150 has been drawn abstractly to illustrate the communication between host computer 2110 and UE 2130 via base station 2120, without explicit reference to any intermediary devices and the precise routing of messages via these devices. Network infrastructure may determine the routing, which it may be configured to hide from UE 2130 or from the service provider operating host computer 2110, or both. While OTT connection 2150 is active, the network infrastructure may further take decisions by which it dynamically changes the routing (e.g., on the basis of load balancing consideration or reconfiguration of the network).

Wireless connection 2170 between UE 2130 and base station 2120 is in accordance with the teachings of the embodiments described throughout this disclosure. One or more of the various embodiments improve the performance of OTT services provided to UE 2130 using OTT connection 2150, in which wireless connection 2170 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 2150 between host computer 2110 and UE 2130, in response to variations in the measurement results. The measurement procedure and/or the network functionality for reconfiguring OTT connection 2150 may be implemented in software 2111 and hardware 2115 of host computer 2110 or in software 2131 and hardware 2135 of UE 2130, or both. In embodiments, sensors (not shown) may be deployed in or in association with communication devices through which OTT connection 2150 passes; the sensors may participate in the measurement procedure by supplying values of the monitored quantities exemplified above, or supplying values of other physical quantities from which software 2111, 2131 may compute or estimate the monitored quantities. The reconfiguring of OTT connection 2150 may include message format, retransmission settings, preferred routing etc.; the reconfiguring need not affect base station 2120, and it may be unknown or imperceptible to base station 2120. Such procedures and functionalities may be known and practiced in the art. In certain embodiments, measurements may involve proprietary UE signaling facilitating host computer 2110's measurements of throughput, propagation times, latency and the like. The measurements may be implemented in that software 2111 and 2131 causes messages to be transmitted, in particular empty or 'dummy' messages, using OTT connection 2150 while it monitors propagation times, errors etc.

The first network node embodiments relate to FIG. 8, FIG. 16 and FIGS. 21-25.

The first network node 111 may also be configured to communicate user data with a host application unit in a host computer 2110, e.g., via another link such as 2150.

The first network node 111 may comprise an interface unit to facilitate communications between the first network node 111 and other nodes or devices, e.g., the second network node 112, the user equipment, the host computer 2110, or any other nodes. In some particular examples, the interface may, for example, include a transceiver configured to transmit and receive radio signals over an air interface in accordance with a suitable standard.

The first network node 111 may comprise an arrangement as shown in FIG. 16 or in FIG. 21.

The second network node embodiments relate to FIG. 9, FIG. 17 and FIGS. 21-25.

The second network node 112 may also be configured to communicate user data with a host application unit in a host computer 2110, e.g., via another link such as 2150.

The second network node 112 may comprise an interface unit to facilitate communications between the second network node 112 and other nodes or devices, e.g., the first network node 111, the third network node 113, the user equipment, the host computer 2110, or any other nodes. In some particular examples, the interface may, for example, include a transceiver configured to transmit and receive radio signals over an air interface in accordance with a suitable standard.

The second network node 112 may comprise an arrangement as shown in FIG. 17 or in FIG. 21.

FIG. 22: Methods Implemented in a Communication System Including a Host Computer, a Base Station and a User Equipment in Accordance with Some Embodiments FIG. 22 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 22 will be included in this section. In step 2210, the host computer provides user data. In substep 2211 (which may be optional) of step 2210, the host computer provides the user data by executing a host application. In step 2220, the host computer initiates a transmission carrying the user data to the UE. In step 2230 (which may be optional), the base station transmits to the UE the user data which was carried in the transmission that the host computer initiated, in accordance with the teachings of the embodiments described throughout this disclosure. In step 2240 (which may also be optional), the UE executes a client application associated with the host application executed by the host computer.

FIG. 23: Methods Implemented in a Communication System Including a Host Computer, a Base Station and a User Equipment in Accordance with Some Embodiments FIG. 23 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 23 will be included in this section. In step 2310 of the method, the host computer provides user data. In an optional substep (not shown) the host computer provides the user data by executing a host application. In step 2320, the host computer initiates a transmission carrying the user data to the UE. The transmission may pass via the base station, in accordance with the teachings of the embodiments described throughout this disclosure. In step 2330 (which may be optional), the UE receives the user data carried in the transmission.

FIG. 24: Methods Implemented in a Communication System Including a Host Computer, a Base Station and a User Equipment in Accordance with Some Embodiments FIG. 24 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 24 will be included in this section. In step 2410 (which may be optional), the UE receives input data provided by the host computer. Additionally or alternatively, in step 2420, the UE provides user data. In substep 2421 (which may be optional) of step 2420, the UE provides the user data by executing a client application. In substep 2411 (which may be optional) of step 2410, the UE executes a client application which provides the user data in reaction to the received input data provided by the host computer. In providing the user data, the executed client application may further consider user input received from the user. Regardless of the specific manner in which the user data was provided, the UE initiates, in substep 2430 (which may be optional), transmission of the user data to the host computer. In step 2440 of the method, the host computer receives the user data transmitted from the UE, in accordance with the teachings of the embodiments described throughout this disclosure.

FIG. 25: Methods Implemented in a Communication System Including a Host Computer, a Base Station and a User Equipment in Accordance with Some Embodiments FIG. 25 is a flowchart illustrating a method implemented in a communication system, in accordance with one embodiment. The communication system includes a host computer, a base station and a UE which may be those described with reference to FIGS. 20 and 21. For simplicity of the present disclosure, only drawing references to FIG. 25 will be included in this section. In step 2510 (which may be optional), in accordance with the teachings of the embodiments described throughout this disclosure, the base station receives user data from the UE. In step 2520 (which may be optional), the base station initiates transmission of the received user data to the host computer. In step 2530 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the network node 110.

5. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform one or more of the actions described herein as performed by the network node 110.

6. The communication system of embodiment 5, further including the base station.

7. The communication system of embodiment 6, further including the UE, wherein the UE is configured to communicate with the base station.

8. The communication system of embodiment 7, wherein:
the processing circuitry of the host computer is configured to execute a host application, thereby providing the user data; and
the UE comprises processing circuitry configured to execute a client application associated with the host application.

11. A method implemented in a base station, comprising one or more of the actions described herein as performed by the network node 110.

15. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs one or more of the actions described herein as performed by the network node 110.

16. The method of embodiment 15, further comprising:
at the base station, transmitting the user data.

17. The method of embodiment 16, wherein the user data is provided at the host computer by executing a host application, the method further comprising:
at the UE, executing a client application associated with the host application.

21. A user equipment (UE) configured to communicate with a base station, the UE comprising a radio interface and processing circuitry configured to perform one or more of the actions described herein as performed by the user equipment 130.

25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform one or more of the actions described herein as performed by the user equipment 130.

26. The communication system of embodiment 25, further including the UE.

27. The communication system of embodiment 26, wherein the cellular network further includes a base station configured to communicate with the UE.

28. The communication system of embodiment 26 or 27, wherein:
the processing circuitry of the host computer is configured to execute a host application, thereby providing the user data; and
the UE's processing circuitry is configured to execute a client application associated with the host application.

31. A method implemented in a user equipment (UE), comprising one or more of the actions described herein as performed by the user equipment 130.

35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the user equipment 130.

36. The method of embodiment 35, further comprising:
at the UE, receiving the user data from the base station.

41. A user equipment (UE) configured to communicate with a base station, the UE comprising a radio interface and processing circuitry configured to perform one or more of the actions described herein as performed by the user equipment 130.

45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the user equipment 130.

46. The communication system of embodiment 45, further including the UE.

47. The communication system of embodiment 46, further including the base station, wherein the base station comprises a radio interface configured to communicate with the UE and a communication interface configured to forward to the host computer the user data carried by a transmission from the UE to the base station.

48. The communication system of embodiment 46 or 47, wherein:
the processing circuitry of the host computer is configured to execute a host application; and
the UE's processing circuitry is configured to execute a client application associated with the host application, thereby providing the user data.

49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.

51. A method implemented in a user equipment (UE), comprising one or more of the actions described herein as performed by the user equipment 130.

52. The method of embodiment 51, further comprising:
providing user data; and
forwarding the user data to a host computer via the transmission to the base station.

55. A method implemented in a communication system including a host computer, a base station and a user equipment (UE), the method comprising:

at the host computer, receiving user data transmitted to the base station from the UE, wherein the UE performs one or more of the actions described herein as performed by the user equipment 130.

56. The method of embodiment 55, further comprising:
at the UE, providing the user data to the base station.

57. The method of embodiment 56, further comprising:
at the UE, executing a client application, thereby providing the user data to be transmitted; and
at the host computer, executing a host application associated with the client application.

58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.

61. A base station configured to communicate with a user equipment (UE), the base station comprising a radio interface and processing circuitry configured to perform one or more of the actions described herein as performed by the network node 110.

65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the network node 110.

66. The communication system of embodiment 65, further including the base station.

67. The communication system of embodiment 66, further including the UE, wherein the UE is configured to communicate with the base station.

68. The communication system of embodiment 67, wherein:
the processing circuitry of the host computer is configured to execute a host application;
the UE is configured to execute a client application associated with the host application, thereby providing the user data to be received by the host computer.

71. A method implemented in a base station, comprising one or more of the actions described herein as performed by the network node 110.

75. A method implemented in a communication system including a host computer, a base station and a user equipment (UE), the method comprising:
at the host computer, receiving, from the base station, user data originating from a transmission which the base station has received from the UE, wherein the UE performs one or more of the actions described herein as performed by the user equipment 130.

76. The method of embodiment 75, further comprising:
at the base station, receiving the user data from the UE.

77. The method of embodiment 76, further comprising:
at the base station, initiating a transmission of the received user data to the host computer.

The invention claimed is:

1. A method performed by a first network node, the method being for handling a Random Access Channel (RACH) configuration, the first network node operating in a wireless communications network with a Radio Access Technology with a split architecture, wherein the first network node is a Centralized Unit (CU) and a second network node is a Distributed Unit (DU), the method comprising:
detecting a conflict between a first RACH configuration in a first cell, the first cell being a served cell, and a second RACH configuration in a second cell;
sending a first indication to the second network node operating in the wireless communications network, the first indication being based on the detected conflict, the first indication comprising at least one of:
a notification of the conflict for the served cell,
assistance information associated to the detected conflict to assist the second network node to resolve the detected conflict for the served cell,
a request for assistance information associated to the detected conflict to assist the first network node to resolve the detected conflict for the served cell, and
a request for the second network node to resolve the detected conflict for the served cell; and
receiving one or more second indications from the second network node, the one or more second indications being based on the sent first indication, wherein at least one of the received one or more second indications is based on a result of a verification of an existence of the detected conflict.

2. The method of claim 1, wherein the conflict is a RACH conflict and wherein the one or more second indications comprise at least one of:
an instruction to resolve the conflict;
an acknowledgement of the conflict;
an acknowledgement of the conflict and an instruction to resolve the conflict;
a request for additional assistance information; and
additional assistance information from the second network node.

3. The method of claim 1, the method further comprising:
obtaining a first third RACH configuration based on the detected conflict, to change the first RACH configuration to the first third RACH configuration.

4. The method of claim 3, the method further comprising:
sending a message to the second network node indicating the obtained first third RACH configuration.

5. The method of claim 3, wherein the first third RACH configuration is based on the received one or more second indications.

6. The method of claim 5, wherein one of the one or more second indications indicates the first third RACH configuration and the first third RACH configuration is obtained based on the one or more second indications.

7. The method of claim 1, the method further comprising:
obtaining first assistance information based on the determined conflict, and
sending a third indication to the second network node, the third indication indicating the obtained first assistance information and wherein at least one of the received one or more second indications is based on the sent third indication.

8. The method of claim 7, wherein the conflict is a RACH conflict and wherein at least one of: the assistance information comprised in the first indication and the first assistance information comprises at least one of:
information related to RACH configurations of neighboring cells that create the RACH configuration conflict;
information related to RACH configurations of other neighboring cells to be avoided; and
a range of parameters for RACH configuration available for use by the second network node to resolve the RACH configuration conflict.

9. The method of claim 1, the method further comprising:
receiving a fourth indication from the second network node operating in the wireless communications network, the fourth indication being based on a second third RACH configuration and/or on the first RACH configuration as changed to the second third RACH configuration by the second network node, the fourth indication notifying an occurred change of RACH configuration for the served cell in the conflict to the second third RACH configuration.

10. The method of claim 1, wherein the conflict is between a RACH configuration associated to a first Synchronization Signal Block (SSB) beam of the first cell and another RACH configuration associated to a second SSB beam of the second cell.

11. A first network node, for handling a Random Access Channel (RACH) configuration, the first network node being configured to operate in a wireless communications network with a Radio Access Technology with a split architecture, wherein the first network node is configured to be a Centralized Unit (CU) and a second network node is configured to be a Distributed Unit (DU), the first network node comprising a communication interface configured to communicate with the second network node and further comprising a processing circuit configured to:
detect a conflict between a first RACH configuration in a first cell, the first cell being configured to be a served cell, and a second RACH configuration in a second cell, the second cell being configured to be a neighbor cell to the first cell;
send a first indication to the second network node configured to operate in the wireless communications network, via the communication interface, the first indication being based on the detected conflict, the first indication comprising at least one of:
a notification of the conflict for the served cell;
assistance information associated to the detected conflict to assist the second network node to resolve the detected conflict for the served cell;
a request for assistance information configured to be associated to the detected conflict to assist the first network node to resolve the detected conflict for the served cell, and
a request for the second network node to resolve the detected conflict for the served cell; and
receive one or more second indications from the second network node, via the communication interface, the one or more second indications being based on the sent first indication, and, wherein at least one of the received one or more second indications is based on a result of a verification of an existence of the detected conflict.

12. The first network node of claim 11, wherein the conflict is a RACH conflict and wherein the one or more second indications comprise at least one of:
an instruction to resolve the conflict,
an acknowledgement of the conflict;
an acknowledgement of the conflict and an instruction to resolve the conflict;
a request for additional assistance information; and
additional assistance information from the second network node.

13. The first network node of claim 11, the processing circuit being further configured to:
obtain a first third RACH configuration based on the detected conflict, to change the first RACH configuration to the first third RACH configuration.

14. The first network node of claim 13, the processing circuit being further configured to:
send a message to the second network node to indicate the obtained first third RACH configuration.

15. The first network node of claim 13, wherein the first third RACH configuration is configured to operate based on the received one or more second indications.

16. The first network node of claim 15, wherein one of:
the one or more second indications indicate the first third RACH configuration, and
the first third RACH configuration is obtained based on the one or more second indications.

17. The first network node of claim 11, the processing circuit being further configured to:
obtain first assistance information based on the determined conflict; and
send a third indication to the second network node, the third indication indicating the obtained first assistance information, wherein at least one of the received one or more second indications is based on the third indication configured to be sent.

18. The first network node of claim 17, wherein the conflict is a RACH conflict and wherein at least one of: the assistance information comprised in the first indication and the first assistance information comprises at least one of:
information related to RACH configurations of neighboring cells that create the RACH configuration conflict;
information related to RACH configurations of other neighboring cells to be avoided; and
a range of parameters for RACH configuration available for use by the second network node to resolve the RACH configuration conflict.

19. The first network node of claim 11, the processing circuit being further configured to:
receive a fourth indication from the second network node, the fourth indication being based on a second third RACH configuration and/or on the first RACH configuration as changed to the second third RACH configuration by the second network node, the fourth indication being configured to notify an occurred change of RACH configuration for the served cell in the conflict to the second third RACH configuration.

20. The first network node of claim 11, wherein the conflict is configured to be between a RACH configuration associated to a first Synchronization Signal Block (SSB) beam of the first cell and another RACH configuration associated to a second SSB beam of the second cell.

* * * * *